United States Patent
Hossain et al.

(10) Patent No.: US 12,235,398 B2
(45) Date of Patent: Feb. 25, 2025

(54) RADIATION DETECTION SYSTEMS AND METHODS

(71) Applicant: CERIUM LABORATORIES LLC, Austin, TX (US)

(72) Inventors: Timothy Hossain, Austin, TX (US); Clayton Fullwood, Austin, TX (US)

(73) Assignee: Cerium Laboratories, LLC, Austin, TX (US)

( * ) Notice: Subject to any disclaimer, the term of this patent is extended or adjusted under 35 U.S.C. 154(b) by 472 days.

(21) Appl. No.: 17/735,298

(22) Filed: May 3, 2022

(65) Prior Publication Data

US 2024/0319389 A1  Sep. 26, 2024

Related U.S. Application Data

(60) Provisional application No. 63/246,733, filed on Sep. 21, 2021, provisional application No. 63/227,597, filed on Jul. 30, 2021, provisional application No. 63/183,607, filed on May 3, 2021.

(51) Int. Cl.
*G01T 3/00* (2006.01)
*G01T 1/16* (2006.01)

(52) U.S. Cl.
CPC .  *G01T 3/00* (2013.01); *G01T 1/16* (2013.01)

(58) Field of Classification Search
CPC ............... G01T 3/00; G01T 1/16; G01T 1/24
See application file for complete search history.

(56) References Cited

U.S. PATENT DOCUMENTS

| | | | |
|---|---|---|---|
| 5,523,597 A | 6/1996 | Baumann et al. | |
| 6,075,261 A | 6/2000 | Hossain et al. | |
| 6,097,079 A | 8/2000 | Hossain et al. | |
| 7,375,339 B2 * | 5/2008 | Abadeer ................. | G01T 1/244 250/370.07 |
| 7,525,141 B1 | 4/2009 | Forbes et al. | |
| 7,847,386 B1 | 12/2010 | Kim et al. | |
| 7,902,520 B2 | 3/2011 | Hossain et al. | |
| 8,222,704 B2 | 7/2012 | Manning et al. | |
| 8,232,515 B2 * | 7/2012 | Hossain ............ | H01L 27/14676 250/214.1 |
| 8,310,864 B2 | 11/2012 | Lung et al. | |

(Continued)

FOREIGN PATENT DOCUMENTS

CN  110011946 B  3/2020
WO  2020226900 A2  11/2020

*Primary Examiner* — David P Porta
*Assistant Examiner* — Gisselle M Gutierrez

(57) ABSTRACT

A system for detecting radiation includes a first array of neutron radiation detection devices, each radiation detection device including a charge storage region and a radiation reactive material; a first set of decoders to address the neutron radiation detection devices of the first array and to provide first signals indicative of the a state of the neutron radiation detection devices; a second array of gamma radiation detection devices, each gamma radiation detection device including a charge storage region in proximity to a high-z material; a second set of decoders to address the gamma radiation detection devices of the second array and to provide second signals indicative of a state of the gamma radiation detection devices; and a controller in communication with the first set of decoders and the second set of decoders and to receive the first and second signals.

19 Claims, 36 Drawing Sheets

(56) References Cited

U.S. PATENT DOCUMENTS

| | | | |
|---|---|---|---|
| 8,436,289 B1 | 5/2013 | Hossain et al. | |
| 8,748,800 B2 | 6/2014 | Hossain et al. | |
| 8,803,066 B2 | 8/2014 | Hossain et al. | |
| 9,024,266 B2* | 5/2015 | Menge | G01T 1/2002 |
| | | | 250/368 |
| 9,069,084 B2* | 6/2015 | Frank | G01T 1/201 |
| 9,575,018 B2 | 2/2017 | Hossain | |
| 9,645,257 B2* | 5/2017 | Kusner | G01T 1/20 |
| 11,846,738 B2* | 12/2023 | Hossain | H01L 31/115 |
| 2005/0258373 A1 | 11/2005 | Lacy | |
| 2006/0157654 A1* | 7/2006 | Frank | G01T 3/08 |
| | | | 250/305 |
| 2006/0245235 A1 | 11/2006 | Krieger | |
| 2007/0080301 A1* | 4/2007 | Bell | G01T 3/08 |
| | | | 250/370.12 |
| 2009/0166550 A1 | 7/2009 | Gazda et al. | |
| 2010/0078570 A1* | 4/2010 | Frank | G01T 3/08 |
| | | | 250/370.05 |
| 2010/0155611 A1* | 6/2010 | Fullwood | G01T 3/08 |
| | | | 250/370.05 |
| 2010/0155618 A1* | 6/2010 | Hossain | G01T 1/00 |
| | | | 250/395 |
| 2010/0230772 A1 | 9/2010 | Cannon | |
| 2011/0220806 A1 | 9/2011 | Gordon | |
| 2013/0181137 A1* | 7/2013 | Watanabe | C30B 29/12 |
| | | | 250/369 |
| 2013/0193537 A1* | 8/2013 | Hossain | H01L 27/14676 |
| | | | 257/429 |
| 2014/0284488 A1* | 9/2014 | Sanuki | G01T 1/2928 |
| | | | 250/370.09 |
| 2015/0053863 A1* | 2/2015 | Cao | G01T 3/06 |
| | | | 250/370.11 |
| 2015/0323682 A1* | 11/2015 | Yang | G01T 3/06 |
| | | | 250/362 |
| 2016/0238580 A1 | 8/2016 | Kundalgurki | |
| 2018/0096936 A1 | 4/2018 | Wu | |
| 2020/0073758 A1 | 3/2020 | Shizukuishi | |
| 2020/0241149 A1 | 7/2020 | Yau et al. | |

* cited by examiner

RADIATION DETECTION SYSTEMS AND METHODS

CROSS-REFERENCE TO RELATED APPLICATION(S)

This application claims benefit of U.S. Provisional Application No. 63/183,607, filed May 3, 2021, claims benefit of U.S. Provisional Application No. 63/227,597, filed Jul. 30, 2021, and claims benefit of U.S. Provisional Application No. 63/246,733, filed Sep. 21, 2021 each of which is incorporated herein by reference in its entirety.

FIELD OF THE DISCLOSURE

This disclosure, in general, relates to systems and methods for detecting ionizing radiation.

BACKGROUND

Detection of radiation is increasingly becoming of interest to society. Various forms radiation can influence the performance of electronic circuitry. Such is the case with terrestrial electronics, and with increasing use of satellites and interest in space travel, the effect of radiation on both electronics and passengers is of increasing concern. Moreover, radiation has been used in a variety of positive applications such as medicine and tomography. However, radiation also has negative potential, such as radiation leaks into the environment and deliberate use for terrorist activities.

Terrestrially, various radiation sources can influence the performance of electronics, flipping bits resulting in erroneous calculations and programming. Once outside the protections of the atmosphere, such concerns around the effects of radiation on electronics increases significantly. Unexpected changes in data or erroneous instructions can cause poor operation or even permanent damage to orbiting satellites and may cause life-threatening malfunctions to orbiting spacecraft. To the extent that human space travel is increasing, the effect of radiation on human health is also an increasing concern.

Various forms of radiation have also been used in tomography. For example, x-rays have been used to detect structures and provide three-dimensional imaging.

With the occurrence of highly publicized terrorist events, concern for control of hazardous materials, particularly radioactive sources, is high. In particular, sources of neutron radiation are of particular concern. Fissile material can be used to make dirty bombs or nuclear weapons, which if used, could cause extensive loss of life and property damage.

In each case, the equipment conventionally used to detect radiation can be bulky or slow. Conventional methods for detecting neutron radiation suffer from sensitivity to gamma radiation and high cost. Conventional technologies for detecting neutron radiation are expensive and cumbersome. Large and expensive equipment is used at major ports to test for the presence of radioactive material. On the other extreme, smaller handheld devices with low sensitivity are available.

As such, a small form, rapid detection system would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
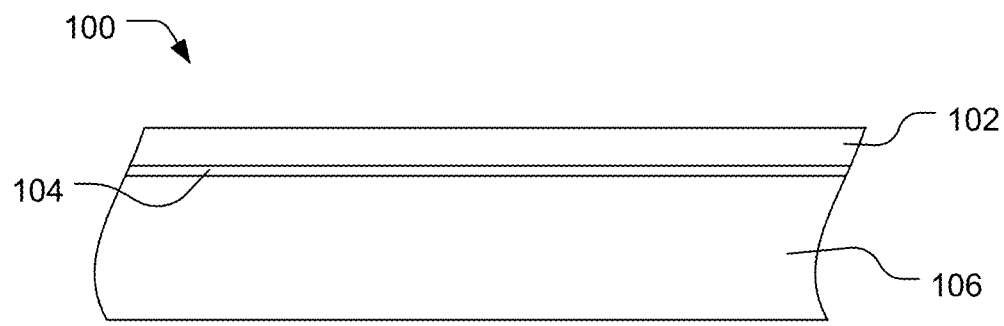
FIG. 1, FIG. 2, FIG. 3, FIG. 4, and FIG. 5 include illustrations of example workpieces for forming an embodiment of a radiation detection device.

In an exemplary embodiment, a radiation detection system includes an array of radiation detection devices. In an example, the radiation detection system can be configured to detect neutron radiation, gamma radiation, or cosmic radiation. Example cosmic radiation includes electrons, protons, alpha particles, positrons, antiprotons, or high atomic number and energy (HZE) particles, among others. The radiation detection system can detect shifts in charge in charge storage structures. The shifts in charge are indicative of impingement by radiation. In an example, the devices can be formed using methods similar to those methods used to form memory devices, such as Charge Trap Flash and its variants such as SONOS, MONOS, TANOS and SHINOS. The detection devices include charge storage regions to store a charge above a voltage threshold. For example, when a neutron interacts with a radiation reactive material, the neutron causes fission of a nucleus that releases an alpha particle. The alpha particle can disturb the charge stored in the charge storage region, resulting in the stored charge falling below the voltage threshold. When the charge stored in the charge storage region is above the threshold, current through the device can be limited, referred to herein as a "0" state. When the charge drops below the voltage threshold, indicating a detection event, a higher current can flow through the device, referred to herein as a "1" state.

In an example, a device includes a gate structure formed over a substrate. In particular, the gate structure can be formed over a portion of the substrate between source and drain regions. The gate structure can include a charge storage structure that, for example, includes a layer of an oxide of silicon disposed on a layer of a nitride of silicon disposed on a layer of an oxide of silicon. Within the gate structure, one or more conductive layers can optionally be disposed adjacent to the charge storage structure. In an example, the conductive layer is a polysilicon layer disposed adjacent the charge storage structure. In an example, a neutron sensitive layer can be disposed around the polysilicon layer. For example, the neutron sensitive layer can be formed of a doped oxide layer, such as a layer doped with boron. In addition, the gate structure can include a gate oxide layer in direct contact with the substrate. The gate structure can further include sidewalls. Exemplary sidewalls can include a nitride of silicon. In particular, an insulative material filling the space between detection devices and surrounding the detection devices on at least three sides can be formed of a radiation reactive material.

In an example, one or more devices can be formed into an array. One or more arrays can be incorporated into a circuitry. The circuitry can be formed in the same substrate as the one or more arrays. In another example, the one or more arrays can be formed on separate substrates and stacked onto the substrate of the circuitry. The circuitry can include read-out circuitry and communications circuitry. In an addition example, the circuitry can reset the one or more arrays.

As illustrated in FIG. 1, an optional insulator layer 104 is disposed over a semiconductor substrate 106. In an example, the semiconductor substrate 106 can be formed of a semiconductor material, such as a silicon-based material, including silicon or silicon germanium, among others. In a particular example, the semiconductor substrate 106 is formed of monocrystalline silicon.

The optional insulator layer 104 is disposed over the semiconductor substrate 106 and can be in direct contact with the semiconductor substrate 106. In an example, the insulator layer 104 can be formed as an oxide grown from the semiconductor substrate. For example, the oxide can be grown in a furnace in an oxidative environment. Alternatively, the insulator layer 104 can include an insulator material, such as an oxide of silicon, hafnium silicon oxide, hafnium oxide, zirconium oxide, or another high-k dielectric material. A suitable deposition technique may be utilized to form the gate insulator layer 104, such as chemical vapor deposition (CVD), low-pressure chemical vapor deposition (LPCVD), and plasma enhanced chemical vapor deposition (PECVD). The gate insulator layer 104 is preferably deposited to a thickness of not greater than 10 nm, such as a thickness of not greater than 5 nm, or even not greater than 3 nm.

Depending on the nature of the device (e.g., P-MOS or N-MOS type devices), the substrate 106 can be treated to form desired p-type or n-type regions within the bulk material of the semiconductor layer 106. For example, the semiconductor substrate 106 can be treated with ion implantation to form wells or deep wells of the desired type depending upon the desired nature of the resulting devices. While embodiments described herein are described for the formation of P-MOS type devices, the process can be adapted to form N-MOS devices.

In a further example, an optional semiconductor layer 102 is deposited over the gate insulator layer 104. In an example, the optional semiconductor layer 102 can include polycrystalline silicon, which can be doped to have desirable properties. For example, the semiconductor layer 102 can include phosphorus doped polycrystalline silicon. In an example, the polycrystalline silicon can be deposited as undoped polycrystalline silicon and subsequently doped by ion implantation. Alternatively, the polycrystalline silicon can be doped in situ. In an example, the polycrystalline silicon can be deposited using low-pressure chemical vapor deposition (LPCVD) with hydrogen reduction of silane. The polycrystalline layer can be deposited with a thickness in a range of 10 nm to 250 nm, such as a range of 20 nm to 220 nm, or even a range of 50 nm to 200 nm.

Figure 2:
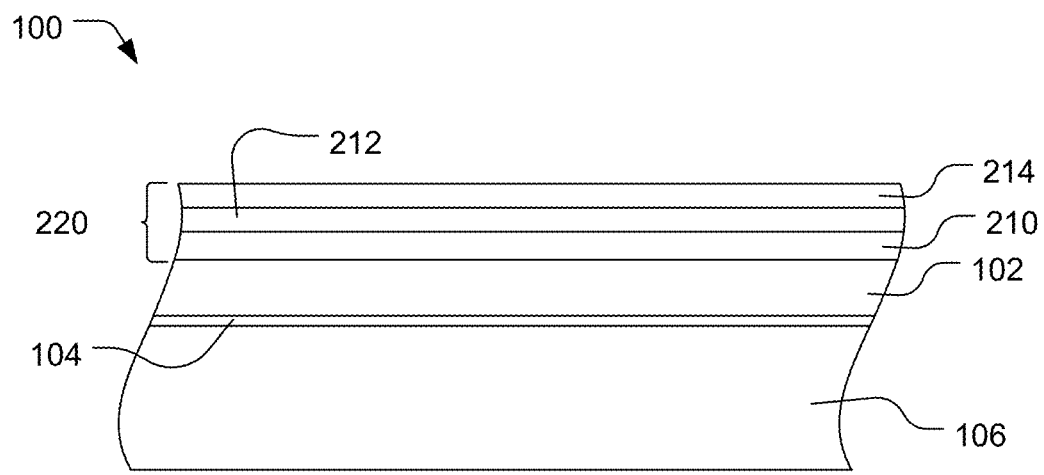

As illustrated in FIG. 2, a charge storage structure 220 is deposited adjacent the semiconductor layer 102. In particular, the charge storage structure can be deposited in direct contact with the semiconductor layer 102. In an example, the charge storage structure 220 can include more than two layers, such as three layers in which a layer of a nitride of silicon 212 is disposed between two layers (210 or 214) of oxides or oxynitrides of silicon. In an example, the charge storage structure 220 is formed by applying an oxide of silicon layer 210 over the semiconductor layer 102 using low-pressure chemical vapor deposition (LPCVD) in an oxygen-rich atmosphere. In particular, the oxide may be deposited using low-pressure chemical vapor deposition (LPCVD) of silane and nitrous oxide in a nitrogen atmosphere. The nitride layer 212 can also be deposited using low-pressure chemical vapor deposition (LPCVD) using hexamethyldisiloxane and ammonia gas, and an oxide or oxynitride layer 314 can be grown over the nitride layer 212, for example, in an oxidation furnace.

The charge storage structure 220 can have a thickness in a range of 10 nm to 50 nm, such as a range of 10 nm to 30 nm. In particular, the oxide layer 210 can have a thickness in a range of 0.5 nm to 5 nm, such as a range of 1 nm to 4 nm, or even a range of 1 nm to 3 nm. The nitride layer 212 can have a thickness in a range of 3 nm to 10 nm, such as a range of 3 nm to 7 nm, or even a range of 4 nm to 6 nm. In a further example, the oxide layer 214 can have a thickness in a range of 2 nm to 20 nm, such as a range of 3 nm to 15 nm, or even a range of 5 nm to 10 nm.

Figure 3:
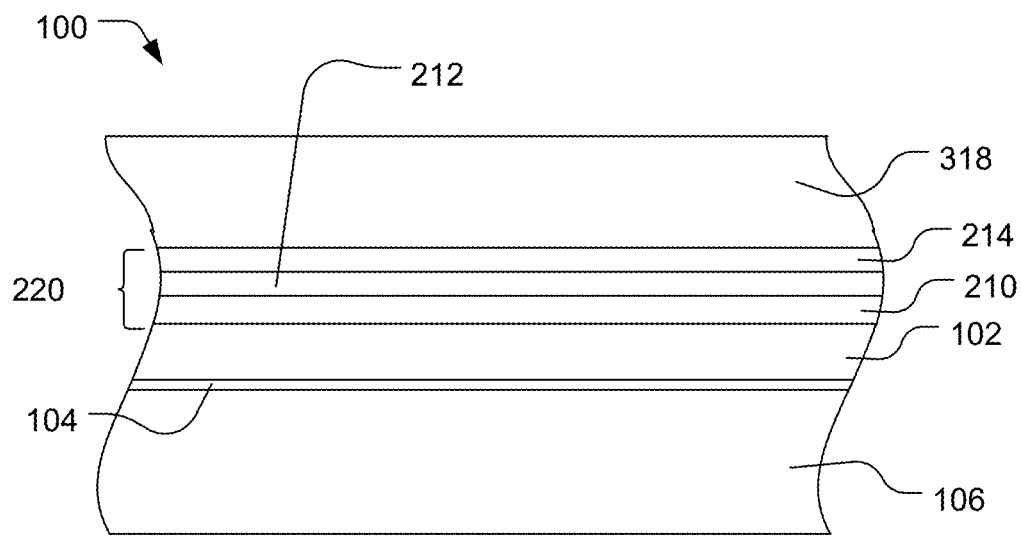

As illustrated in FIG. 3, an additional semiconductor layer 318 can be deposited over the charge storage structure 220. In an example, the semiconductor layer 318 can be deposited in direct contact with the charge storage structure 220. In an example, the semiconductor layer 318 includes polycrystalline silicon. The polycrystalline silicon can be deposited using CVD, LPCVD, or PECVD. The polycrystalline silicon can be doped to have a desired property. In an example, the thickness of the semiconductor layer 318 is in a range of 10 nm to 250 nm, such as a range of 20 nm to 220 nm, or even a range of 50 nm to 200 nm.

Figure 4:
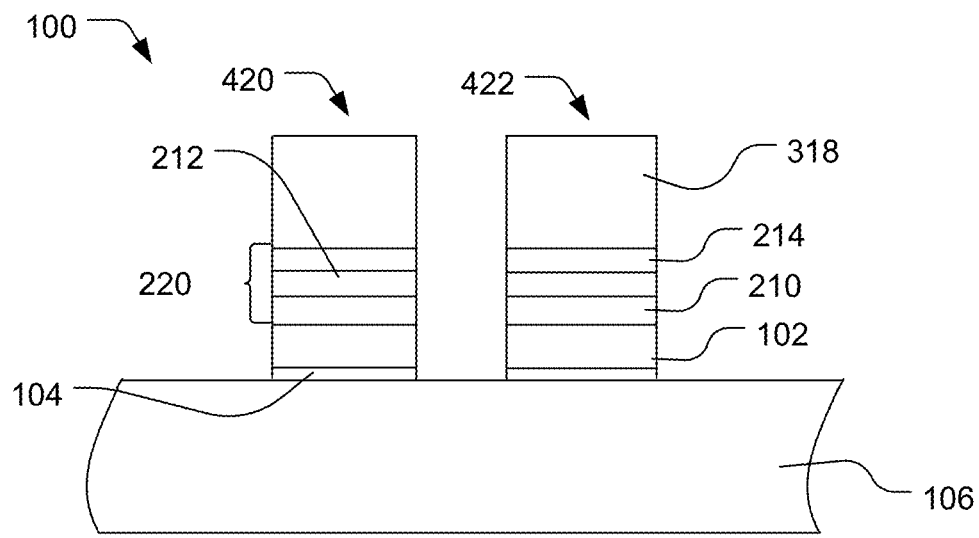

As illustrated in FIG. 4, the layers 102, 210, 212, 214, and 318 can be patterned and etched to form gate stacks, such as gate stacks 420 or 422. As such, the gate stacks can include the charge storage structures 220 optionally with one or more adjacent conductive layers (e.g., layers 102 or 318).

Figure 5:
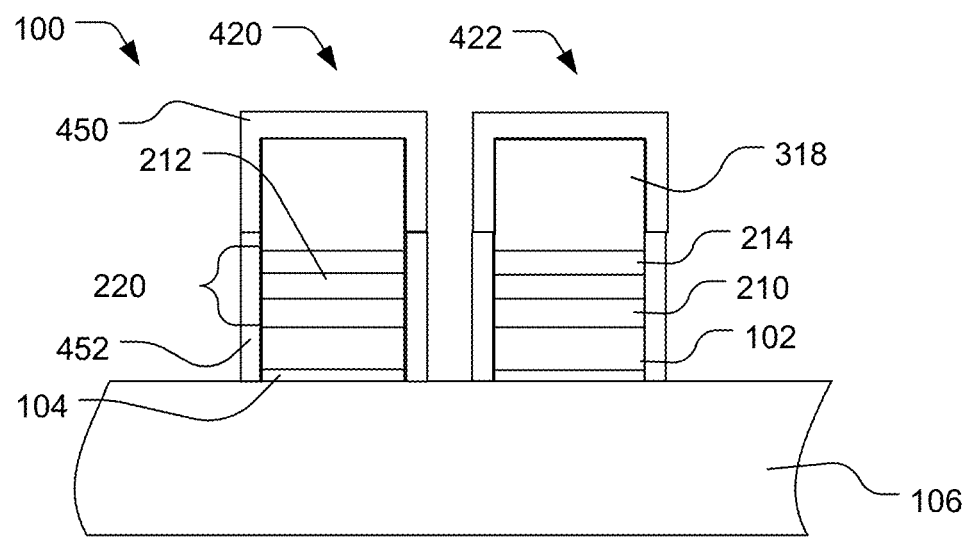

As illustrated in FIG. 5, a spacer or liner oxide can be formed around the gate structures. The space oxide can be formed as a unified structure. In another example, the space oxide can be formed as two structures. At least a portion of the space oxide surrounding the semiconductor layer 318 can be implanted to provide sensitivity to neutrons, such as thermal neutrons. For example, the spacer oxide 450 can be implanted with boron 10 ($^{10}$B). In an example, the spacer oxide 450 includes $^{10}$B in an amount in a range of $10^{16}$ to $10^{21}$ atoms/cm$^2$, such as a range of $3 \times 10^{16}$ to $10^{21}$ atoms/cm$^2$, a range of $10^{17}$ to $10^{21}$ atoms/cm$^2$, a range of $10^{19}$ to $10^{21}$ atoms/cm$^2$, or a range of $10^{20}$ to $10^{21}$ atoms/cm$^2$. In an example, the space oxide includes $^{10}$B in an amount in a range of $2 \times 10^{20}$ to $5 \times 10^{20}$ atoms/cm$^2$. The spacer oxide 452 can be similarly implanted or can be free of boron.

Figure 6:
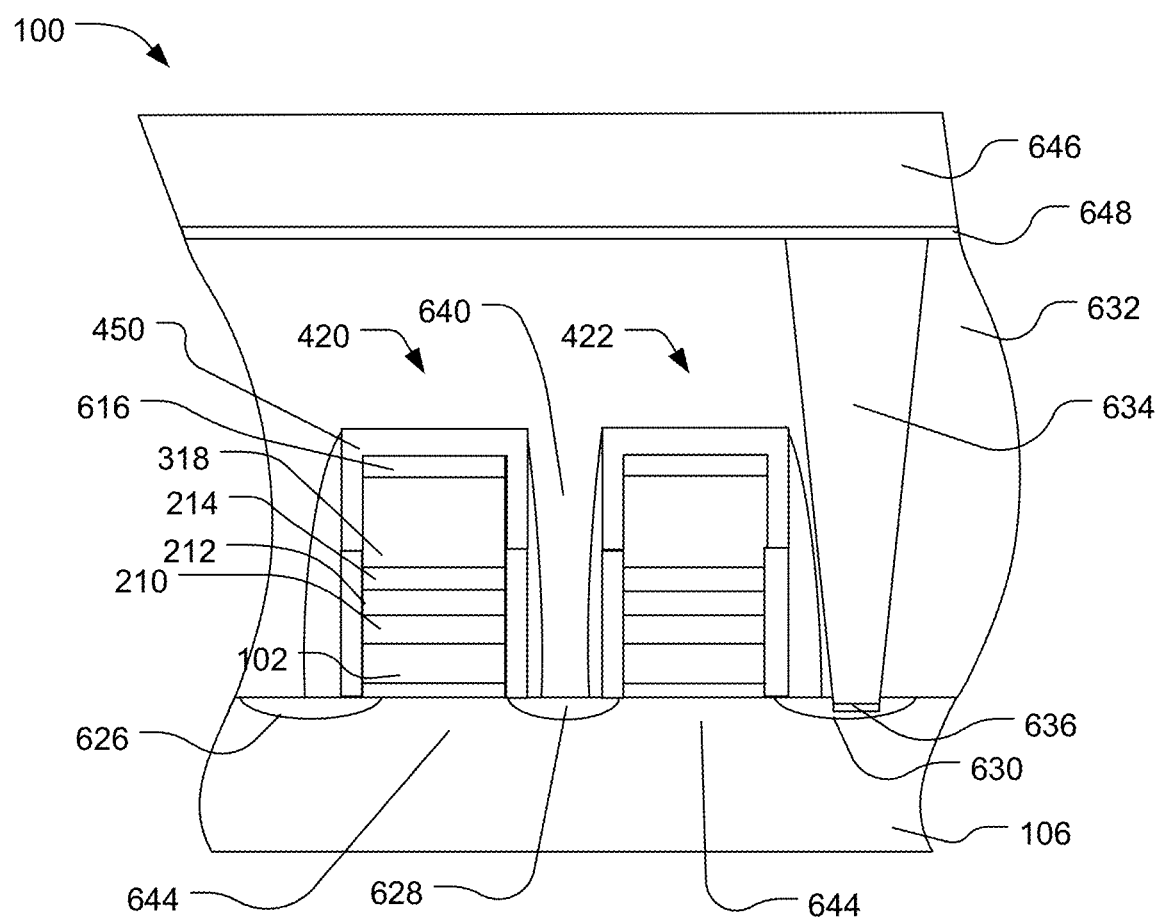
FIG. 6 includes an illustration of example portions of a radiation detection device.

FIG. 6 includes an illustration of a portion of a detection array. In particular, the array includes a plurality of gate structures, such as gate structures 420 and 422. The semiconductor substrate 106 includes a well source/drain 628 disposed between the gate stacks 620 and 622. In addition, source/drains 626 or 630 are formed within the semiconductor substrate 106 on opposite sides of the gate stacks 420 and 422 from the source/drain 628.

Using masking and ion implantation techniques, source/drains 626, 628, and 630 can be formed within the semiconductor layer 106 adjacent or between the gate stacks 420 or 422. The source/drains 626, 628, and 630 can be implanted before forming the layers of the gate stacks 420 or 422. Alternatively, the source/drain implants can be formed after etching the gate structures. The type of source/drain region depends on the nature of the substrate or regions within which the source/drains are formed. For example, a p-type source/drain can be formed using a boron ion implantation in an n-type substrate or region. Alternatively, source/drains of n+ type material can be formed in a p-type region. The n+ type source/drains can be formed using arsenic, phosphorous, or other similar dopants using ion implantation. Accordingly, a gate region 644 extends between the source/drains. While P-MOS transistors are described, N-MOS transistors can be formed using a similar method having a similar gate stack structure.

Sidewall spacers 640 that isolate the gate stacks can be formed of a nitride material, such as a silicon nitride. Optionally, spacer oxides 450 or 452 can be formed on the sides of the gate stacks 420 and 422.

Optional silicide layers can be formed to provide contacts for the gate stack or provide a contact with source/drain regions, such as the source/drain region 630. For example, the gate stack can include a silicide layer 616. In another example, a silicide region, such as 636, can be formed over source/drain regions. A silicide forming metal, such as cobalt, nickel, rhenium, ruthenium, palladium, or a combination thereof, can be deposited by sputtering to a thickness in a range of 5 nm to 30 nm, followed by rapid thermal annealing.

Interlayer dielectric 632 can be disposed over the gate stacks 420 and 422 and an interconnect 634 can be formed to contact the silicide layer 636 through the interlayer dielectric 632 while remaining isolated from the gate stack. In particular, the interlayer dielectric 632 can be formed from a radiation reactive material. For example, the radiation reactive material can include an atomic composition that decomposes in response to thermal neutrons and produces an alpha particle. The alpha particle can interact with the charge storage regions of the charge storage structure 220, allowing detection of a radiation event. The radiation reactive material can include a radiation reactive component boron-10 ($^{10}$B), lithium-6 ($^6$Li), cadmium-113 ($^{113}$Cd), gadolinium-157 ($^{157}$Gd), uranium-235 ($^{235}$U), or a combination thereof. The radiation reactive material can be an oxide, nitride, carbide, silicide, oxynitride, or a combination thereof including the radiation reactive component. For example, the radiation reactive material can be an oxide of boron, a nitride of boron, or a carbide of boron. In a particular example, the radiation reactive material is an oxide of boron, such as $B_2O_3$.

The radiation reactive material can include the radiation reactive component (e.g., a radiation reactive isotope of an element) along with non-radiation reactive isotopes of the element. In an example, the radiation reactive component is included in an enriched amount of at least 50%, expressed as a percentage of atoms relative to the total of all the isotopes of the related element. For example, the radiation reactive component can be included in an amount of at least 70%, such as at least 80%, or even at least 90%, such as approximately 100%. In a particular example, the radiation reactive material includes boron-10 in an amount of at least 50%, such as at least 70%, at least 80%, at least 90% or at least 99%.

One or more conductive layers 646 can be formed of a conductive material and disposed over the interlayer dielectric 632 and can be used to form lines, such as bit lines or word lines, in electrical contact with the interconnect 634. Optionally, a barrier layer 648 can be formed between the conductive layer 646 and the interlayer dielectric 632.

The interconnect 634 can be formed of a conductive metal such as tungsten, titanium, copper, aluminum, an alloy thereof, or a combination thereof or other conductive materials such as titanium nitride. Optionally, a thin barrier metal layer (not shown) is deposited using sputtering or thermal CVD and including, for example, tantalum, titanium, titanium nitride, or any combination thereof. In an example, tungsten can be deposited to form the interconnect using a thermal LPCVD. Additional metallization layers and packaging can be performed to complete the electronic component.

Figure 7:
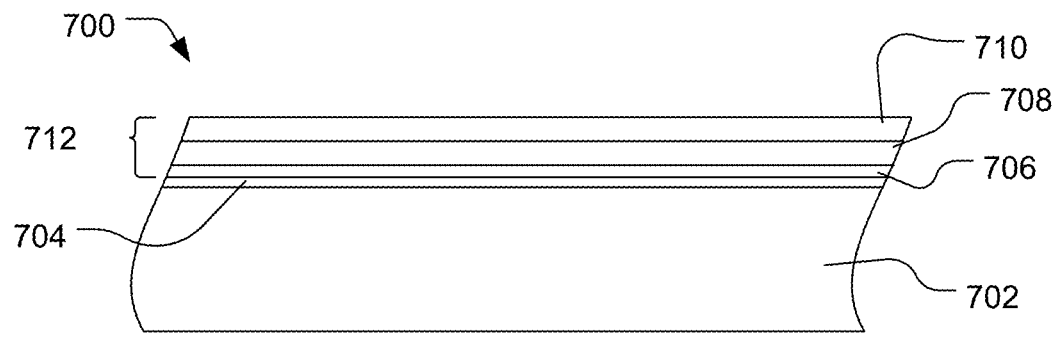
FIG. 7, FIG. 8, and FIG. 9 include illustrations of example workpieces for forming an embodiment of a radiation detection device.

In a further example, a radiation detection device can be formed with the charge carrying structure disposed proximal to the substrate. For example, as illustrated in FIG. 7, an optional oxide layer 704, such as a silicon oxide, can be disposed over a substrate 702. In an example, the oxide layer includes a native oxide or thin oxide layer that can be optionally removed before formation of the device. Source/drain line implants can optionally be formed in the substrate prior to the deposition of the oxide layer 704.

The charge carrying structure 712 can be formed over the substrate 702 and optional oxide layer 704. For example, the charge carrying structure 712 includes silicon oxide layer 706, a silicon nitride layer 708, and further silicon oxide layer 710. The charge storage structure 712 can have a thickness in a range of 10 nm to 50 nm, such as a range of 10 nm to 30 nm. In particular, the silicon oxide layer 706 can have a thickness in a range of 0.5 nm to 5 nm, such as a range of 1 nm to 4 nm, or even a range of 1 nm to 3 nm. The nitride layer 708 can have a thickness in a range of 3 nm to 10 nm, such as a range of 3 nm to 7 nm, or even a range of 4 nm to 6 nm. In a further example, the oxide layer 710 can have a thickness in a range of 2 nm to 20 nm, such as a range of 3 nm to 15 nm, or even a range of 5 nm to 10 nm.

Figure 8:
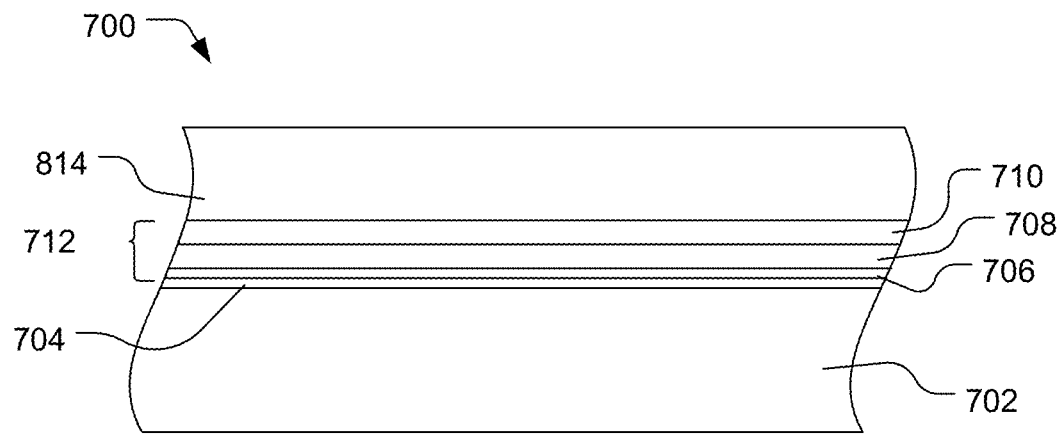

As illustrated in FIG. 8, a gate electrode layer can be disposed over the charge carrying structure 712. For example, a polysilicon layer 814 can be disposed over the charge carrying structure 712. Alternatively, a conductive material such as a metal, for example, titanium, copper, aluminum, or the like, or any combination thereof, can form layer 814.

Figure 9:
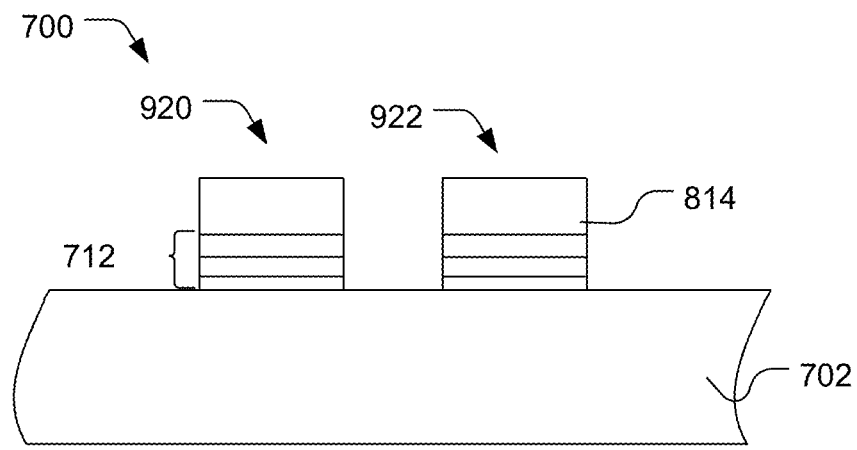

As illustrated in FIG. 9, the layers can be etched to form gate structures 920 and 922. Source/drain implants can be formed, optional silicon dioxide sidewalls can be formed, optional sidewall spacers can be added, and silicide connections can be formed. As above, a sidewall can be formed of a doped oxide of silicon. In another example, a silicide 1016 (FIG. 10) can be formed over the gate 814.

Figure 10:
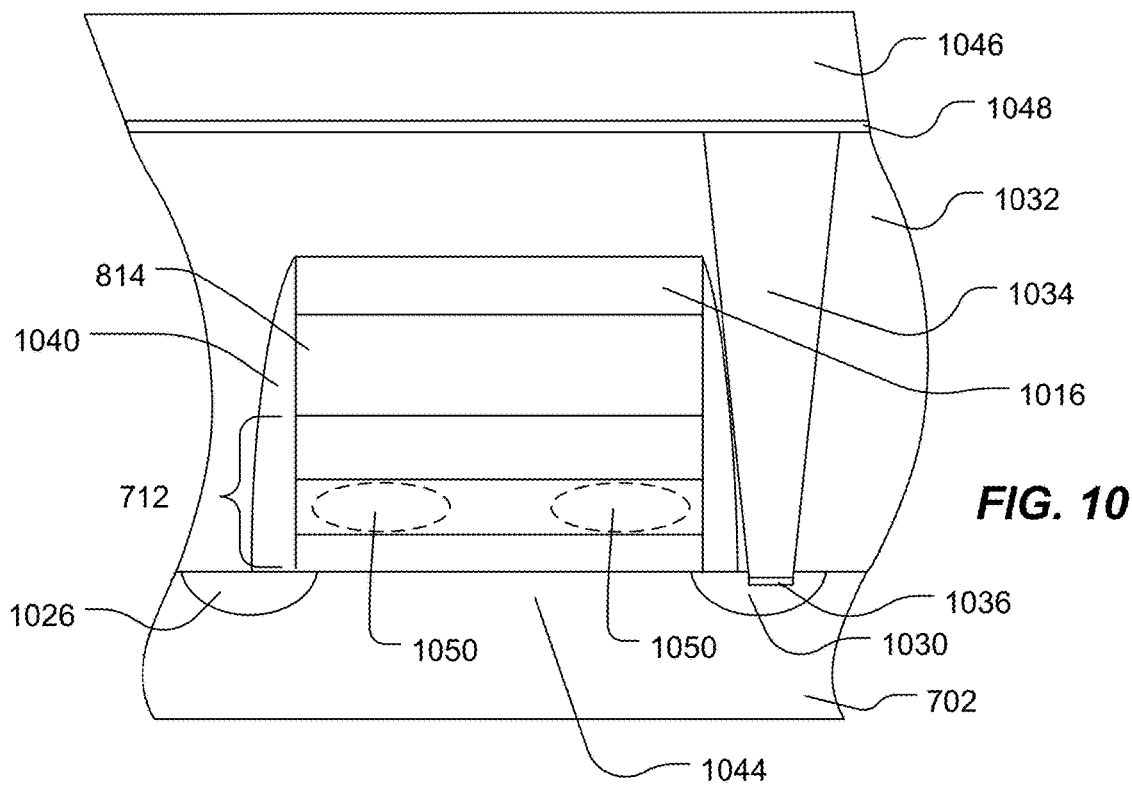
FIG. 10 and FIG. 11 include illustrations of example portions of a radiation detection device.

FIG. 10 includes an illustration of a portion of an embodiment of a radiation detection device. In particular, the radiation detection device includes a single gate stack structure. The nature of the charge storage structure within the radiation detection device can include two charge storage regions 1050 within the silicon nitride layer 708 of the charge storage device 712. With reversible source/drains, the two charge storage regions 1050 can be programmed and read.

For example, the semiconductor substrate 702 is a p-type substrate that includes n+ type source/drains 1026 or 1030 formed within the semiconductor substrate 702 on opposite sides of the gate stack (e.g., gate stacks 920 or 922). Using masking and ion implantation techniques, source/drain regions 1026 or 1030 of n+ type material can be formed adjacent the gate stack. The n+ type drain regions 1026 or 1030 can be formed using arsenic, phosphorous, or other similar dopants using ion implantation. Accordingly, a gate region 1044 extends between the source/drain regions. While P-MOS transistors are described, N-MOS transistors can be formed using a similar method having a similar gate stack structure.

Optionally, spacer oxides, such as oxides of silicon including doped oxides of silicon, can be formed on the sides of the gate stacks. Sidewall spacers 1040 that isolate the gate stacks can be formed of a nitride material, such as a silicon nitride.

Optional silicide layers can be formed to provide contacts for the gate stack or provide a contact with source/drain regions, such as the source/drain region 1026 or 1030. For example, a gate silicide 1016 can be formed over the gate polysilicon 814. In an example, a silicide forming metal, such as cobalt, nickel, rhenium, ruthenium, palladium, or a combination thereof, can be deposited by sputtering to a thickness in a range of 5 nm to 30 nm, followed by rapid thermal annealing.

An interlayer dielectric 1032 can be disposed over the gate stacks, for example, surrounding at least three sides of the gate stacks. In particular, the interlayer dielectric 1032 can be formed from a radiation reactive material. For example, the radiation reactive material can include an atomic composition that decomposes in response to thermal neutrons and produces an alpha particle. The alpha particle can interact with the charge storage regions 1050 of the charge storage structure 712, allowing detection of a radiation event. The radiation reactive material can include a radiation reactive component boron-10 ($^{10}$B), lithium-6 ($^{6}$Li), cadmium-113 ($^{113}$Cd), gadolinium-157 ($^{157}$Gd), uranium-235 ($^{235}$U), or a combination thereof. The radiation reactive material can be an oxide, nitride, carbide, silicide, oxynitride, or a combination thereof including the radiation reactive component. For example, the radiation reactive material can be an oxide of boron, a nitride of boron, or a carbide of boron. In a particular example, the radiation reactive material is an oxide of boron, such as $B_2O_3$.

The radiation reactive material can be formed using chemical vapor deposition (CVD), low pressure chemical vapor deposition (LPCVD), plasma enhanced chemical vapor deposition (PECVD), other techniques, or any combination thereof.

The radiation reactive material can include the radiation reactive component (e.g., a radiation reactive isotope of an element) along with non-radiation reactive isotopes of the element. In an example, the radiation reactive component is included in an enriched amount of at least 50%, expressed as a percentage of atoms relative to the total of all the isotopes of the related element. For example, the radiation reactive component can be included in an amount of at least 70%, such as at least 80%, or even at least 90%, such as approximately 100%. In a particular example, the radiation reactive material includes boron-10 in an amount of at least 50%, such as at least 70%, at least 80%, at least 90% or at least 99%.

An interconnect 1034 can be formed to contact the silicide layer 1036 through the interlayer dielectric 1032 while remaining isolated from the gate stack. One or more metal layers 1046 can be formed of a conductive material and disposed over the interlayer dielectric 1032 and can provide word lines and bit lines in electrical contact with interconnects, such as the interconnect 1034, to access source/drains or gates. Optionally, a barrier layer 1048 can be formed between the metal layer 1046 and the interlayer dielectric 1032.

The interconnect 1034 can be formed of a conductive metal such as tungsten, titanium, copper, aluminum, an alloy thereof, or a combination thereof or other conductive materials, such as titanium nitride. Optionally, a thin barrier metal layer 1048 is deposited using sputtering or thermal CVD and including for example, tantalum, titanium, titanium nitride, or any combination thereof. In an example, tungsten can be deposited to form the interconnect using a thermal LPCVD. Additional metallization layers and packaging can be performed to complete the electronic component.

Figure 11:
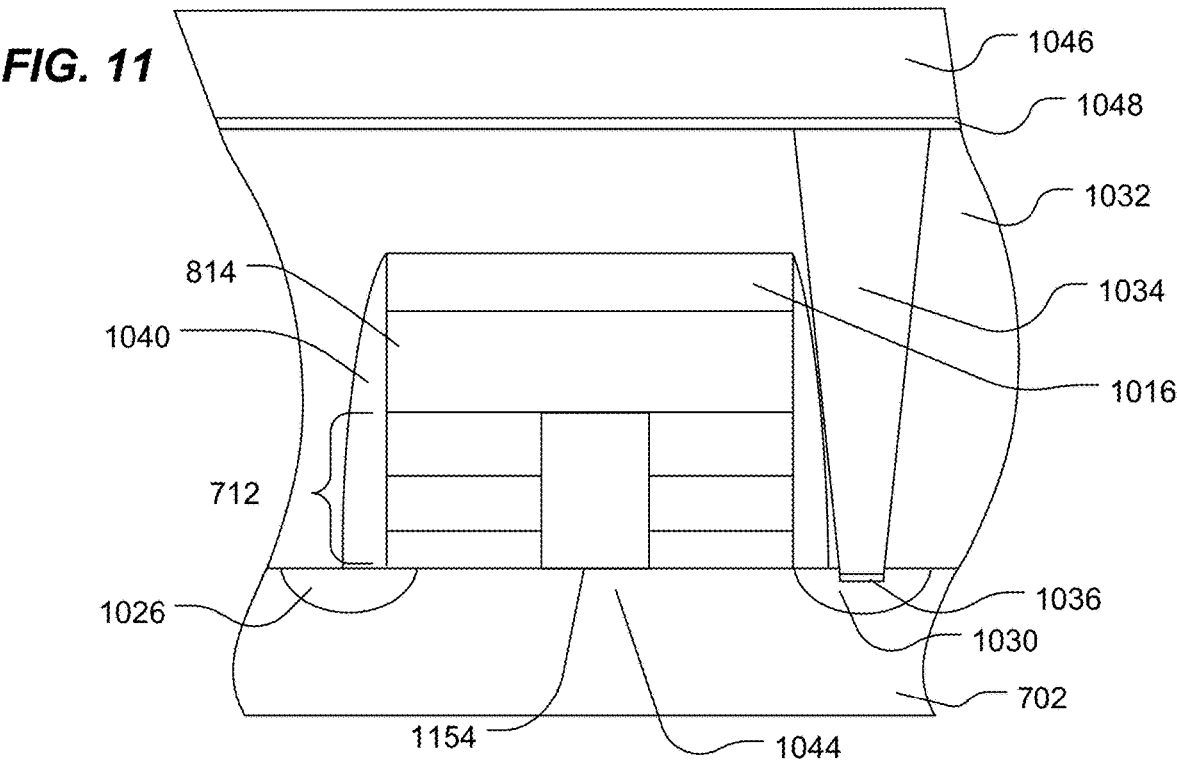

FIG. 11 includes an illustration of a further embodiment of a detection device. An isolation block 1154 is formed to at least electrically isolate parts of the oxide-nitride-oxide stack 712, including layers 706, 708, and 710. While isolation block 1154 is illustrated as extending the height of the charge storage structure 712, the isolation block 1154 can optionally extend into or through the semiconductor layer 814. In an example, the isolation block 1154 can be formed of an oxide of silicon.

Figure 12:
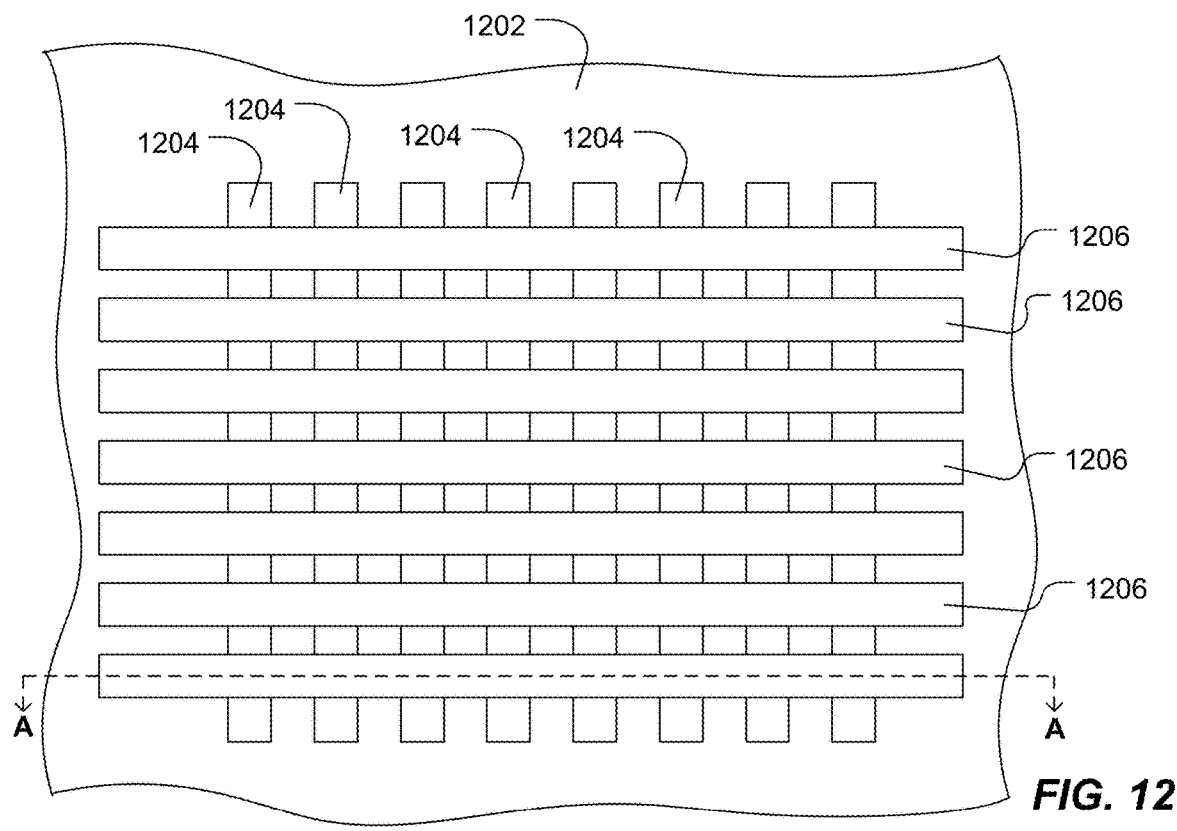
FIG. 12 includes a plan-view illustration of an example radiation detection array.

While FIG. 10 and FIG. 11 illustrate an embodiment of an example radiation detection device, source/drain implants can be formed as a line within the substrate or polysilicon perpendicular to the gate stack formed over the substrate. For example, FIG. 12 illustrates a plan view of a substrate 1202 in which source/drain implant lines 1204 are formed. The gate stacks 1206, including the charge storage layers, are formed over the substrate 1202 and perpendicular to the source/drain implant lines 1204.

Figure 13:
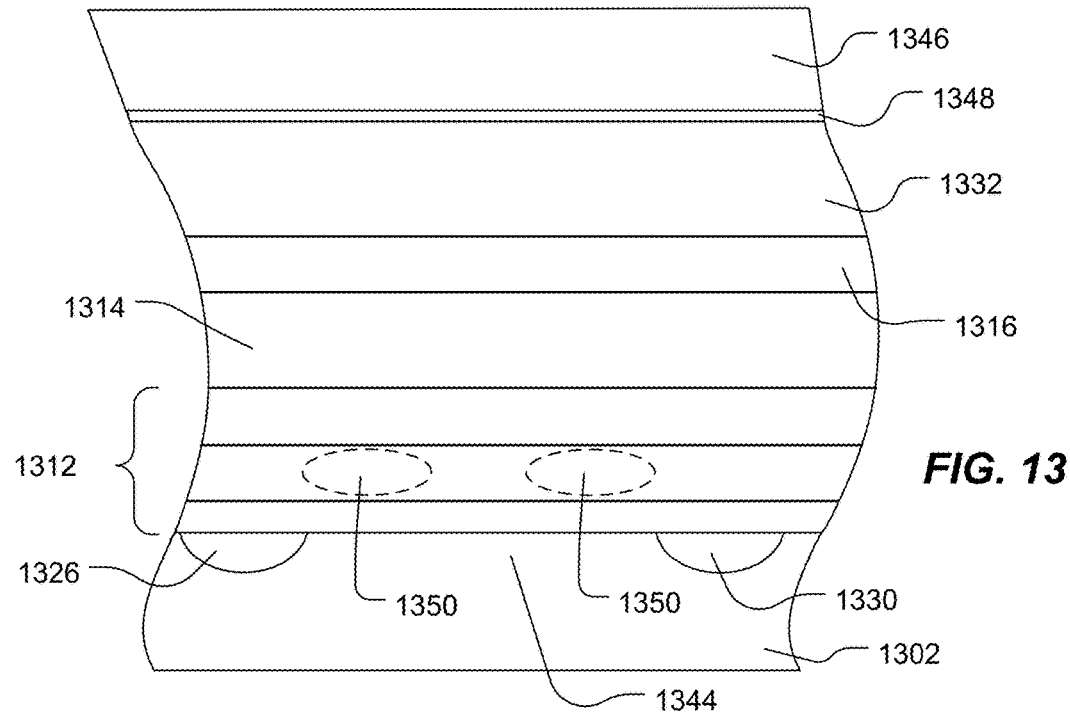
FIG. 13 and FIG. 14 include illustrations example portions of a radiation detection device.

When viewed in cross-section perpendicular to the source/drain implant lines 1204, for example, at cut A, the gate stack is illustrated as extending across the illustration. For example, as illustrated in FIG. 13, a single gate stack structure can be used to form a plurality of radiation detection devices between adjacent source/drain implant lines.

In particular, the radiation detection device is formed using the gate stack structure. The nature of the charge storage structure within the radiation detection device can include two charge storage regions 1350 within the silicon nitride layer of the charge storage device 1312. With reversible source/drains, the two charge storage regions 1350 can be programmed and read for each radiation detection device formed along the length of the gate stack structure.

For example, the semiconductor substrate 1302 is a p-type substrate that includes n+ type source/drains 1326 or 1330 formed within the semiconductor substrate 1302 running perpendicular to the gate stack. Using masking and ion implantation techniques, source/drain regions 1326 or 1330 of n+ type material can be formed within the substrate 1302 prior to forming the gate stack. The n+ type drain regions 1326 or 1330 can be formed using arsenic, phosphorous, or other similar dopants using ion implantation. Accordingly, a gate region 1344 extends between the source/drain regions. While P-MOS transistors are described, N-MOS transistors can be formed using a similar method having a similar gate stack structure.

Optionally, spacer oxides, such as oxides of silicon including doped oxides of silicon, can be formed on the sides of the gate stacks. Sidewall spacers that isolate the gate stacks can be formed of a nitride material, such as a silicon nitride.

Optional silicide layers can be formed to provide contacts for the gate stack or provide a contact with source/drain regions, such as the source/drain region 1326 or 1330. For example, a gate silicide 1316 can be formed over the gate polysilicon 1314. In an example, a silicide forming metal, such as cobalt, nickel, rhenium, ruthenium, palladium, or a combination thereof, can be deposited by sputtering to a thickness in a range of 5 nm to 30 nm, followed by rapid thermal annealing.

An interlayer dielectric 1332 can be disposed over the gate stacks and surround the gate stacks on at least three sides. In particular, the interlayer dielectric 1332 can be formed from a radiation reactive material. For example, the radiation reactive material can include an atomic composition that decomposes in response to thermal neutrons and produces an alpha particle. The alpha particle can interact with the charge storage regions 1350 of the charge storage structure 1312, allowing detection of a radiation event. The radiation reactive material can include a radiation reactive component boron-10 ($^{10}$B), lithium-6 ($^{6}$Li), cadmium-113 ($^{113}$Cd), gadolinium-157 ($^{157}$Gd), uranium-235 ($^{235}$U), or a combination thereof. The radiation reactive material can be an oxide, nitride, carbide, silicide, oxynitride, or a combination thereof including the radiation reactive component. For example, the radiation reactive material can be an oxide of boron, a nitride of boron, or a carbide of boron. In a particular example, the radiation reactive material is an oxide of boron, such as $B_2O_3$.

The radiation reactive material can be formed using chemical vapor deposition (CVD), low pressure chemical vapor deposition (LPCVD), plasma enhanced chemical vapor deposition (PECVD), other techniques, or any combination thereof.

The radiation reactive material can include the radiation reactive component (e.g., a radiation reactive isotope of an element) along with non-radiation reactive isotopes of the element. In an example, the radiation reactive component is included in an enriched amount of at least 50%, expressed as a percentage of atoms relative to the total of all the isotopes of the related element. For example, the radiation reactive component can be included in an amount of at least 70%, such as at least 80%, or even at least 90%, such as approximately 100%. In a particular example, the radiation reactive material includes boron-10 in an amount of at least 50%, such as at least 70%, at least 80%, at least 90% or at least 99%.

One or more metal layers 1346 can be formed of a conductive material and disposed over the interlayer dielectric 1332 and can provide word lines and bit lines in electrical contact with interconnects, such as the interconnect 1334, to access source/drains or gates. Optionally, a barrier layer 1348 can be formed between the metal layer 1346 and the interlayer dielectric 1332.

Figure 14:
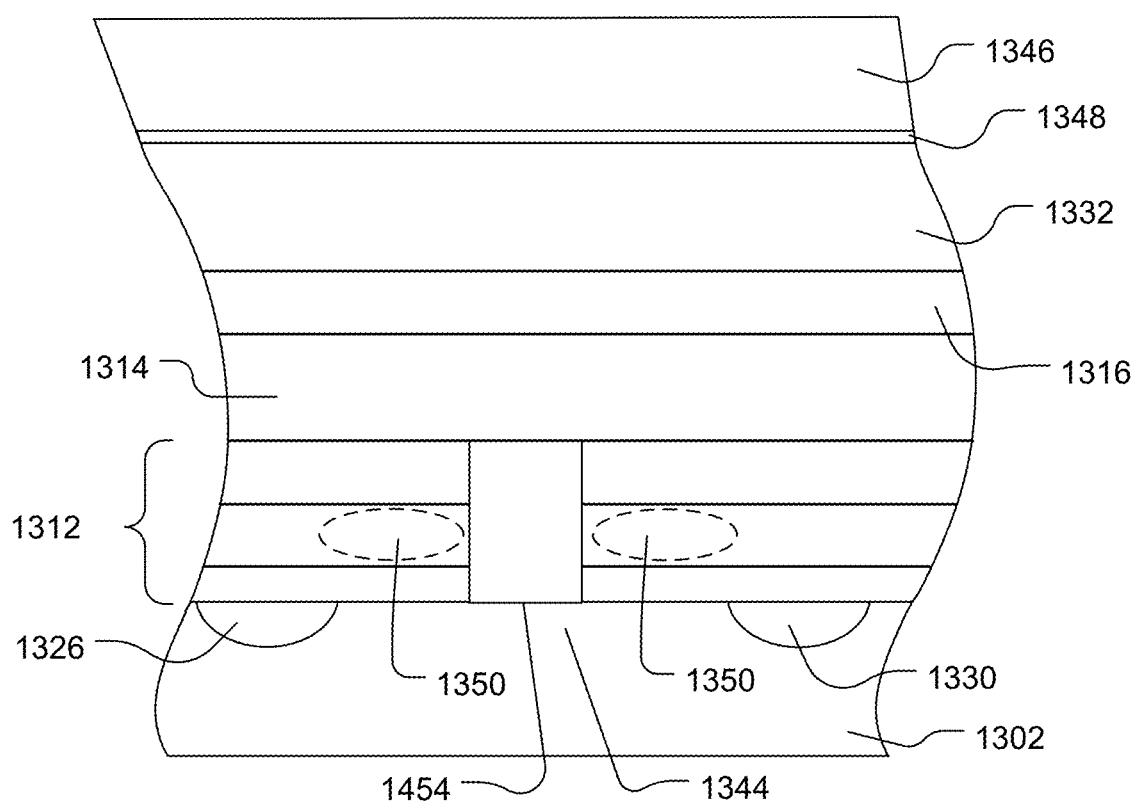

FIG. 14 includes an illustration of a further embodiment of a detection device. An isolation block 1454 is formed to at least electrically isolate parts of the oxide-nitride-oxide stack 1312. In this embodiment, the isolation block extends perpendicular to the gate stack and parallel to the source/drain lines. While the isolation block 1454 is illustrated as extending the height of the charge storage structure 1312, the isolation block 1454 can optionally extend into or through the semiconductor layer 1314. In an example, the isolation block 1354 can be formed of an oxide of silicon.

Figure 15:
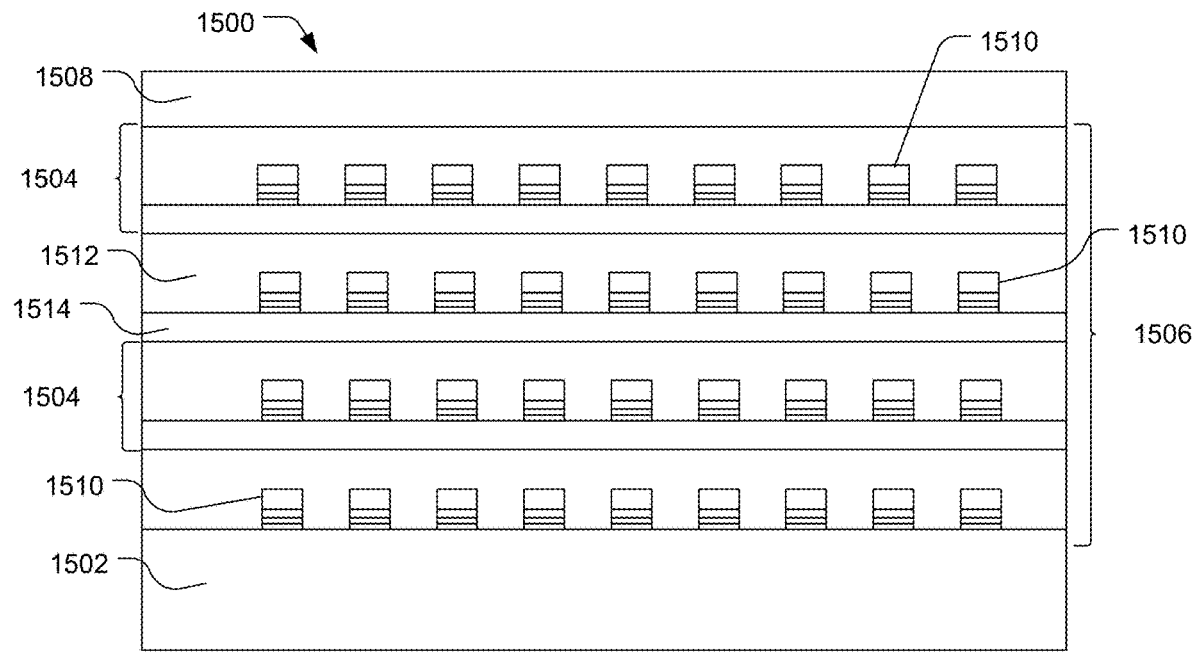
FIG. 15 and FIG. 16 include illustrations of an example portion of a detection system.

In a further example illustrated in FIG. 15, the system 1500 can include a plurality of array's stacked on top of one another. For example, the arrays 1504 of radiation detection devices 1510 can be formed over the substrate 1502. Each of the arrays 1504 includes an array of gate stacks of the detection devices 1510 formed over a silicon layer 1514, such as a monocrystalline silicon or a polysilicon layer, and surrounded on three sides with a radiation reactive material 1512. The arrays 1504 are then formed on top of one another to form a stack 1506. The stack 1506 can include at least two arrays, such as between 3 and 100 arrays, such as 3 to 50 arrays, or 3 to 10 arrays. The silicon layer 1514 can have a thickness in a range of 50 nm to 1 micrometer, such as a thickness in a range of 50 nm to 500 nm, or a thickness in a range of 100 nm to 500 nm.

For example, after a lower array is formed, a further silicon layer can be deposited over the radiation reactive material and an additional set of gate stacks can be formed over the silicon layer. The gate stacks are then surrounded by the radiation reactive material and a further silicon layer can be deposited above the radiation reactive layer. One or more metal layers 1508 can be formed over the stack 1506 and interconnects can be formed as the stack is formed to connect with the metal connections of the metal layers 1508.

In particular, each of the radiation detection devices 1510 can be configured to form two charge carrying regions.

In an alternative example, each array can be formed on a separate substrate. The arrays can then be stacked and electrically connected to one another or to circuitry on a substrate. For example, each array can include through vias connected to a solder ball grid array. In another example, each array can be wired to connections on a separate substrate.

Figure 16:
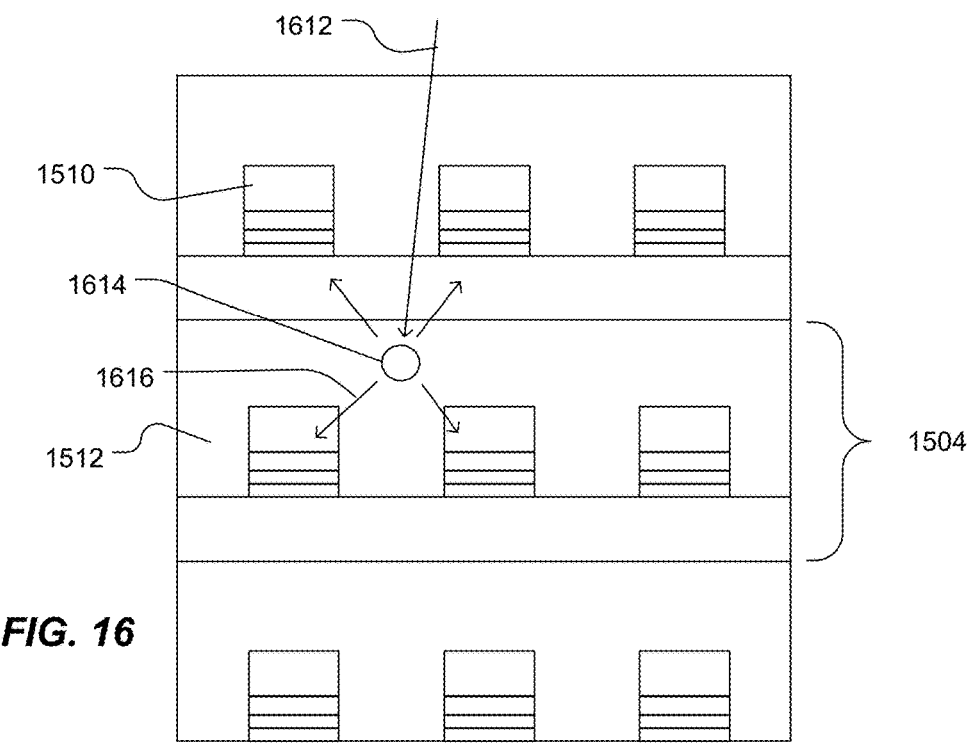

The stacking of layers provides for a greater likelihood that a neutron entering the system will interact with the nucleus of an atom within the radiation reactive material. Furthermore, when that interaction occurs, there is a greater likelihood that an alpha particle omission will traverse a charge carrying region of a radiation detection device. For example, as illustrated in FIG. 16, when a thermal neutron 1612 enters the system, it may interact with the nucleus of an atom 1614 within one of the radiation reactive material layers of one of the arrays 1504, resulting in an alpha particle 1616 emission. There is a greater likelihood that the alpha particle will traverse toward a charge carrying region of a radiation detection device when the device has a stack configuration. As such, there is a greater likelihood that the thermal neutron is detected.

Alternatively, the arrays 1504 can be formed separately. For example, thin arrays can be formed using layer splitting, such as through ion implant, for example, hydrogen implants. Such thin layers can be bonded together to form the system. Optionally the separate layers can be wire bonded to other circuitry or wireframes or can use ball interconnects to electronically address the arrays. The system can be encapsulated to secure the layers and prevent incursion of water vapor and other corrosive or disruptive materials.

In an example, each radiation detection device on each array within the stack can be individually addressable. Further, each source/drain can be individually addressable and optionally reversible, permitting measurement and storage of charge within two regions of each radiation detection device. For example, the system can include a word line for each gate structure and a bit line for each row of source/drains for each array within the stack of arrays.

Figure 17:
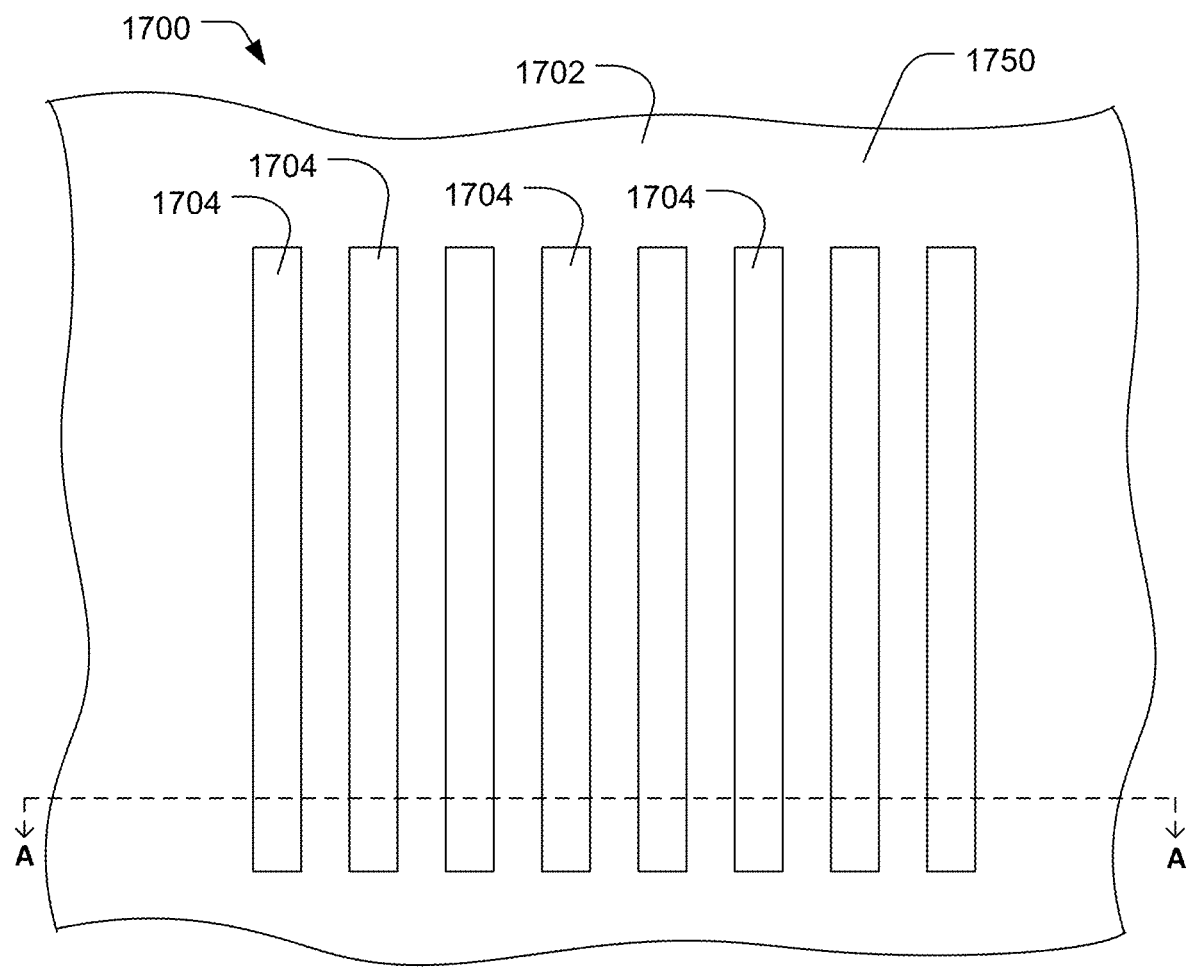
FIG. 17 includes a plan view illustration of a semiconductor workpiece.
Figure 18:
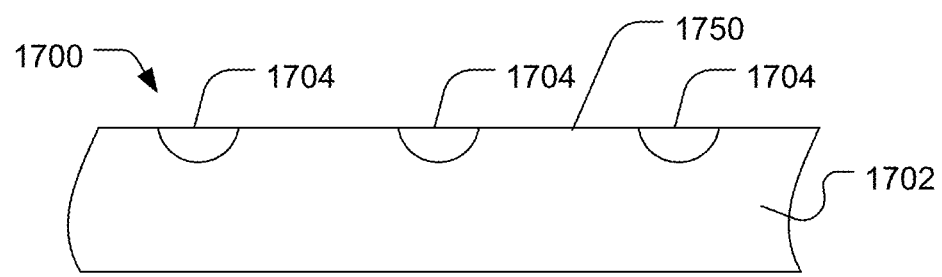
FIG. 18 includes an illustration of a cross-section of the semiconductor workpiece of FIG. 17.

In a further example, the charge storage structures can be in the form of continuous layers. FIG. 17 and FIG. 18 include illustrations of an example workpiece 1700. FIG. 18 depicts a cross-section A indicated in the plan view of FIG. 17. In an example, the workpiece 1700 includes a semiconductor substrate 1702. The substrate 1702 can be formed of silicon, such as monocrystalline silicon. In another example, the substrate can be formed from materials, such as a gallium arsenide. In an example, the substrate is formed as or doped to be a p-type substrate. Alternatively, the substrate can be doped to form an n-type substrate.

A set of source/drain implants can be formed as a plurality of rows 1704 within the substrate 1702. For example, when the substrate 1702 is a p-type substrate, and n-type implant can be used to form the source/drain implants. Example ions for n-type implants include phosphorus, arsenic, or antimony. Alternatively, the substrate can have an n-type configuration and the implants can be p-type implants, such as boron or indium ion implants. In particular, the implant ions can be selected for isotopes that can decay into alpha particles. For example, boron materials for forming ions to be implanted can have an isotope composition that is predominantly boron-10, with less boron-11.

In particular, the set of rows defined by the source/drain implants extend parallel to each other within a plane parallel to a plane defined by a top surface 1750 of the substrate 1702. In an example, masking layers can be formed over the substrate, establishing openings in a pattern that permits the formation of implants in the form of rows. Following implanting, the mask is removed, leaving the workpiece 1700 as illustrated in FIG. 17 and FIG. 18. In an example, the set of rows can include at least 3 rows. For example, the set of rows can include 3 rows, 4 rows, 8 rows, 16 rows, 32 rows, any number between these numbers, or more rows.

Figure 19:
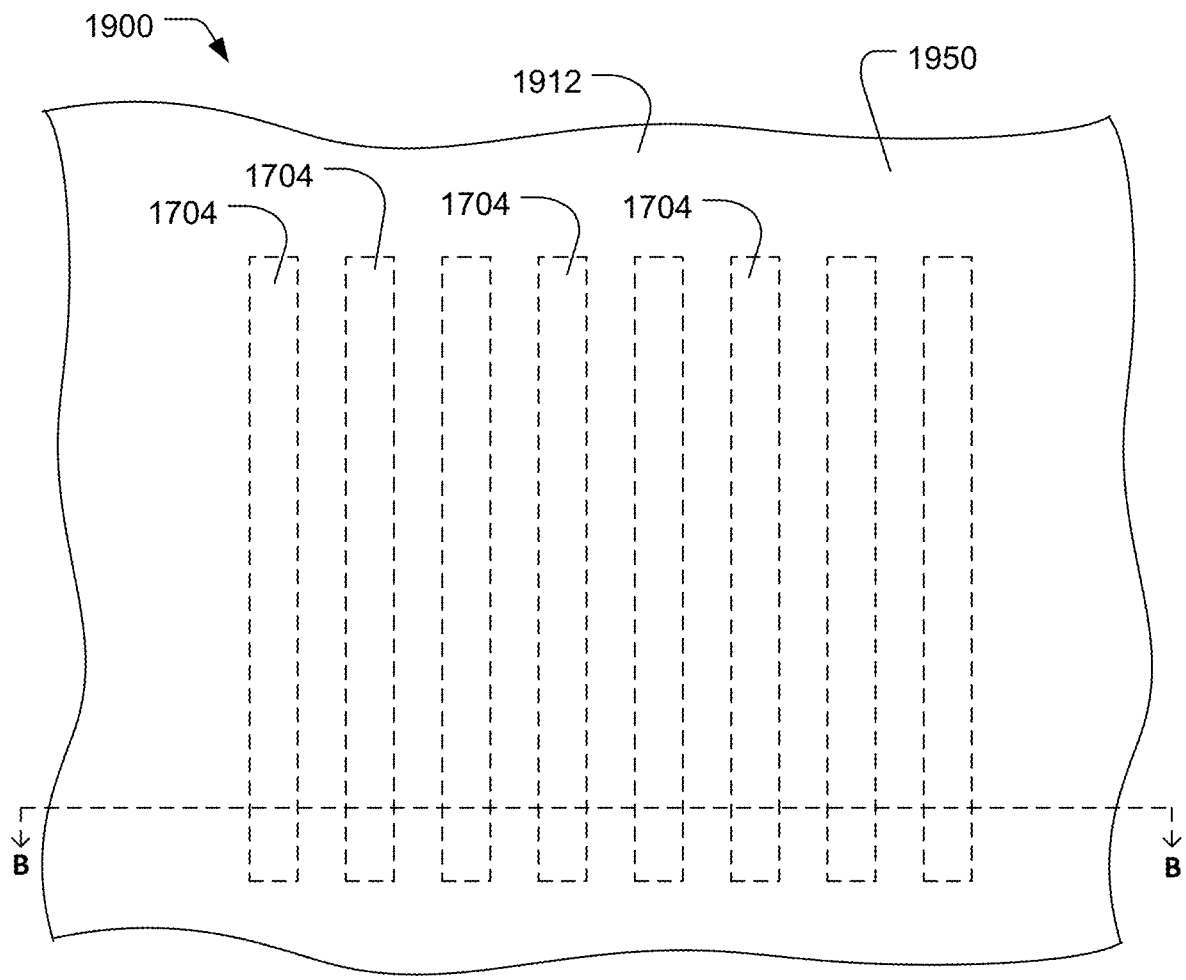
FIG. 19 includes an illustration of a plan view of an example workpiece.
Figure 20:
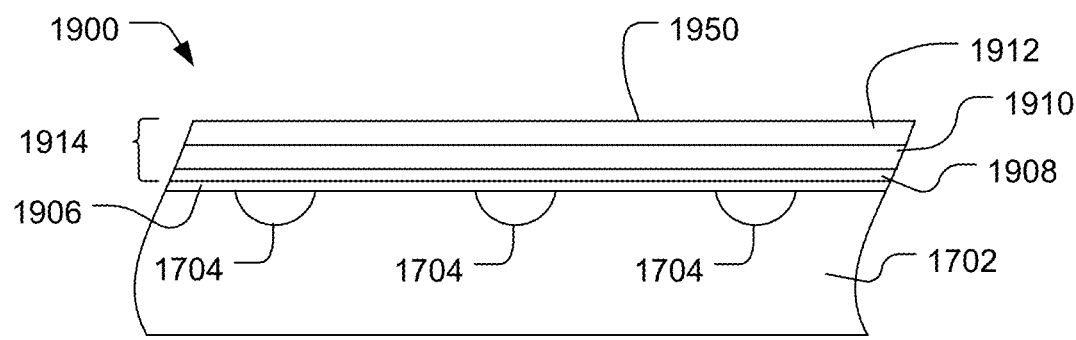
FIG. 20 includes a further illustration of a cross-section of an example workpiece of FIG. 19.

A charge storage structure can be formed over the substrate 1702. For example, FIG. 19 and FIG. 20 include illustrations of a workpiece 1900 after subsequent processing. FIG. 20 includes an illustration of the cross-section at cut B of FIG. 19. A continuous charge storage structure 1914 can be formed over the semiconductor substrate 1702. In an example, the charge storage structure 1914 is formed directly over or in direct contact with top surface of the substrate 1702, for example, without intervening layers. Alternatively, one or more layers can be disposed between the charge storage structure 1914 and the substrate 1702. For example, a native oxide layer 1906 can be disposed between the charge storage structure 1914 and the substrate 1702.

The charge storage structure 1914 can include a plurality of continuous layers that extend over the set of source/drain implants forming rows 1704 within the substrate 1702. In particular, the layers of the charge storage structure 1914 extend within a plane parallel to the top surface 1750 of the semiconductor substrate 1702 and over each row of the set of source/drain row implants 1704.

The charge storage structure 1914 can be formed of at least three layers. For example, the charge storage structure 1914 can include a first silicon oxide layer 1908. A silicon nitride layer 1910 can be disposed over and in direct contact with the silicon oxide layer 1908. In addition, a silicon oxide layer 1912 can be formed over and in direct contact with the silicon nitride layer 1910. In an example, the charge storage structure 1914 is formed by applying an oxide of silicon layer 1908 over the semiconductor layer 1702 using low-pressure chemical vapor deposition (LPCVD) in an oxygen-rich atmosphere. In particular, the oxide may be deposited using low-pressure chemical vapor deposition (LPCVD) of silane and nitrous oxide in a nitrogen atmosphere. The nitride layer 1910 can also be deposited using low-pressure chemical vapor deposition (LPCVD) using hexamethyldisiloxane and ammonia gas. A silicon oxide or oxynitride layer 1912 can be grown over the nitride layer 1910, for example, in an oxidation furnace.

The charge storage structure 1914 can have a thickness in a range of 10 nm to 50 nm, such as a range of 10 nm to 30 nm. In particular, the oxide layer 1908 can have a thickness in a range of 0.5 nm to 5 nm, such as a range of 1 nm to 4 nm, or even a range of 1 nm to 3 nm. The nitride layer 1910 can have a thickness in a range of 3 nm to 10 nm, such as a range of 3 nm to 7 nm, or even a range of 4 nm to 6 nm. In a further example, the oxide layer 1912 can have a thickness in a range of 2 nm to 20 nm, such as a range of 3 nm to 15 nm, or even a range of 5 nm to 10 nm.

Figure 21:
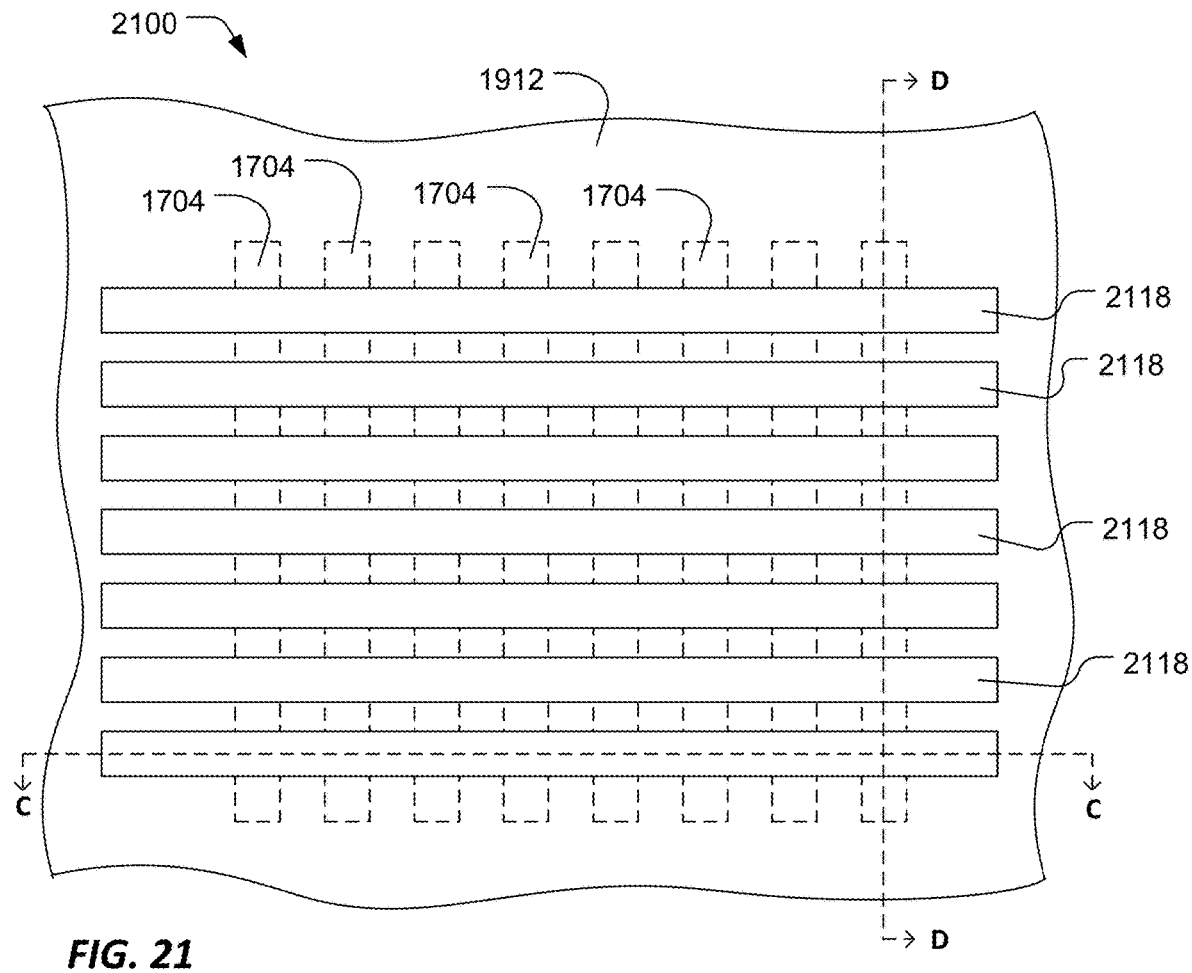
FIG. 21 includes a plan view illustration of an example workpiece.
Figure 22:
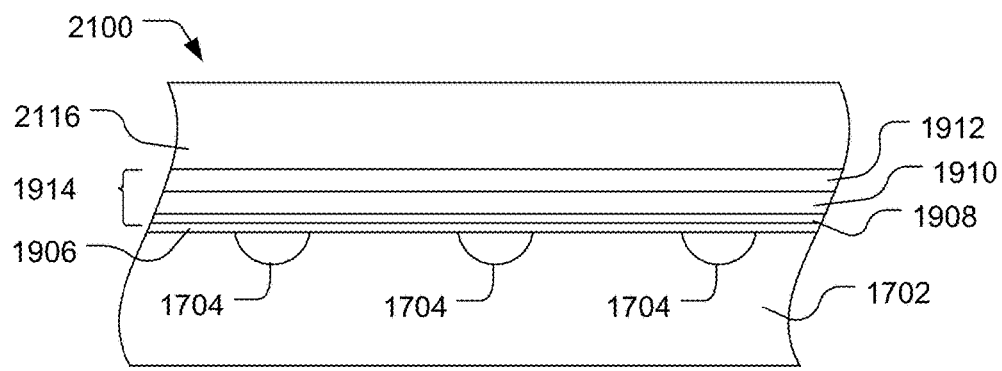
FIG. 22 includes an illustration of a cross-section of the workpiece of FIG. 21.

FIG. 21 and FIG. 22 include illustrations of a further workpiece 2100. A gate material 2116 can be deposited over a top surface 1950 (FIG. 19) of the continuous charge storage structure 1914. The gate material 2116 can be patterned into gate stacks in the form of gate columns 2118. In an example, the gate columns 2118 extend horizontally in a plane parallel to an upper surface 1750 of the substrate 1702 and the upper surface 1950 of the charge storage structure 1914 and extend perpendicular to the orientation of the source/drain rows 1704.

In an example, the gate material 2116 can include polycrystalline silicon, such as a doped polycrystalline silicon. For example, the polycrystalline silicon can be doped with phosphorous. The polycrystalline silicon can be deposited using CVD, LPCVD, or PECVD. In an example, the thickness of the gate material layer 2116 is in a range of 10 nm to 250 nm, such as a range of 20 nm to 220 nm, or even a range of 50 nm to 200 nm.

Figure 23:
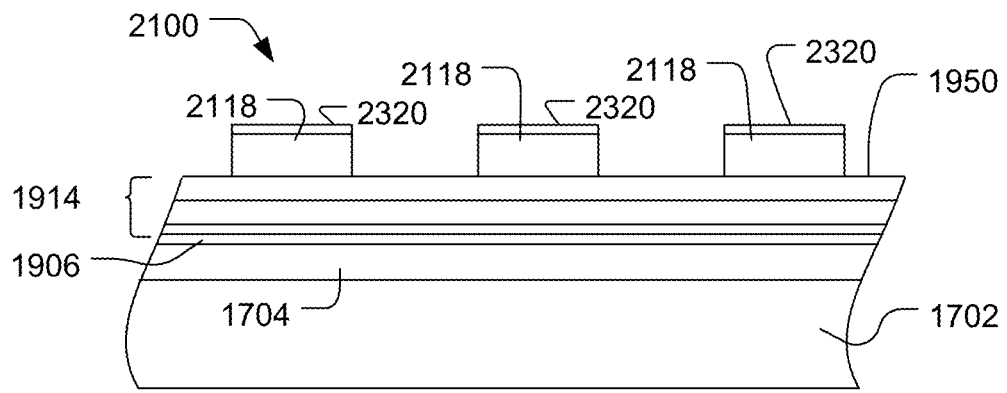
FIG. 23, FIG. 24, and FIG. 25 include cross-sections of example workpieces.

Optionally, a top surface of the gate columns 2118 can be treated to form a silicide 2320 (FIG. 23). A silicide forming metal, such as cobalt, nickel, rhenium, ruthenium, palladium, or a combination thereof, can be deposited by sputtering to a thickness in a range of 5 nm to 30 nm, followed by rapid thermal annealing.

FIG. 23 illustrates the gate stacks 2118 and optional silicide layer 2320 when viewed from the cross-section at cut D of FIG. 21. As illustrated, the gate stacks expose regions of the top surface 1950 of the continuous charge storage structure 1914.

Figure 24:
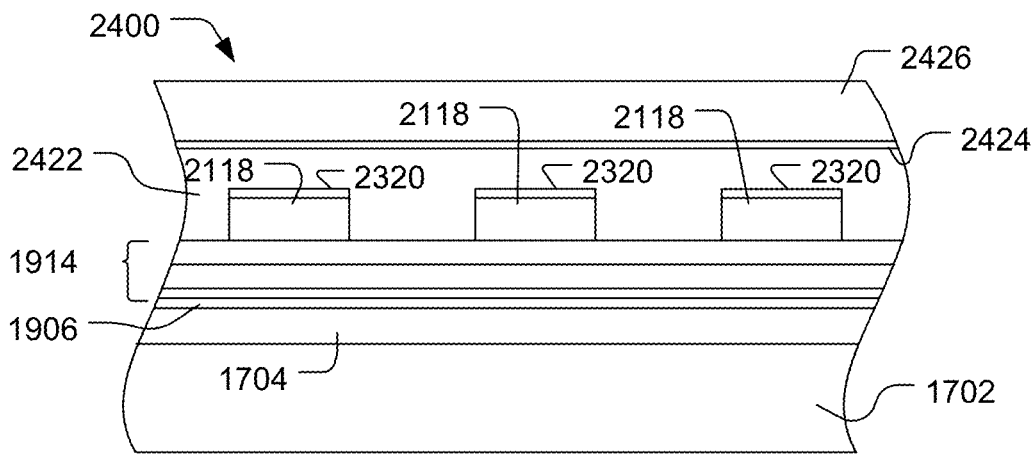
Figure 25:
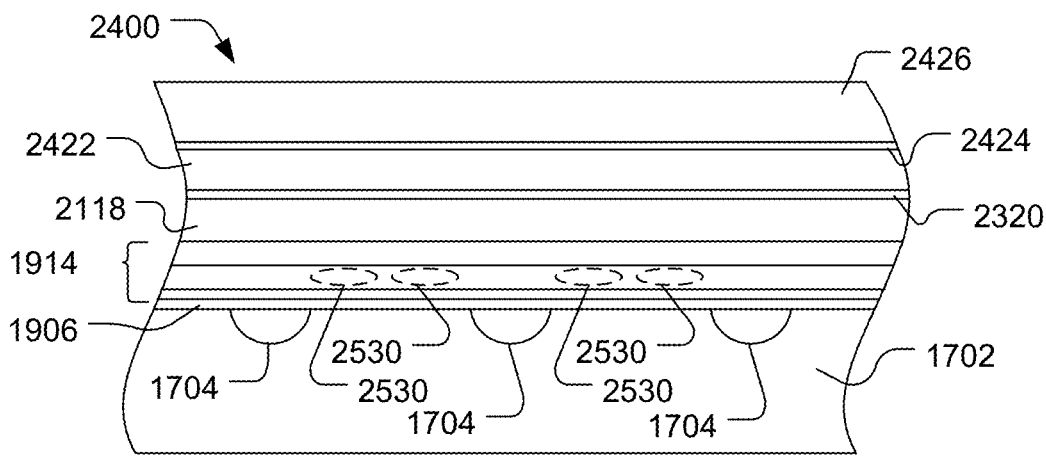

Turning to FIG. 24 (cut D orientation) and FIG. 25 (cut C orientation), in the workpiece 2400, a radiation reactive layer 2422 can be formed over the gate columns 2118 and the charge storage structure 1914, such as over a top surface 1950 of the silicon oxide layer 1912. In particular, the radiation reactive layer 2422 extends over at least three sides of the gate columns 2118 and across the exposed surface 1950 of the continuous silicon oxide layer 1912 of the charge storage structure 1914. Optionally, the gate columns can have silicon oxide sidewalls (not illustrated) or silicon nitride spacers (not illustrated). In particular, the radiation reactive layer 2422 acts as an interlayer dielectric.

In particular, the radiation reactive layer 2422 can be formed from a radiation reactive material. For example, the radiation reactive material can include an atomic composition that decomposes in response to thermal neutrons and produces an alpha particle. The alpha particle can interact with the charge storage regions 2530 of the charge storage structure 1914, allowing detection of a radiation event. The radiation reactive material can include a radiation reactive component boron-10 ($^{10}$B), lithium-6 ($^{6}$Li), cadmium-113 ($^{113}$Cd), gadolinium-157 ($^{157}$Gd), uranium-235 ($^{235}$U), or a combination thereof. The radiation reactive material can be an oxide, nitride, carbide, silicide, oxynitride, or a combination thereof including the radiation reactive component. For example, the radiation reactive material can be an oxide of boron, a nitride of boron, or a carbide of boron. In a particular example, the radiation reactive material is an oxide of boron, such as $B_2O_3$.

The radiation reactive material can be formed using chemical vapor deposition (CVD), low pressure chemical vapor deposition (LPCVD), plasma enhanced chemical vapor deposition (PECVD), other techniques, or any combination thereof.

The radiation reactive material can include the radiation reactive component (e.g., a radiation reactive isotope of an element) along with non-radiation reactive isotopes of the element. In an example, the radiation reactive component is included in an enriched amount of at least 50%, expressed as a percentage of atoms relative to the total of all the isotopes of the related element. For example, the radiation reactive component can be included in an amount of at least 70%, such as at least 80%, or even at least 90%, such as approximately 100%. In a particular example, the radiation reactive material includes boron-10 in an amount of at least 50%, such as at least 70%, at least 80%, at least 90% or at least 99%.

In an example, the radiation reactive material can include borosilicate glasses, boron-doped phosphosilicate glass, or a boron ceramic material, such as boron oxide, boron nitride, boron carbide, or a combination thereof. In an example, the radiation reactive material includes a phosphosilicate glass that is selectively implanted with boron-10 after the phosphosilicate glass is formed by chemical vapor deposition (CVD). In particular, the radiation reactive material is a boron ceramic, such as boron oxide, boron nitride, boron carbide, or a combination thereof. For example, the radiation resistant material is boron oxide. In another example, the radiation resistant material is boron nitride. In a further example, the radiation resistant material is boron carbide.

A barrier layer 2424 can be formed over the radiation reactive layer 2422. In addition, one or more metallization layers 2426 can be formed over the radiation reactive layer 2422. Such metallization layers 2426 can be used to provide electrical communication between interconnects that connect to source/drain implants or gate columns. Interconnects (not illustrated) to provide access to source/drain rows or gate columns can be formed throughout the process and connected to the metallization layers 2426. Dielectric material within a surrounding metal tracings of the metallization layer can be formed of the radiation reactive material.

In a particular embodiment, the charge storage structure 1914 can be used along with the source/drain rows 1704 and the gate columns 2118 to form radiation detection devices. In an example, the charge storage structure 1914 forms a charge storage region 2530 disposed between rows of the source/drain implants. In a particular example, the charge storage structure 1914 can define two charge storage regions 2530 disposed between each pair of source/drain row implants 1704 where they intersect with a gate column 2118, for example, at cut C illustrated in FIG. 21.

In practice, activation of a gate column with a high voltage and activation of a source/drain row as a drain introduces charge into a charge storage region 2530 of the charge storage structure 1914 closest to the drain. Activation of the same gate column and activation of a source/drain pair (activation of adjacent source/drain rows with different charges) allows reading of the charge storage region 2530 in the charge storage structure 1914 closest to the source.

Figure 26:
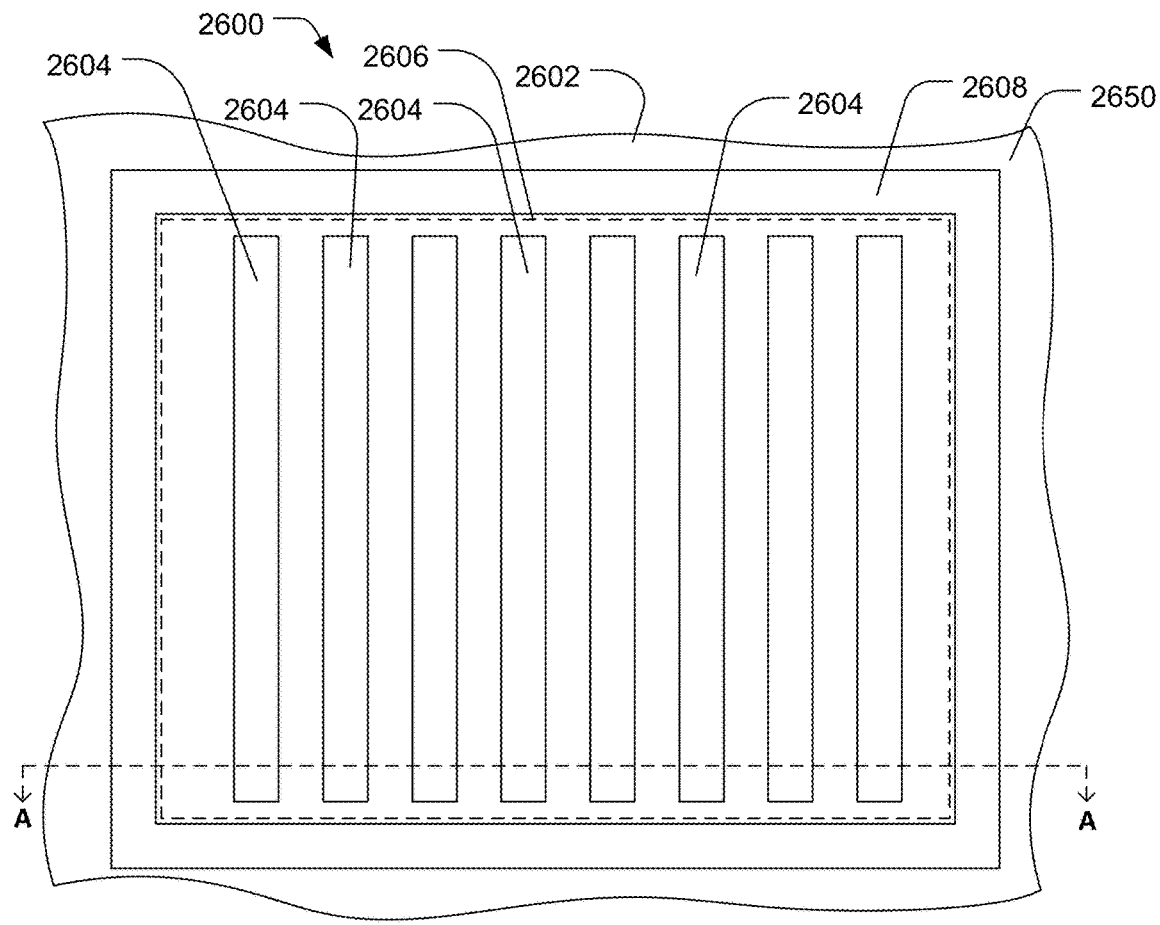
FIG. 26 includes an illustration of a plan view of an example workpiece.
Figure 27:
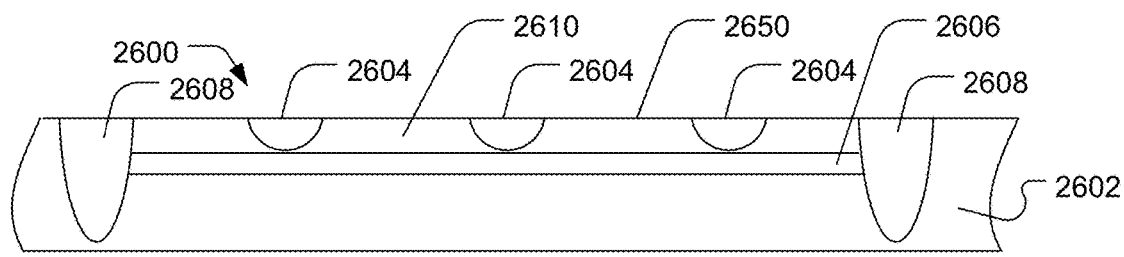
FIG. 27 includes an illustration of a cross-section view of the example workpiece of FIG. 26.

Optionally, the radiation detection array can be formed in a region of a substrate isolated from other arrays or other circuitry. For example, the array can be formed over a region of the substrate surrounded by a dielectric trench and optionally formed over a buried dielectric layer. As illustrated in FIG. 26, a workpiece 2600 includes a substrate 2602 including a dielectric trench 2608 and optionally a buried dielectric layer 2606 (see FIG. 27). A semiconductor material 2610 is disposed within the bound of the dielectric trench 2608 and optionally over the buried dielectric layer 2606. Source/drain implants 2604 are formed in the semiconductor material 2610 formed within the bounds of the dielectric trench 3608 and over the buried dielectric layer 2606. Charge storage structures and gate columns can be formed over the surface 2650 of the workpiece 2600, for example, as described in relation to FIGS. 17-25.

Figure 28:
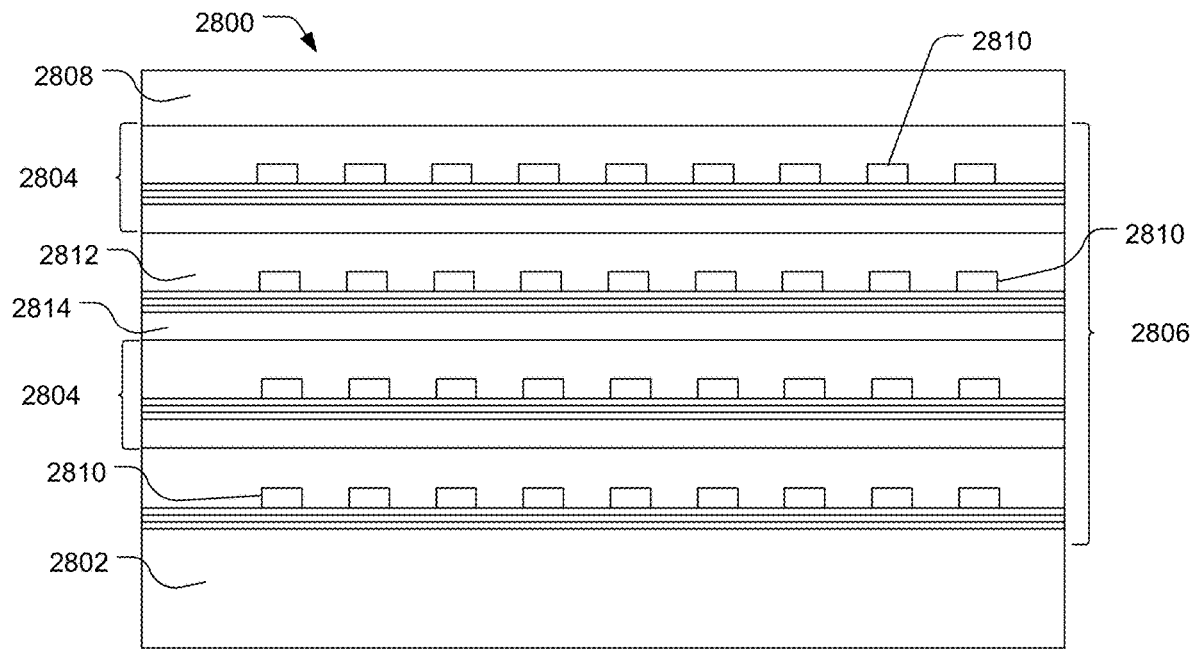
FIG. 28 and FIG. 29 include illustrations of an example portion of a detection system.

In a further example illustrated in FIG. 28, the system 2800 can include a plurality of arrays stacked on top of one another. For example, the arrays 2804 of radiation detection device 2810 can be formed over the substrate 2802. Each of the arrays 2804 includes an array of gate stacks of the detection devices 2810 formed over a silicon layer 2814, such as a monocrystalline silicon or a polysilicon layer, and surrounded on three sides with a radiation reactive material 2812. The detection devices 2810 can include a continuous charge storage layers and a gate column formed over the continuous charge storage layers. The arrays 2804 are then formed on top of one another to form a stack 2806. Alternatively, the arrays 2804 can be formed on separate substrates and stacked following formation, as described above in relation to FIG. 15.

The stack 2806 can include at least two arrays, such as between 3 and 100 arrays, such as 3 to 50 arrays, or 3 to 10 arrays. The silicon layer 2814 can have a thickness in a range of 50 nm to 1 micrometer, such as a thickness in a range of 50 nm to 500 nm, or a thickness in a range of 100 nm to 500 nm.

For example, after a lower array is formed, a further silicon layer can be deposited over the radiation reactive material and an additional set of gate stacks can be formed over the silicon layer. The gate stacks are then surrounded by the radiation reactive material and a further silicon layer can be deposited above the radiation reactive layer. One or more metal layers 2808 can be formed over the stack 2806 and interconnects can be formed as the stack is formed to connect with the metal connections of the metal layers 2808. In particular, each of the radiation detection devices 2810 can be configured to form two charge carrying regions.

Figure 29:
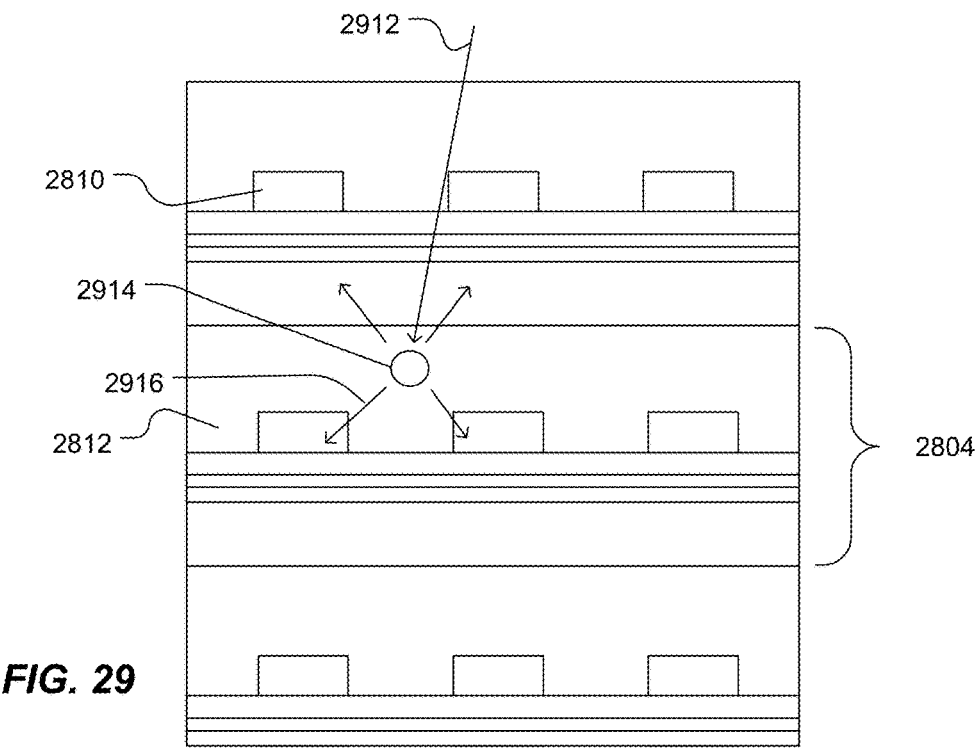

The stacking of layers provides for a greater likelihood that a neutron entering the system will interact with the nucleus of an atom within the radiation reactive material. Furthermore, when that interaction occurs, there is a greater likelihood that an alpha particle omission will traverse a charge carrying region of a radiation detection device. For example, as illustrated in FIG. 29, when a thermal neutron 2912 enters the system, it may interact with the nucleus of an atom 2914 within one of the radiation reactive material layers of one of the arrays 2804, resulting in an alpha particle 2916 emission. There is a greater likelihood that the alpha particle will traverse toward a charge carrying region of a radiation detection device when the device has a stack configuration. As such, there is a greater likelihood that the thermal neutron is detected.

Alternatively, the arrays 2804 can be formed separately. For example, thin arrays can be formed using layer splitting, such as through ion implant, for example, hydrogen implants. Such thin layers can be bonded together to form the system. Optionally the separate layers can be wire bonded to other circuitry or wireframes or can use ball interconnects to electronically address the arrays. The system can be encapsulated to secure the layers and prevent incursion of water vapor and other corrosive or disruptive materials.

In an example, each radiation detection device on each array within the stack can be individually addressable. Further, each source/drain can be individually addressable and optionally reversible, permitting measurement and storage of charge within two regions of each radiation detection device. For example, the system can include a word line for each gate structure and a bit line for each row of source/drains for each array within the stack of arrays.

Figure 30:
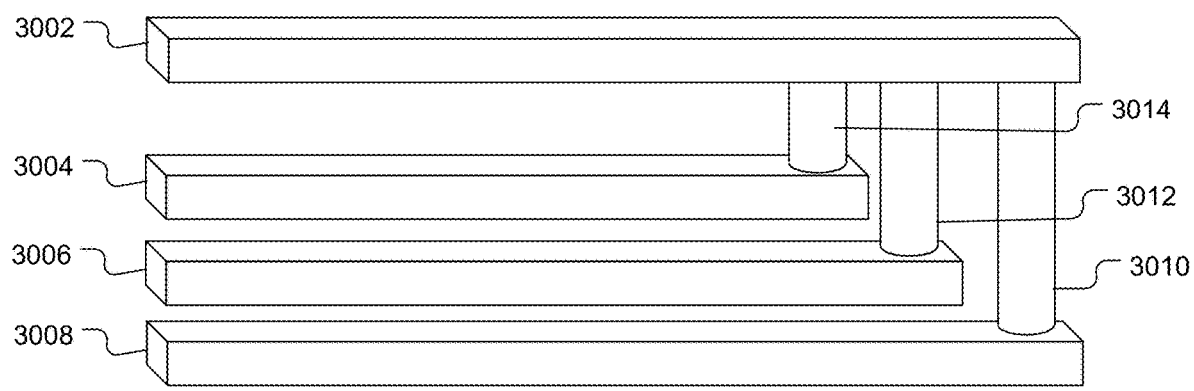
FIG. 30 includes an illustration of an example configuration of circuitry for a detection system.

In another example, a single word line can be attached to a gate in each stack. For example, as illustrated in FIG. 30, a word line 3002 can be connected to a gate in each of the illustrated three vertically stacked arrays. For example, the word line 3002 can be connected to a gate 3004 using an interconnect 3014 in an upper array, can be connected by an interconnect 3012 to a gate 3006 in a middle array, and can be connected using an interconnect 3010 to a gate 3008 in a lower array of the stack. By connected each array within a stack to the same set of word lines, the amount of word lines can be reduced and interference by the metallization layers can be reduced. Each device on each layer can still be individually addressable based on activation of the source/drains. Alternatively, a bit line for a source/drain line can be connected to a source/drain line in each of the arrays of the stack. Word lines uniquely associated with each gate of each array can be used to individually address each of the radiation reactive devices.

By being individually addressable, the system can provide a degree of spatial granularity. In an example, the system can be used for imaging in which the arrays of detection device provide approximate spatial indication of the direction from which a detected neutron emanated. As such, each device with the stack of arrays can be read to determine whether an event was detected and the address and state of each can be used to form an image.

Figure 31:
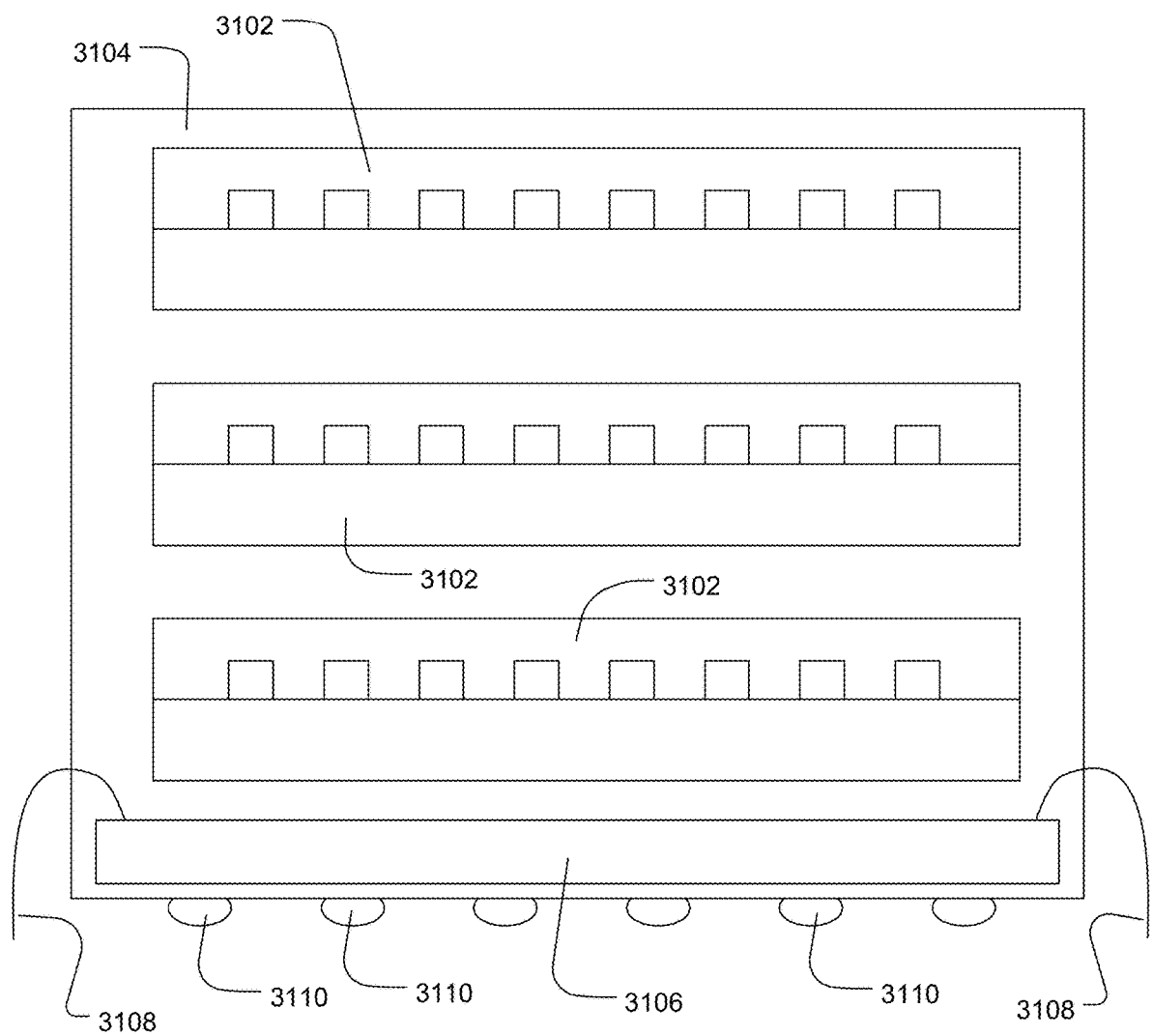
FIG. 31 includes an illustration of an example detection chip.

In a further example, a set of arrays can be formed on separate substrates and connected to a substrate incorporating circuitry, such as a read and write circuitry and input/output circuitry. For example, as illustrated in FIG. 31, a plurality of arrays 3102 can be connected to a circuitry on a separate substrate 3106. The arrays 3102 can be stacked and connected to one another, for example, with a ball grid array. Alternatively, the arrays 3102 can be wire bound to the substrate 3106 or to another array 3102. The arrays 3102 and the substrate 3106 can be encapsulated with encapsulant 3104 and provided with connections. For example, the substrate 3106 can include a ball grid array 3110 or wire connections 3108.

In an example, the system can be set up to provide an indication as to whether radiation is present or provide a number of events that have occurred on the system. In such a case, the state of each radiation detection device within the within each array of the stack is less relevant to an end user. Instead, a summary of the number of detected events provides an indication as to whether radiation source is present or the radioactivity of such a source. As such, the system can test the value of a word comprising bit values each associated with the state of a radiation detection device, to determine whether an event has occurred. The value of the word, along with other values of other words can be used to determine a number of detected events and a likelihood that a radiation source is present.

Figure 32:
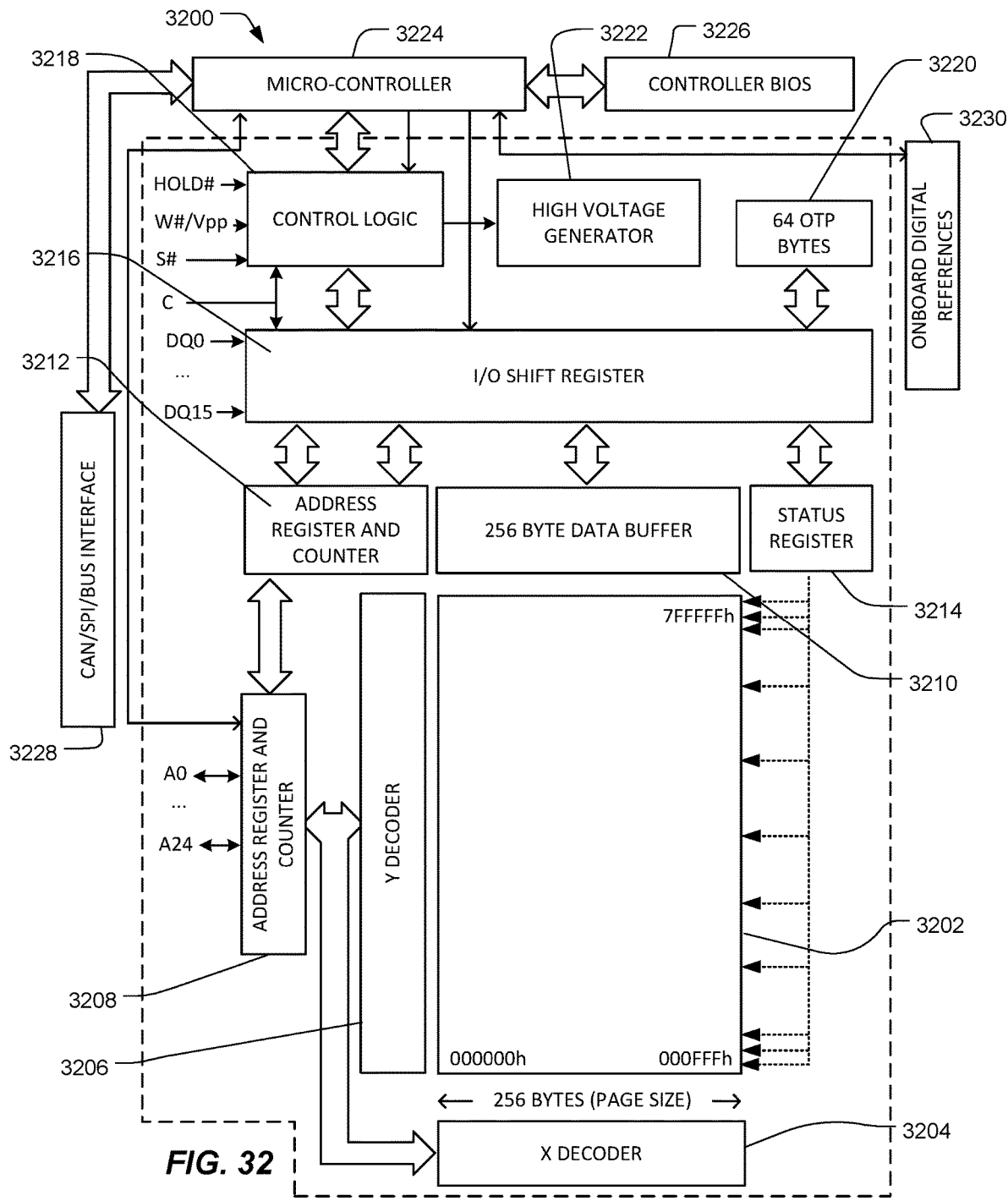
FIG. 32 includes an illustration of an exemplary detection system.

An array or set of arrays of radiation detection devices can be arranged with buffers, registers, and controllers to read and reset the radiation detection devices of the arrays. For example, FIG. 32 illustrates a radiation detection system 3200. The radiation detection system 3200 includes an array or a set of arrays 3202 of radiation detection devices. The radiation detection devices can be addressed or accessed using one or more X-decoders 3204 and one or more Y-decoders 3206. The one or more X-decoders 3204 can activate bit lines that are connected to source/drain lines of an array 3202. The one or more Y-decoders 3206 can activate word lines that are connected to gate lines of the array 3202.

In an example, each of the arrays of a set of arrays can be uniquely associated with an X-decoder 3204 and a Y-decoder 3206. Alternatively, an X-decoder 3204 can control each array of a set of arrays. In particular, example, a single bit line can be connected to a source/drain in each array of the set of arrays. In such an example, each array of the set of array's may be associated uniquely with a separate Y-decoder 3206 or the Y-decoder 3206 may individually address each word line connected uniquely with a gate in an array of the set arrays.

Alternatively, a single Y-decoder 3206 can access each of the arrays of the set of arrays. In an example, a single word line can be interconnected with a gate line in each of the arrays of the set of arrays, for example, as illustrated in FIG. 30. In such an example, each array of the set of arrays can be uniquely associated with a separate X-decoder 3204 or an X-decoder 3204 can individually address each source/drain line in each array of the set of array's.

When the detector array 3202 includes devices having two charge storage regions and the source/drain can be reversed, i.e., function as a source at one time and function as a drain at another time, both charge storage regions can be read. When the charge in one charge storage region is high and the adjacent source/drain is a source, current through the radiation detection device is low, referred to herein as the "0" state. When the charge in the charge storage region is below a threshold and the adjacent source/drain is a source, current passes through the radiation detection device, referred to herein as the "1" state.

The system 3200 can include an address register 3208 to provide addresses to the one or more Y-decoders 3206 and the one or more X-decoders 3204 to access radiation detection devices on the radiation detection array or set of arrays 3202. As the radiation detection devices of the array 3202 are read, the data can be provided to the buffer 3210 from the arrays 3202 as a word, and the address can be provided to an address register and counter 3212 from the address register 3208.

In addition, a status register 3214 can indicate a status of the word stored in the buffer 3210. Unlike a memory system, there is no write operation involving writing a word to the radiation detection array. As such, the data may move in one direction. The word may indicate the location of one or more radiation detection devices to reset. Unlike a write operation, only a selected bit is reset to a desired charge or "0" state. Thus, a bit within a word have a "1" state indicates the location of a radiation detection device to reset to a "0" state. The system 3200 can further reset an individual radiation detection device. For example, the system 3200 does not reset all radiation detection devices within a word that is non-zero, instead accessing the individual radiation detection device that has a non-zero state. Further the resetting operation may not clear or lower the charge on the radiation detection device before increasing the charge to provide a "0" state, instead only adding charge to return the radiation detection device to the "0" state.

The address register 3212, data buffer 3210, and status register 3214 interact with and provide information into the shift register 3216. Generally, the array 3202 is set to zero ("0") state. Thus, there is no data to read from the array 3202. In an example, the shift register 3216 receives information from the data buffer 3210 and the address register 3212 without writing data back to the address register 3212 and the data buffer 3210.

The system further includes control logic 3218 to facilitate reading radiation detection devices, transferring data between buffers, registers, and busses, and resetting radiation detection devices. The control logic 3218 further controls a high voltage generator 3222 that is used to generate voltages that are useful in controlling or resetting the radiation detectors. For example, higher voltages can be applied to gates and optionally source/drain lines to move charge into charge storage regions. The system can further include one-time programmable bytes 3220 to store configuration settings for use by the control logic 3218.

A microcontroller 3224 can access the controller bios 3226 for instructions and programs to be run on the microcontroller 3224. In an example, the microcontroller 3224 can interact with a bus interface 3228 to provide data generated by the system 3200 to external systems or apparatuses. In a further example, the microcontroller 3224 can provide addresses to the address register 3208 and can control the control logic 3218 and the shift register 3216.

In an example, the system 3200 further includes digital references 3230 that can be used by the microcontroller 3224, the control logic 3218 or other circuitry within the system 3200 to compare with readings from the arrays 3202. For example, the references can be used to differentiate a "1" state from a "0" state when compared to a current from a radiation detection device. In an alternative example, references can be stored within the arrays 3202. For example, the radiation detection devices within the arrays 3202 can serve as references.

In an example, the output from the microcontroller 3224 can be provided to the bus interface 3228 and can include the values and addresses of each of the radiation detection devices. Such values along with their addresses may be useful in developing an image. For example, a radiation source can be placed on one side of an object and directed towards or through the object or towards a sensor on another side of the object. Neutrons may pass by the object or through the object at different speeds, quantities, or attenuations, and thus are detected in different relative amounts. They provide data that can be reconstructed into an image of the object. In another example, an object may have a radioactive portion. For example, a nuclear fuel rod may include a radioactive core emitting thermal neutrons. The values of radiation detection devices along with their address may be used to reconstruct images indicative of the integrity of the nuclear fuel rod casing, for example, highlighting defects or damage.

In another example, the system can determine the number of radiation events detected or a likelihood of a radioactive source being in proximity to the system. For example, the microcontroller can provide a number of events per read cycle, a time averaged number of events, a total number of events detected, a binary value indicating that a radioactive source been detected, a percentage or scale indicating a likelihood that the radioactive devices in proximity, or the like.

Figure 33:
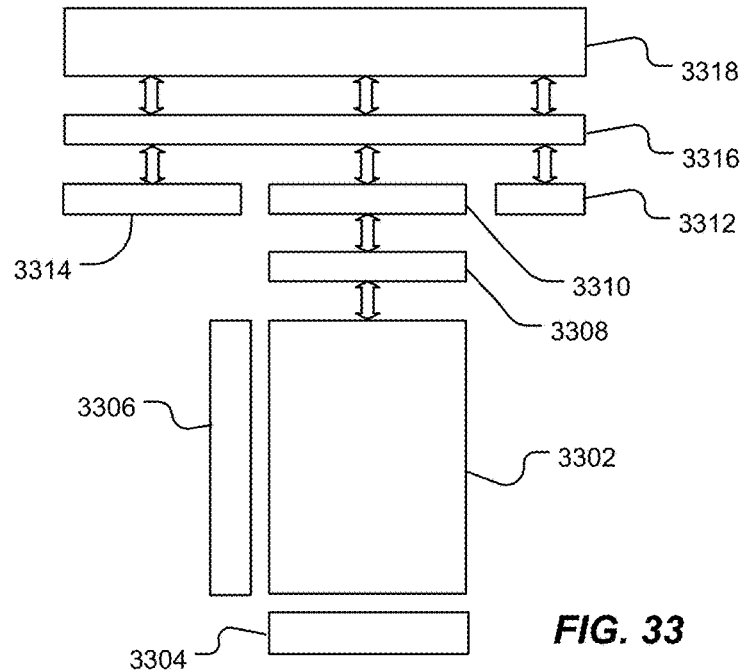
FIG. 33 includes an illustration of example circuitry for detecting radiation events.

In another example illustrated in FIG. 33, the system can further include logic circuitry to pretest data prior to it entering the buffer system or the shift register. For example, an array or set of arrays 3302 is access based on signals provided by one or more X-decoders 3304 and one or more Y-decoders 3306.

Values or output of the radiation detection devices is provided as words to a logic circuitry 3308. The logic circuitry can 3308 can, for example, determined that all of the values within the word are "0" and can discard the data prior to entering it into a buffer 3310. When one or more bits within the word are nonzero, the logic circuitry 3308 can permit the word and its associated address to be transferred to the buffer 3310 and the address register 3314. In addition, the status of the word can be updated in the status register 3312.

In another example, a logic circuitry 3316 can be provided between the buffer 3310 and the shift register 3318. For example, the logic circuitry 3316 can test values of each word and selectively allow words to pass into the shift register. For example, when all the bit values within a word are zero ("0"), the logic circuitry 3316 can discard the data and prevent it from passing to the shift register 3318. In another example, if one or more of the bit values within a word are nonzero, the logic circuitry 3316 can allow the word, the address, and status to pass into the shift register 3316.

The logic circuitry or circuitries can test words to determine their value using OR circuitry. In another example, the logic circuitry can utilize checksum algorithms where the expected value of all of the bits is zero. Example checksum algorithms include parity byte or parity word algorithms, sum complement algorithms, or position-dependent algorithms. An example parity byte algorithm includes the longitudinal parity check. Example position-dependent algorithms include cyclic redundancy checks. In particular, checksum algorithms that also provide an indication as to which bit in a word is nonzero, provide additional information that can be used to reset radiation detection devices associated with nonzero bit readings.

Figure 34:
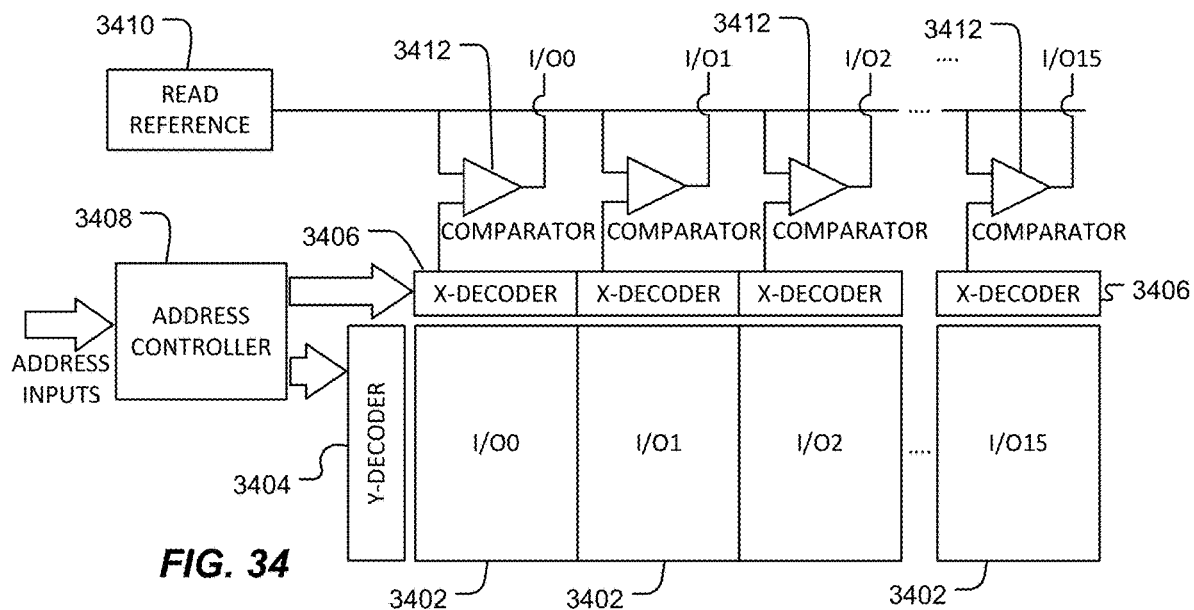
FIG. 34 and FIG. 35 include illustrations of example circuitry for detecting radiation events.

FIG. 34 includes an illustration of an example read circuitry. For example, bit regions 3402 are connected to a Y-decoder 3404 that activates one or more word lines extending across one or more bit regions 3402. The word lines are connected to gate lines within each of the bit regions 3402. X-decoders 3406 are associated with each of the bit regions 3402 and activate bit lines connected to source/drain lines. A radiation detection device within a bit region 3402 is activated at the intersection of the word line/gate line activated by the Y-decoder 3404 and the bit lines/source and drain lines activated by the X-decoder 3406. The address controller 3408 can provide the desired addresses to the Y-decoder 3404 and the X-decoders 3406.

The radiation detection device activated within each of the bit regions 3402 provides a reading to comparators 3412 and are compared to a reference signal 3410. The results of the comparator 3412 are provided as outputs or a bit of a word. In the illustrated example, a word has 16 bits (0-15). Alternatively, a word may include 32 bits, 64 bits, 128 bits, 256 bits, or more. Each bit is associated with a bit region 3402.

The output can be provided to the buffer or logical circuitry. In an example, each word can be tested to determine whether it includes nonzero bit values. In another example, the words along with the associated addresses can be provided to a buffer and a shift register to be read out through a data bus.

Figure 35:
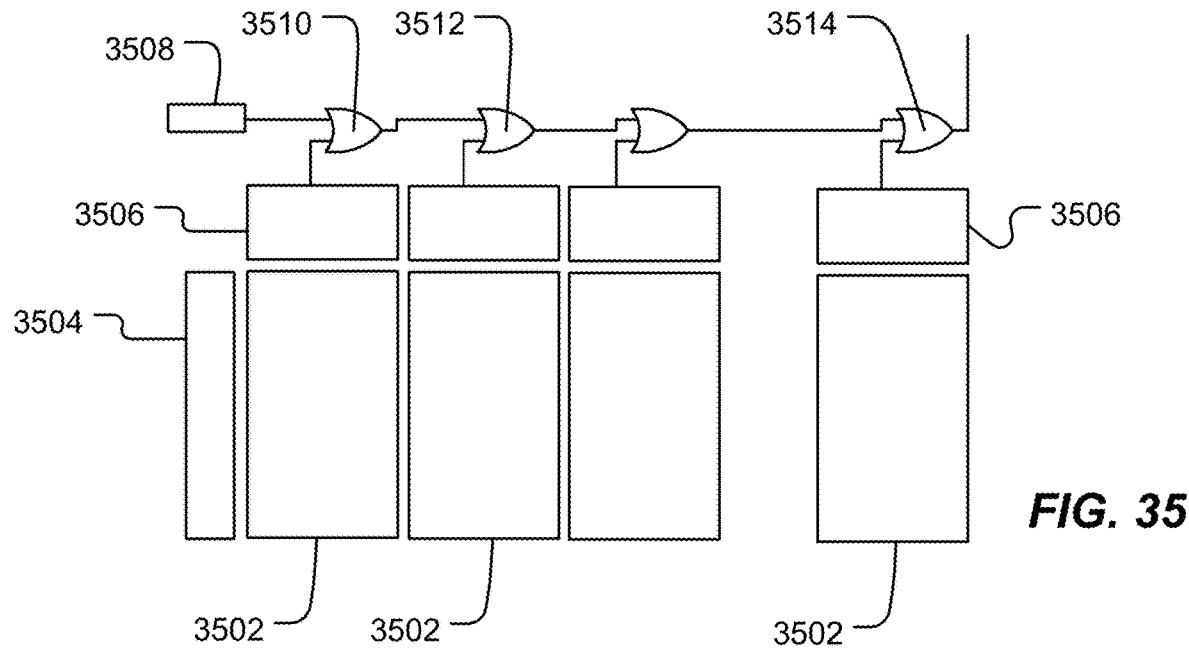

FIG. 35 illustrates another example of a read circuitry. When a radiation detection device within a bit region 3502 is activated based on the intersection of an activated word line from the Y-decoder 3504 and a source and drain pair activated by the X-decoder 3506, the values can be fed to an OR circuitry 3510 connected in series. For example, a reference value 3508 can be provided to OR circuitry 3510 for the first bit in a word, the output from the OR circuitry 3510 can be provided as an input to the OR circuitry 3512 associated with a second bit, etc. The output from the final bit OR circuitry 3514 is "0" when all of the bits have a "0" state and is "1" or nonzero when one or more the bits is "1" or nonzero.

In an example, the output can be used to determine whether to keep the data for further processing or discard the data. For example, when the reference value 3508 and each of the bit values are zero, the final output is zero, indicating that no radiation detection event occurred. On the other hand, when at least one of the bit values is nonzero, the output is nonzero. In a particular example, the output can be used to either permit the passing of data collected by the circuit illustrated in FIG. 33 to buffers or registers or discard the data. In another example, the final value can be used as an indicator showing the occurrence of an event and can be used by the system, for example, the microcontroller, to provide an indication that a radiation source has been detected. In particular, the detection of events can be aggregated and added to a counter over each read cycle or over a period of time to provide an indication that a radiation source has been detected.

Figure 36:
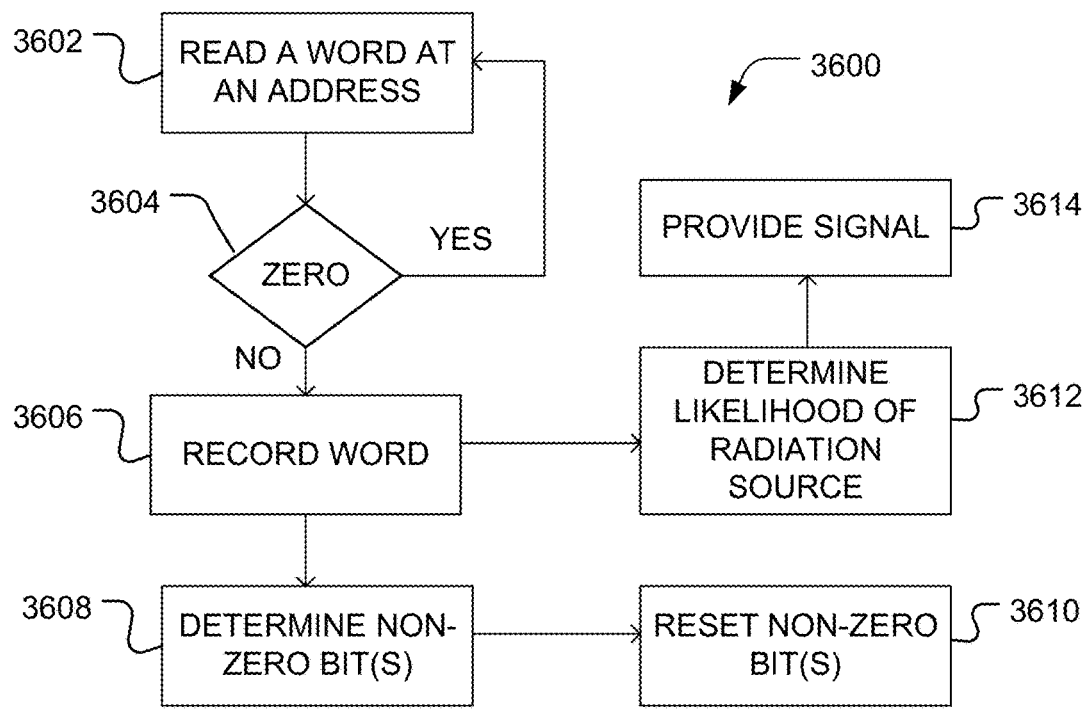
FIG. 36 includes a block flow diagram illustrating an example method for detecting radiation.

FIG. 36 illustrates an example method 3600 for utilizing output from the radiation detection devices. For example, as illustrated at block 3602, the system can read a word associated with a given address. The word consists of bits indicative of readings from individual radiation detection devices. In particular, the system can cycle through all of the addresses of the device, periodically testing each word to determine whether it carries a nonzero bit indicative of a radiation event.

For example, the system can test a word to determine whether the word has a zero value or does not include a nonzero bit, as illustrated at block 3604. For example, the system can include OR circuitry or latches, or can use algorithms, such as check sum algorithms, to determine whether the word includes a nonzero bit. When the word has a value of zero or does not include a nonzero bit, the system can then discard the word, read the next word, and repeat the process.

As illustrated at block 3606, when the word includes a nonzero bit or the word has a nonzero value, the system can record the word. For example, the system can provide the word to a buffer or a shift register for further calculations or to be passed through a bus off of the system.

As illustrated at block 3608, the system can review the nonzero word to determine which bits are nonzero bits. The system can use this information to reset any nonzero bits, as illustrated at block 3610. For example, the system can apply a reset voltage to a gate of a radiation detection device associated with a nonzero bit and activate the appropriate source and drain associated with that radiation detection device to return the radiation detection device to a zero state. For example, the system can transfer a charge within a desired voltage range to the charge storage region of the radiation detection device.

Further, as illustrated at block 3612, the system can use the recorded word to determine a likelihood that a radiation source is proximal to the array of radiation detection devices. For example, the likelihood can be determined based on a number of radiation events per read cycle, a time averaged number of events, a total number of events detected, a binary value indicating that a radioactive source been detected, a percentage or scale indicating a likelihood that a radioactive source is in proximity, or the like.

As illustrated at block 3614, the system can provide a signal based on determining the likelihood. For example, the signal can be sent via a bus to other components of a radiation detection apparatus. In particular, apparatuses incorporating the radiation detection system can utilize the signal to provide alerts or alarms to personnel, stop movement of conveyors or other transports, or store the data.

Figure 37:
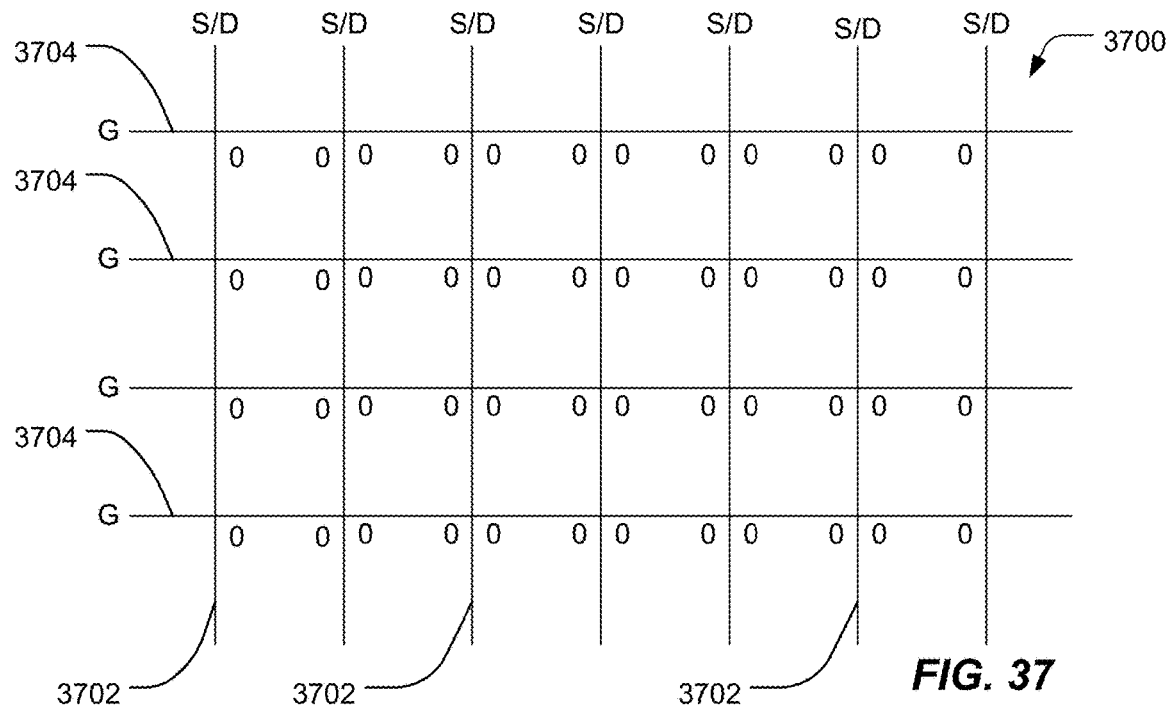
FIG. 37, FIG. 38, FIG. 39, FIG. 40, FIG. 41, and FIG. 42 include illustrations of example radiation detection arrays.

In a particular example, the radiation detection devices of an array include two charge storage regions. In an example illustrated in FIG. 37, the charge storage regions are disposed along a gate line. Reading the programming of each storage region depends on activation of a gate line and an associated source/drain pair. For example, FIG. 37 illustrates an array 3700 that includes source/drain lines 3702 and gate lines 3704.

Figure 38:
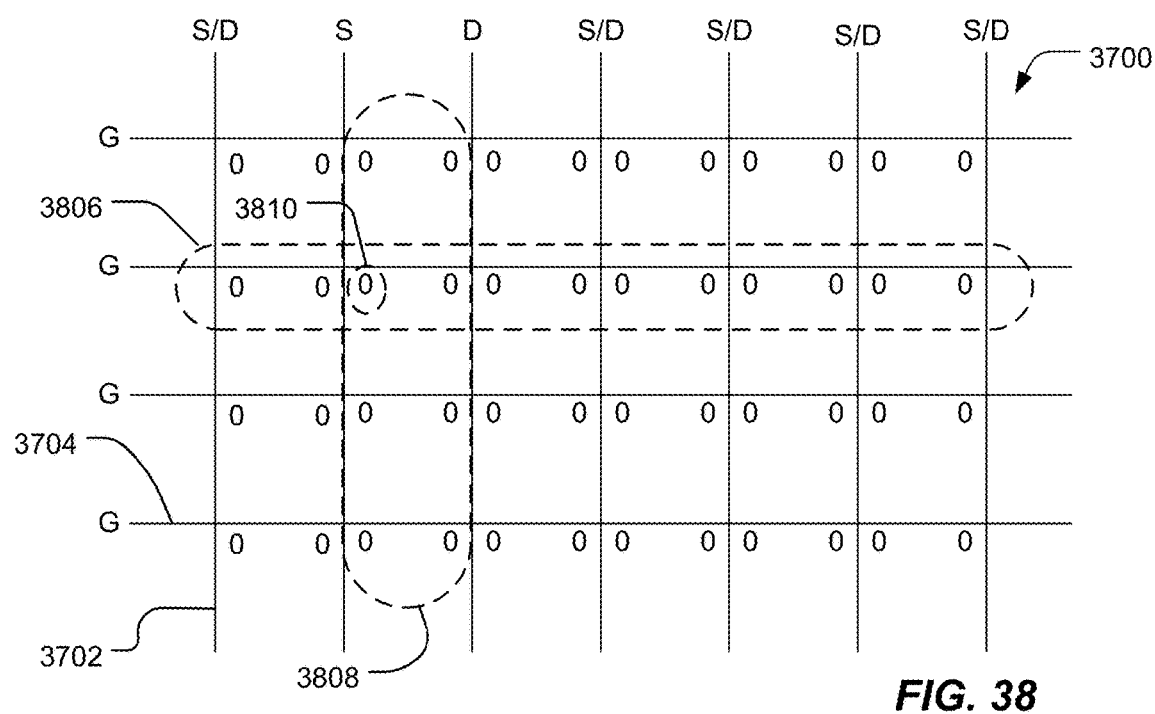

As illustrated in FIG. 38, to read the charge storage region 3810 of a radiation detection device within the array 3800, a gate 3806 is activated and a pair 3808 of source/drains are activated. The charge storage region 3810 closest to the source is read at the intersection of the activated gate 3806. If the source and drain are reversed, the other of the two charge storage regions associated with the radiation detection device intersecting the activated gate is read. To reprogram a disturbed charge storage region within a radiation detection device, the gate 3806 can be charged with a higher voltage and charge is transferred to the charge storage region closest to the drain of the source/drain pair 3808.

Figure 39:
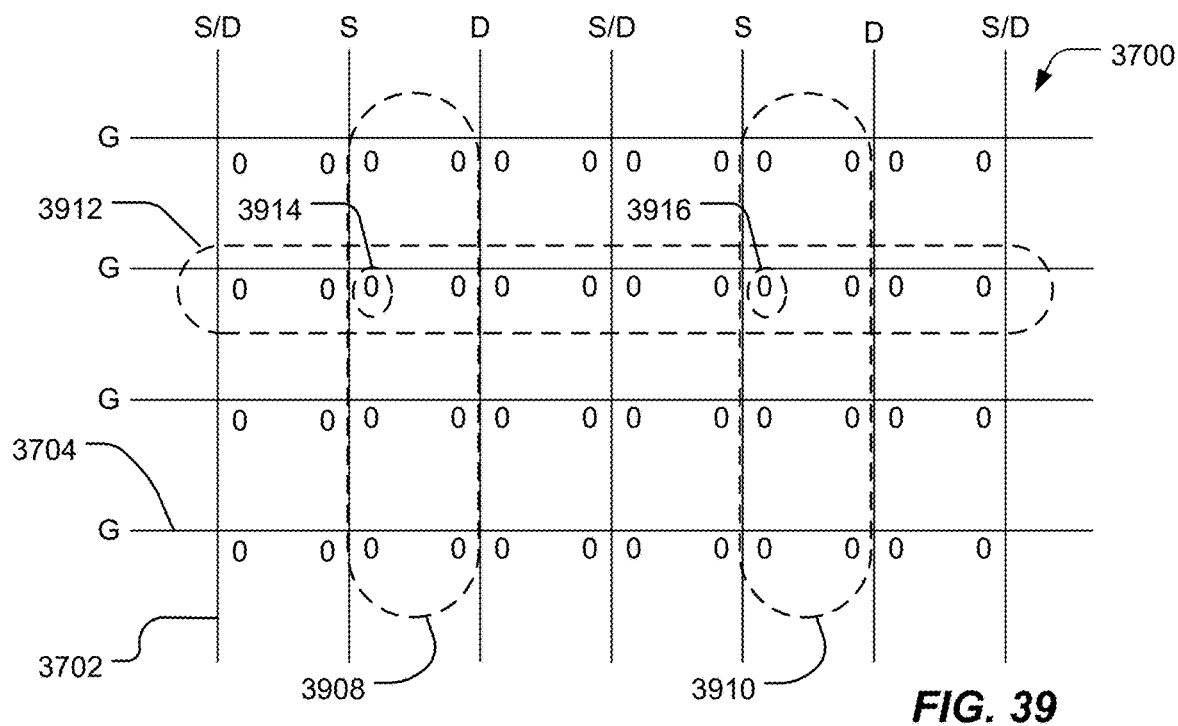

In a further example, values within the array can be utilized as references and compared to other values within the array, in contrast to utilizing an external reference. For example, as illustrated in FIG. 39, two sets of source/drain pairs (3908 and 3910) can be activated. The two devices along an activated gate 3912 are activated and associated currents read. The currents associated with the charge storage regions 3914 and 3916 can be compared. The comparison can provide a value of a bit within a word. In the illustrated example of FIG. 39, both states (3914 and 3916) are zero.

Figure 40:
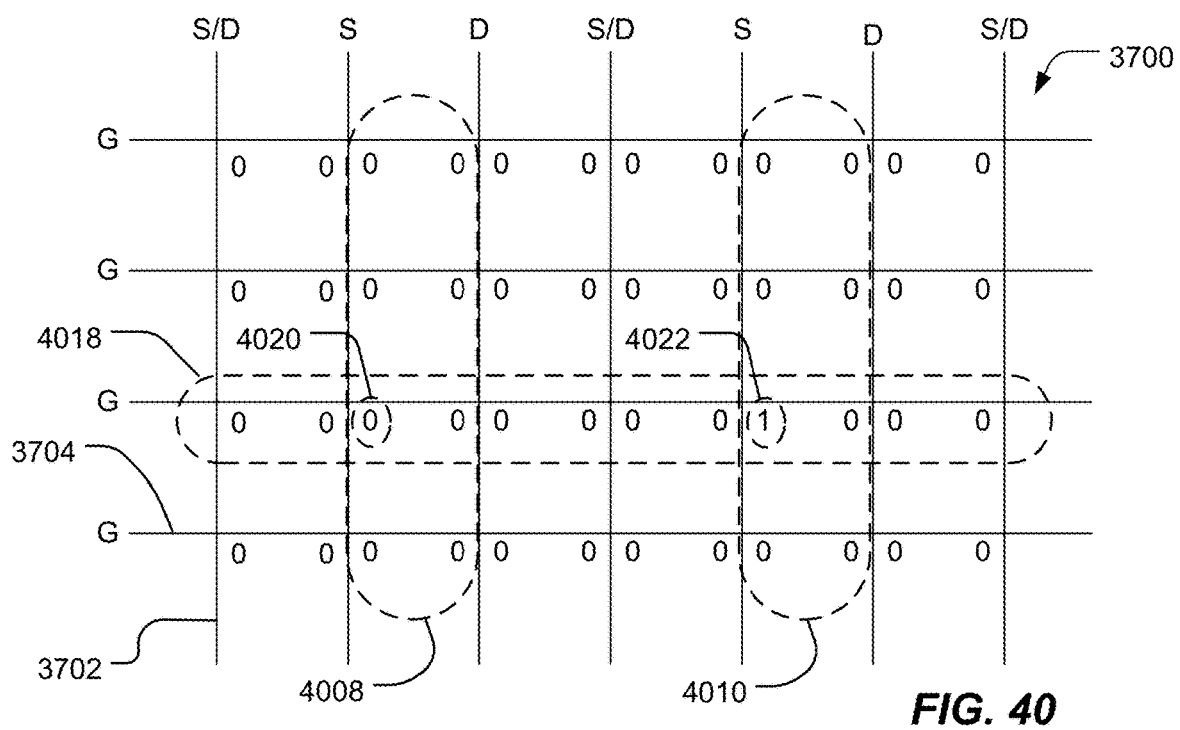

In another example illustrated in FIG. 40, the states of the charge storage regions (4020 and 4022) at the intersection of the selected source/drain pairs (4008 and 4010) with the gate 4018 have opposite values which indicates the occurrence of a radiation detection event.

Figure 41:
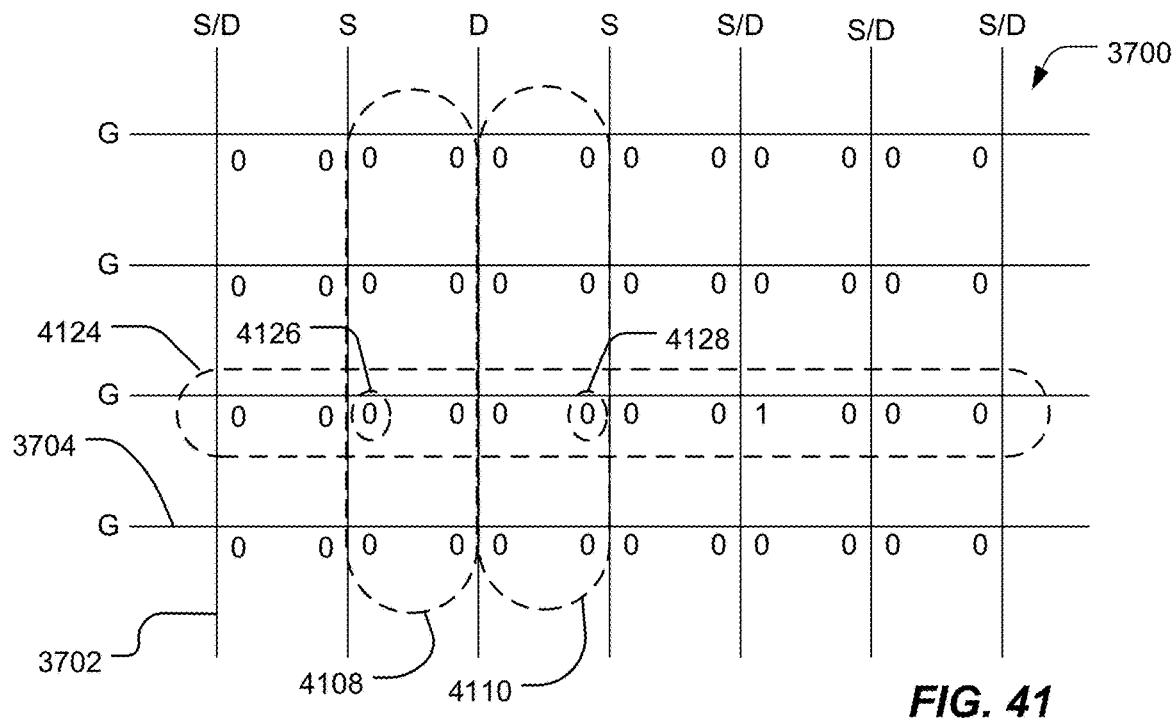

In illustrated examples of FIG. 39 and FIG. 40, the activated radiation detection devices and their associated charge storage regions are separated by one or more radiation detection devices along the activated gate. Alternatively, adjacent devices can be activated and charge storage regions on opposite sides of the adjacent radiation detected devices can be read. For example, FIG. 41 illustrates activating a source/drain line between the two radiation detection devices as a drain and the source/drain lines on opposite sides of the radiation detection devices as a source. Thus, the source/drain pairs 4108 and 4110 are formed that facilitate reading of charge storage regions 4126 and 4128 along the activated gate line 4124. The charge storage regions 4126 and 4128 that are read are on opposite sides of the adjacent radiation detection devices. The values of the charge storage region 4126 and 4128 can be compared to an external reference or can be compared to each other to determine a value or values indicative of the detection of a radiation event.

Figure 42:
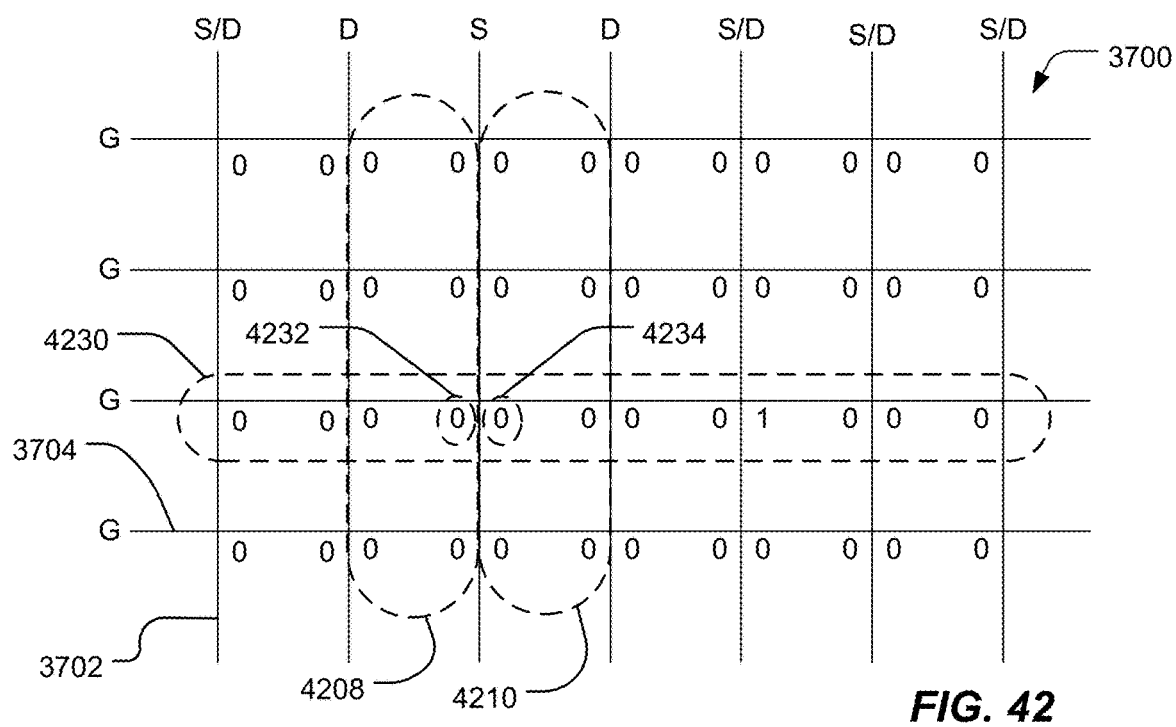

In another example, two devices can be read simultaneously. Particularly when most values are expected to be zero, reading two charge storage devices simultaneously along the same source can accelerate the reading of the circuit. For example, as illustrated in FIG. 42, source/drains pairs 4208 and 4210 can be activated in which the source/drain line between two adjacent radiation detection devices is activated as a source and the source/drain lines on opposite sides of the radiation detection devices are activated as drains. As such, along the activated gate 4230, charge storage regions 4232 and 4234 provide output along the same source line. In the event, that both outputs are zero, the source line provides a zero output (generally little or no current). When one or both of the charge storage regions (4232 or 4234) has been disturbed and has a nonzero state, the source current indicative of a nonzero state. To determine which charge storage region has a nonzero state, one or the other drain can be deactivated limiting the reading on the source line to one or the other of the charge storage regions 4232 or 4234.

Figure 43:
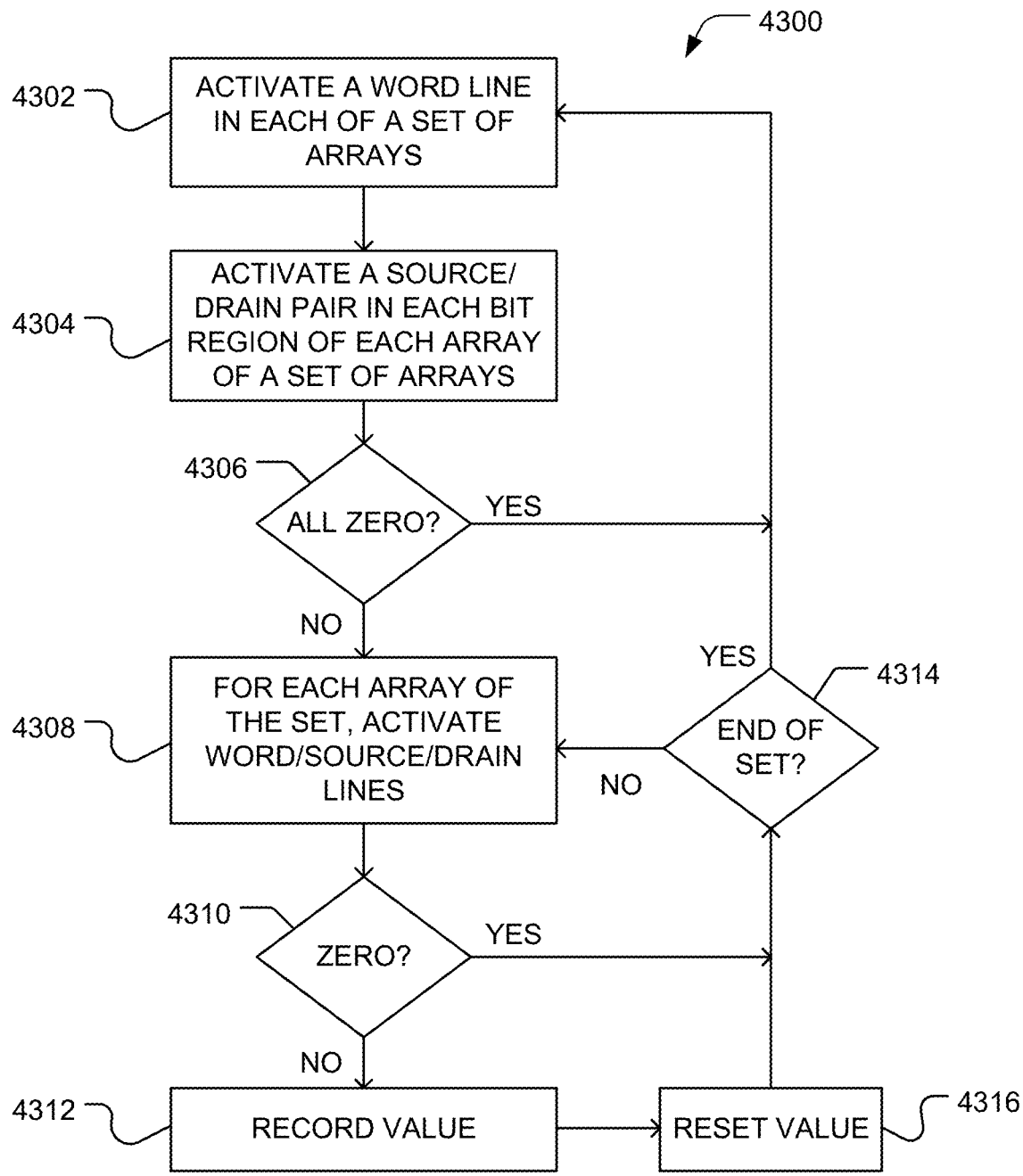
FIG. 43 includes a block flow diagram illustrating an example method for detecting radiation.

Reading from sets of stacked arrays provides an opportunity for further efficiencies when reading a radiation detection system when the expected state of each of the radiation detection devices within each of the arrays is zero. For example, FIG. 43 illustrates an example method 4300 for reading a set of stacked arrays. As illustrated at block 4302, a word line connected to each array of a set of arrays can be activated.

When a source/drain pair is activated in each bit region of each array of the set of the arrays, as illustrated at block 4304, a charge storage region of a radiation detection device in each bit region of each array of the set of arrays is read. In an example, a single word line can be connected to a gate line in each of the arrays and source/drain pairs in each bit region can individually be activated using separate bit lines for each source/drain line of each bit region of each array in the set of arrays, resulting in the activation of a charge storage region within a radiation detection device within each bit region of each of the arrays. In another example, a single bit line can be connected to a source/drain line in a bit region of each of the arrays of the set of arrays and individual word lines can be connected to individual gates within arrays of the set of arrays, resulting in a single charge storage region of a single radiation detection device in a bit region of an array of the set of arrays being read. In both examples, a word incorporating output from each array of the set of arrays can be simultaneously read and tested to detect an event.

Each word can be tested to determine whether the word value is zero ("0"), as illustrated at block 4306. When the values are all zero, the system can then activate a different word line or different bit lines connected to the arrays of the set of arrays, and additional words can be read and tested.

When values of the words are nonzero, the system can determine which bits and associated charge storage region of a radiation detection device has a nonzero value. For example, each bit for each word associated with an array of the set arrays can be activated, as illustrated at 4308, and tested, as illustrated at block 4310. For example, an associated gate line and source/drain pair can be activated to read the charge storage region of the radiation detection device associated with the bit of the word.

As illustrated at block 4310, the individually activated charge storage regions of a radiation detection devices representing a bit can be tested to determine whether it has a zero state. When the charge storage region of the radiation detection device has a zero state, the system can determine whether each of the bits of the word of each array of the set of arrays has been tested, as an illustrated at 4314. When the end of the set has been reached, the system can then evaluate subsequent word lines and bit lines. When the end of the set has not been reached, the system can turn to a word of a subsequent array and activate the word and bit lines to test a subsequent bit to determine whether it is nonzero.

When the bit has a nonzero value or the associated charge storage region has a nonzero state, the value and address can be recorded, as illustrated at 4312. Optionally, that charge storage region of the radiation detection device associated with the address can be reset, as illustrated at block 4316. For example, charge can be added to the charge storage region to return it to a zero state. The system can then determine whether the end of the set has been reached, as illustrated at block 4314.

Figure 44:
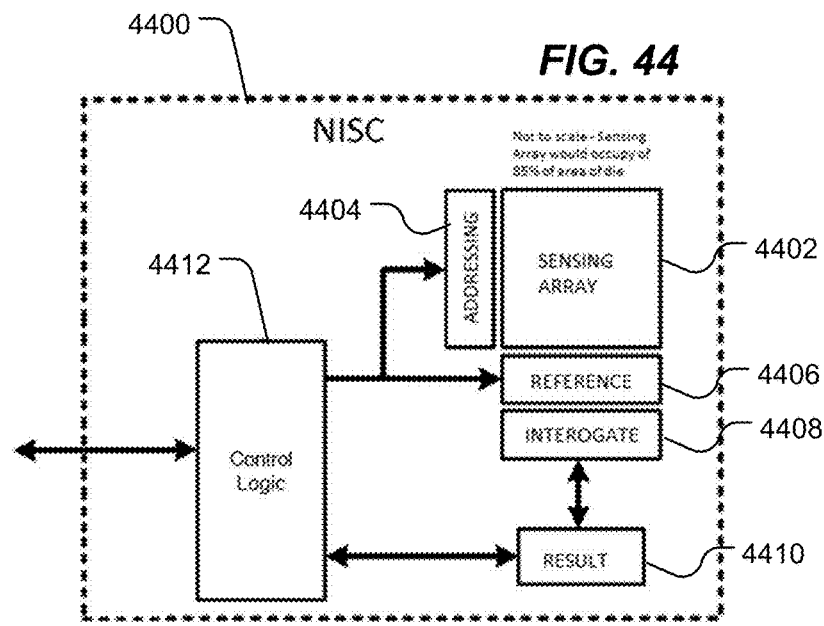
FIG. 44, FIG. 45, FIG. 46, FIG. 47, and FIG. 48 include illustrations of example detection systems.

The sensing arrays and associated addressing and read circuitry can be incorporated into a die. The die can also include other circuitries, such as memory, power management, and input/output circuitry. Alternatively, one or more die including sensing arrays and associated circuitry can be connected to a second die including memory, power management, input/output circuitries and other circuitries. For example, FIG. 44 includes an illustration of an example, circuitry 4400 including a radiation detection sensing array 4402. The sensing array 4402 can be address using addressing circuitry 4404. Values at addresses within the array can be compared to reference circuitry 4406. The interrogation circuitry 4408 can process the comparison and provide data to results circuitry 4410. The control logic 4412 can control the addressing circuitry 4404, for example, providing addresses to addressing circuitry 4404. The control logic 4412 can provide values and control the reference circuitry 4406 and can gather values and data from results circuitry 4410.

Figure 45:
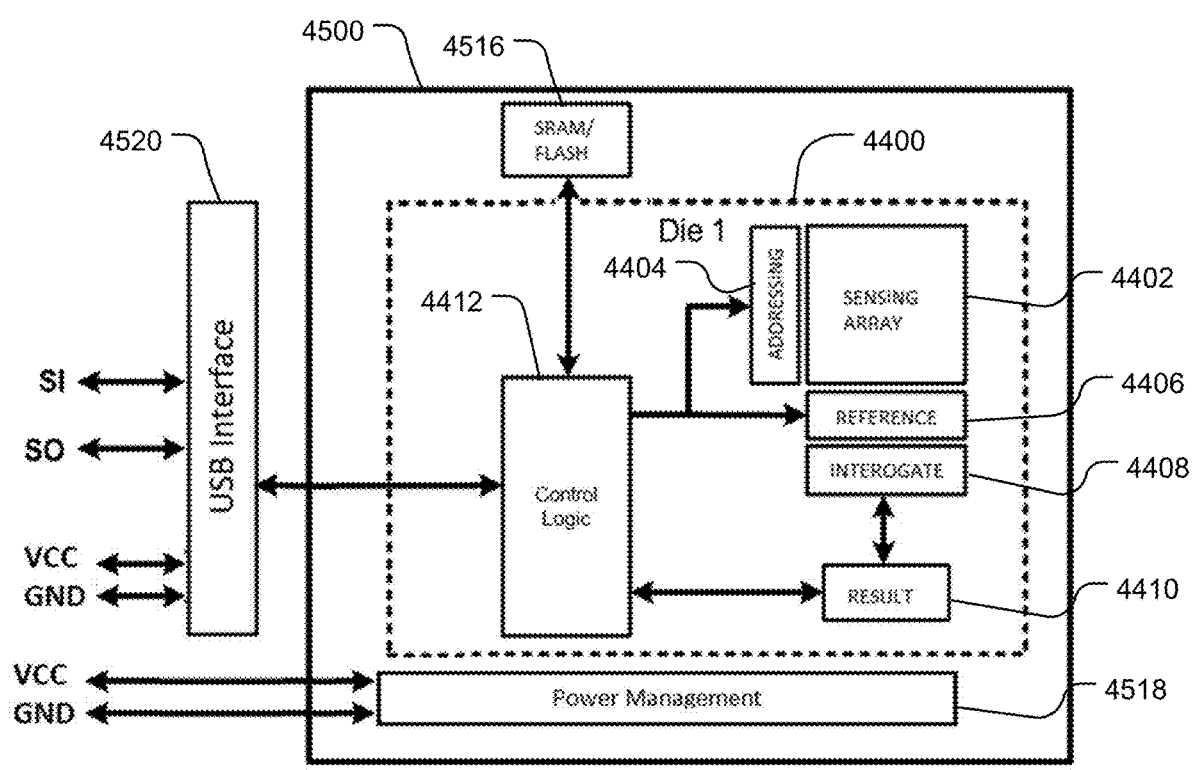

As illustrated in FIG. 45, sensory circuitry of die 4400 can be incorporated into additional circuitry 4500. For example, the additional circuitry can be formed on the same die or a die including circuitry 4400 can be coupled to a die including the additional circuitry 4500. For example, the control logic 4412 can be in communication with memory circuitry 4516. The control logic 4412 can be in communication with input/output circuitry, such as USB interface 4520. The additional circuitry 4500 can further include power management circuitry 4518.

Figure 46:
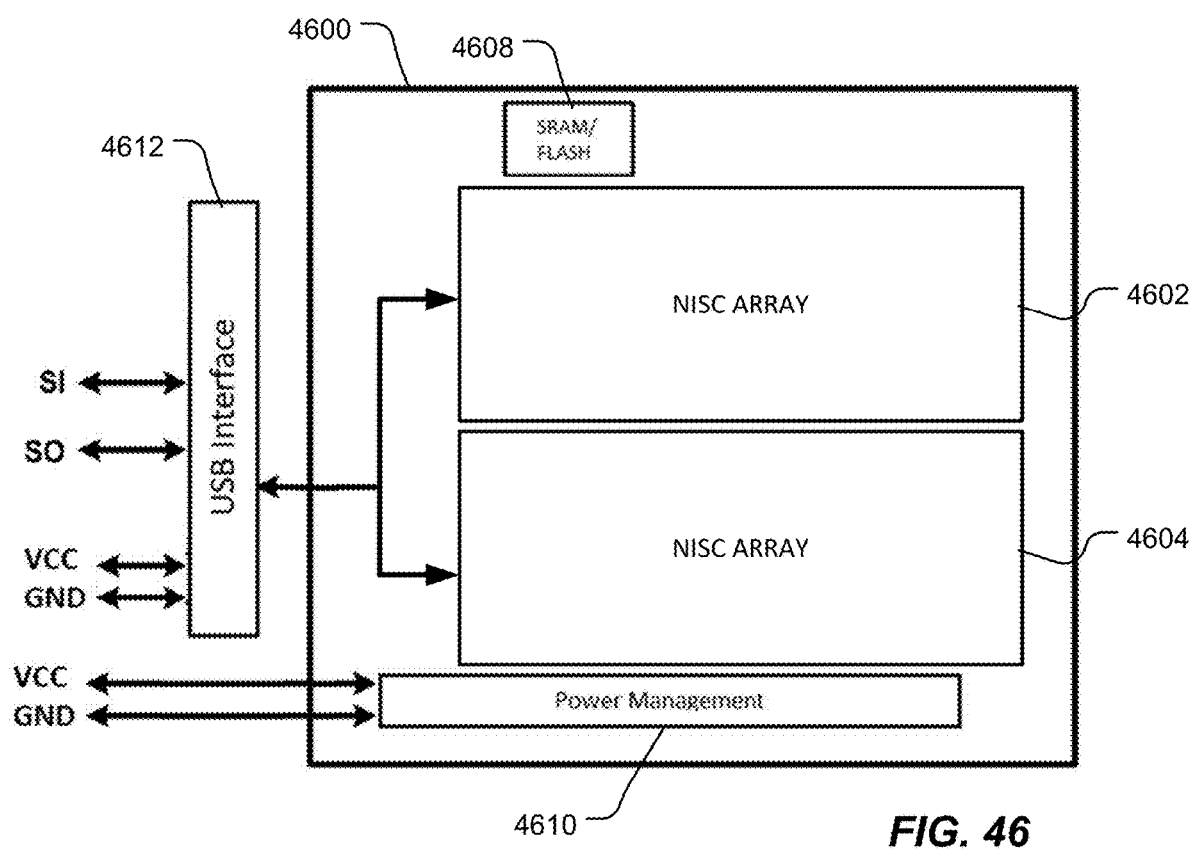

As illustrated in FIG. 46, more than one circuitry including a radiation sensing array can be disposed in or coupled with additional circuitry. For example, two or more circuitries (e.g., 4602 or 4604) including radiation sensing arrays and associated addressing, referencing, and control logic can be formed on a die or as separate die coupled to additional circuitry 4600. The additional circuitry 4600 can include a shared or separate memory circuitry (e.g., memory 4608), power management 4610, and input/output circuitry, such as USB interface 4612.

In an embodiment, the device contains an array of transistors that are highly sensitive to neutron interaction and uses industry standard communication interfaces to communicate to a system status, condition, and results. Internal to the device is a large array, for example, over one million transistors, that can form ~90% of the footprint of the device. The array is accessed by address decoders so transistors can be addressed individually. The address decoders are controlled by a central logic module. Adjacent to the array is a large parallel buffer that can receive data from the array and compare to a reference. The results of the comparison can be loaded into a register in the controller and acted upon as instructed by the device mode. In the event no bits indicate an issue, the next group of bits can be read and compared. The central logic module gathers the results and reports as instructed by the mode selected. When some bits indicate interaction, depending upon instructions given to the control logic module, such bits are reset before proceeding. The device reads the array until all locations have been compared to the selected reference.

Depending on which type of output (or mode) is selected, the control logic module begins exporting information for locations that do not match the reference. For example, the modes can include one or more report modes from Table 1.

TABLE 1

Report Modes

| Level of report | Results communicated |
| --- | --- |
| Lowest | Pass/Fail (whole array) |
| Sector | Count of sectors that fail |
| Sector_data | Sectors that fail and bits per sector |
| Single sector | Sector that fails and location in sector |
| Array | Location of all bits that fail |

Figure 47:
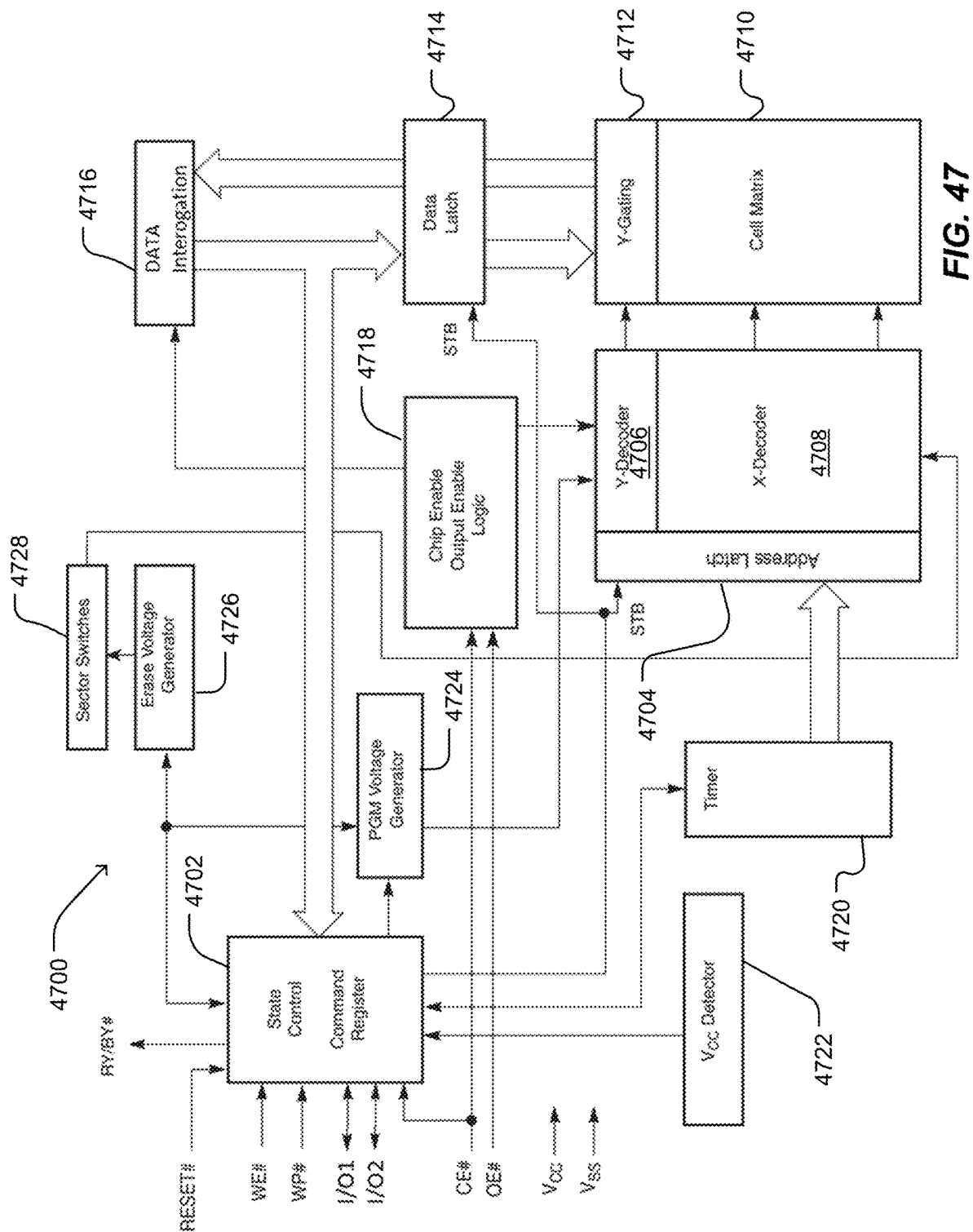

For example, FIG. 47 illustrates a device 4700 that includes an array 4710 of radiation detectors, which is addressed by a block including an address latch 4704, an x-decoder 4708, and a y-decoder 4706. The y-decoder 4706 accesses the y-gating 4712 of the array 4710. Output from the array 4710 passes to a data latch 4714 and to a data interrogation block 4716, which processes data and provides processed data to the state control and command register 4702. The state control and command register 4702 can be connected to input/output interfaces to receive commands and provide data. The output and processing mode can be driven by the chip enable/output enable logic 4718.

The device 4700 further includes voltage inputs, voltage detectors 4722, timing circuitry 4720, and voltage generators 4726 or 4724 for erasing a sector or programing. A sector switch 4728 can be used to erase or reset a sector.

Figure 48:
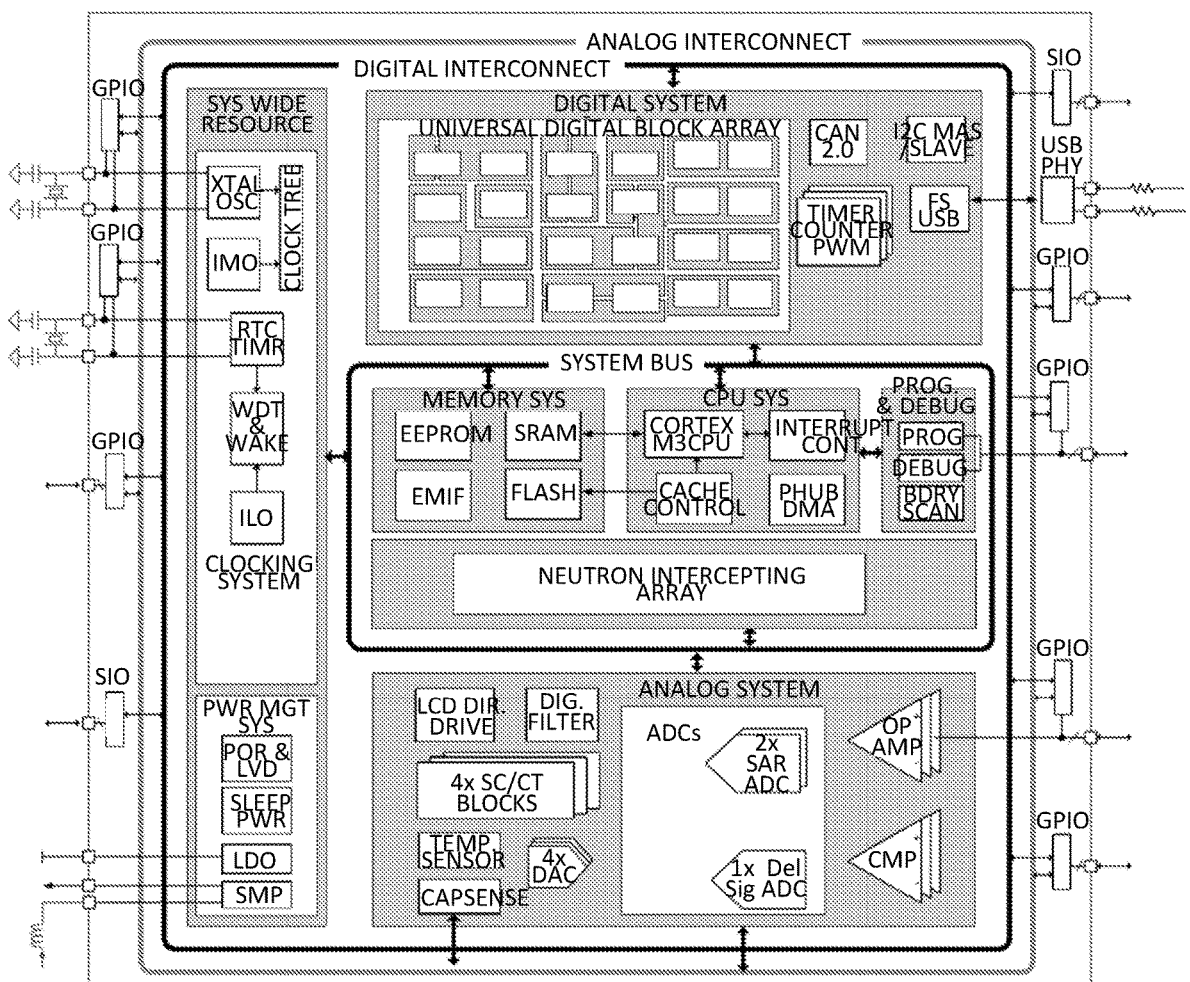

In a further embodiment, a device includes the array of radiation detectors disposed within a system-on-chip. For example, as illustrated in FIG. 48, the device includes a configurable system-on-chip architecture and a solid-state neutron detector array. The system integrates configurable analog and digital circuits, controlled by an on-chip microcontroller. A single device can integrate as many as 100 digital and analog peripheral functions, reducing design time, board space, power consumption, and system cost while improving system quality and extended capabilities.

In an example, the device is an ultra-low power, flash Programmable System-on-Chip (PSoC) devices, part of a scalable 8-bit PSoC 3 and 32-bit PSoC 5LP platform. The device provides configurable blocks of analog, digital, and interconnect circuitry around a CPU subsystem. The combination of a CPU with a flexible analog subsystem, digital subsystem, routing, and I/O enables a high level of integration in a wide variety of consumer, industrial, and medical applications.

The PSoC's digital subsystem provides unique configurability and connects a digital signal from a peripheral to any pin through the digital system interconnect (DSI). The PSoC's digital subsystem also provides functional flexibility through an array of small, fast, low power UDBs. The PSoC has a library of pre-built and tested standard digital peripherals (UART, SPI, LIN, PRS, CRC, timer, counter, PWM, AND, OR, and so on) that are mapped to the UDB array. A digital circuit using Boolean primitives by means of graphical design entry can be created. The UDB contains programmable array logic (PAL)/programmable logic device (PLD) functionality, together with a small state machine engine to support a wide variety of peripherals. In addition to the flexibility of the UDB array, the PSoC also provides configurable digital blocks targeted at specific functions. Such blocks can include four 16-bit timer, counter, and PWM blocks: I2C slave, master, and multi-master: Full-Speed USB; and Full CAN 2.0.

The PSoC includes the array of radiation detectors, a large addressable array of transistors that are sensitive to neutrons. In the event a neutron interacts with the transistor, the transistor changes state. The non-volatile nature of the transistor means the transistor preserves the change until it is reset.

The array is designed to run in multiple operation modes including autonomous, network controlled or peer. The array controls addressing of the array and returns a result from the array, for example, not a lot of data, unless requested based on the mode.

The PSoC's analog subsystem further provides unique configurability. Analog performance is based on a highly accurate absolute voltage reference with less than 0.1% error over temperature and voltage. The configurable analog subsystem includes analog muxes, comparators, analog mixers, voltage references, ADCs, DACs, and DFB.

GPIO pins can route analog signals into and out of the device using the internal analog bus. This allows the device to interface up to 62 discrete analog signals. In an example, the device offers a fast, accurate, configurable delta-sigma ADC with these features, such as: less than 100 µV offset, a gain error of 0.2 percent, INL less than ±1 LSB, DNL less than ±1 LSB, and SINAD better than 66 dB.

The device also offers one or two successive approximation register (SAR) ADCs. Featuring 12-bit conversions at up to 1 M samples per second, such ADCs offer low nonlinearity and offset errors and SNR better than 70 dB and are well suited for a variety of higher speed analog applications.

The output of either ADC can optionally feed the programmable DFB via DMA without CPU intervention. The DFB can be configured to perform IIR and FIR digital filters and several user defined custom functions. The DFB can implement filters with up to 64 taps. It can perform a 48-bit multiply-accumulate (MAC) operation in one clock cycle.

Four high speed voltage or current DACs support 8-bit output signals at an update rate of up to 8 Msps and can be routed out of any GPIO pin. Higher resolution voltage PWM DAC outputs can be created using the UDB array, to, for example, create a pulse width modulated (PWM) DAC of up to 10 bits, at up to 48 KHz. The digital DACs in each UDB support PWM, PRS, or delta-sigma algorithms with programmable widths.

In addition to the ADCs, DACs, and DFB, the analog subsystem provides multiple: comparators, uncommitted opamps, and configurable switched capacitor/continuous time (SC/CT) blocks.

In an example, PSoC's CPU subsystem is built around a 32-bit three-stage pipelined Arm Cortex-M3 processor running at up to 80 MHZ. The Cortex-M3 includes a tightly integrated nested vectored interrupt controller (NVIC) and various debug and trace modules. The overall CPU subsystem includes a DMA controller, flash cache, and RAM. The NVIC provides low latency, nested interrupts, and tail-chaining of interrupts and other features to increase the efficiency of interrupt handling. The DMA controller enables peripherals to exchange data without CPU involvement. This allows the CPU to run slower (saving power) or use those CPU cycles to improve the performance of firmware algorithms. The flash cache also reduces system power consumption by allowing less frequent flash access.

The PSoC's nonvolatile subsystem consists of flash, byte-writeable EEPROM, and nonvolatile configuration options. It provides up to 256 KB of on-chip flash. The CPU can reprogram individual blocks of flash, enabling boot loaders. An ECC can be enabled for high reliability applications. A powerful and flexible protection model secures the user's sensitive information, allowing selective memory block locking for read and write protection. Two KB of byte-writable EEPROM are available on-chip to store application data. Additionally, selected configuration options, such as boot speed and pin drive mode, are stored in nonvolatile memory. This allows settings to activate immediately after power on reset (POR).

The three types of PSoC I/O are extremely flexible. I/Os can have many drive modes that are set at POR. The PSoC also provides up to four I/O voltage domains through the VDDIO pins. Every GPIO has analog I/O, LCD drive, CapSense, flexible interrupt generation, slew rate control, and digital I/O capability. The SIOs on PSoC allow VOH to be set independently of VDDIO when used as outputs. When SIOs are in input mode they are high impedance, for example, even when the device is not powered or when the pin voltage goes above the supply voltage. This makes the SIO suited for use on an I2C bus where the PSoC may not be powered when other devices on the bus are. The SIO pins also have high current sink capability for applications such as LED drives. The programmable input threshold feature of the SIO can be used to make the SIO function as an analog comparator. For devices with FS USB the USB physical interface is also provided (USBIO). When not using USB, these pins may also be used for limited digital functionality and device programming.

The PSoC device can incorporate flexible internal clock generators, designed for high stability and factory trimmed for high accuracy. The Internal Main Oscillator (IMO) is the master clock base for the system and has 1% accuracy at 3 MHz. The IMO can be configured to run from 3 MHz up to 74 MHZ. Multiple clock derivatives can be generated from the main clock frequency to meet application needs. The device provides a PLL to generate system clock frequencies up to 80 MHz from the IMO, external crystal, or external reference clock. It also contains a separate, very low power internal low-speed oscillator (ILO) for the sleep and watch-dog timers. A 32.768-kHz external watch crystal is also supported for use in RTC applications. The clocks, together with programmable clock dividers, provide the flexibility to integrate most timing requirements.

The device supports a wide supply operating range from 1.71 to 5.5 V. This allows operation from regulated supplies such as 1.8±5%, 2.5 V±10%, 3.3 V±10%, or 5.0 V±10%, or directly from a wide range of battery types. In addition, it provides an integrated high efficiency synchronous boost converter that can power the device from supply voltages as low as 0.5 V. This enables the device to be powered directly from a single battery. In addition, the boost converter can be used to generate other voltages utilized by the device, such as a 3.3 V supply for LCD glass drive. The boost's output is available on the VBOOST pin, allowing other devices in the application to be powered from the PSoC.

The PSoC supports a wide range of low power modes. These include a 300 nA hibernate mode with RAM retention and a 2 µA sleep mode with RTC. In the second mode the optional 32.768-kHz watch crystal runs continuously and maintains an accurate RTC.

Power to all major functional blocks, including the programmable digital and analog peripherals, can be controlled independently by firmware. This allows low power background processing when some peripherals are not in use. This, in turn, provides a total device current of only 3.1 mA when the CPU is running at 6 MHz.

The PSoC uses JTAG (4 wire) or SWD (2 wire) interfaces for programming, debug, and test. Using these standard interfaces, the PSoC can be debugged or programmed with a variety of hardware solutions. The debug and trace modules include Flash Patch and Breakpoint (FPB), Data Watchpoint and Trace (DWT), Embedded Trace Macrocell (ETM), and Instrumentation Trace Macrocell (ITM). These modules have many features to help solve difficult debug and trace problems.

Figure 49:
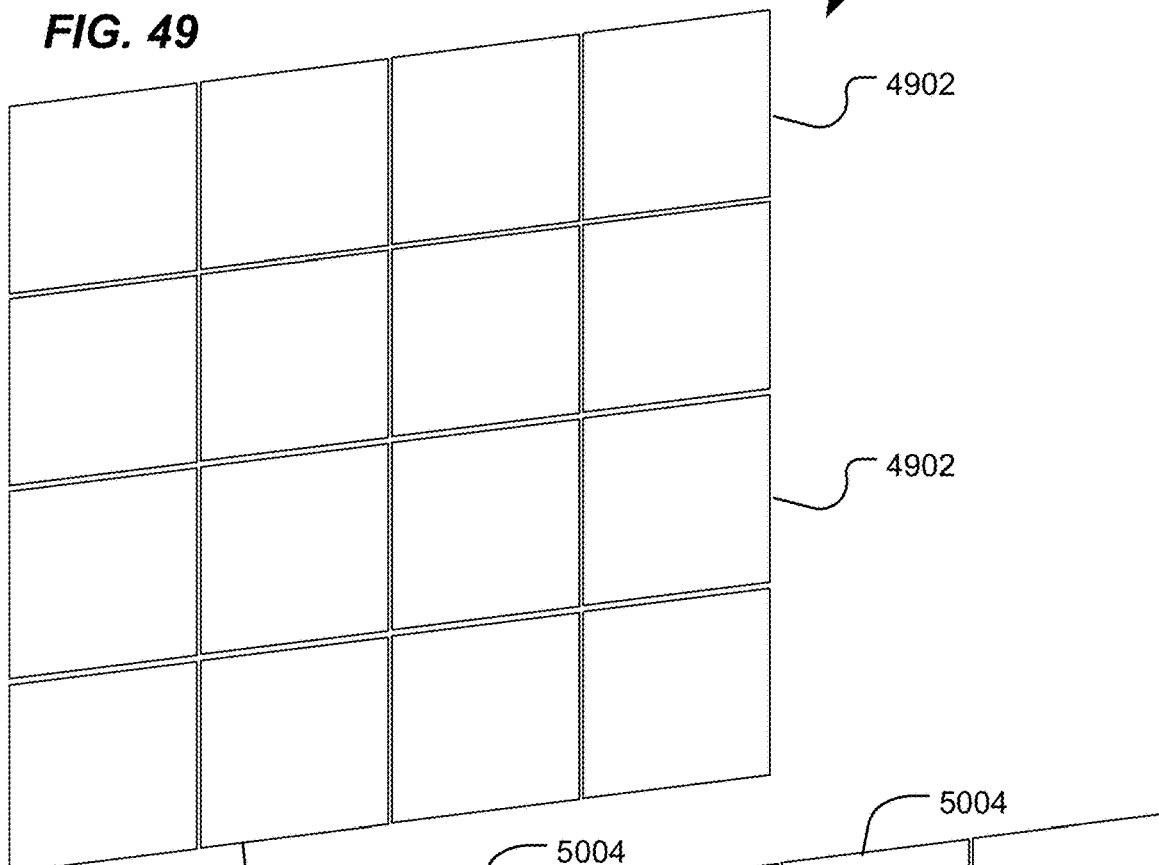
FIG. 49, FIG. 50, FIG. 51, and FIG. 52 include illustrations of example grids of detector arrays.

In an example, the neutron detector arrays can be utilized for imaging a source of neutrons or for imaging an object through which neutrons pass from a source. For example, the neutron detector arrays can be arranged in a grid exposed to, placed proximal to, or directed to face a potential neutron source. The member arrays of the grid can each have separate control, readout, or storage circuitries. In another example, members of the grid may have a common readout, control, and storage circuitry. For example, FIG. 49 illustrates a grid 4900 including neutron detector arrays 4902. The grid 4900 can include at least four arrays. In another example, the grid 4900 can include at least 16 arrays. In a further example, the grid 4900 can include as many as 1024 arrays. Given the compact nature of the arrays 4902, large grids are feasible, for example, for detecting large objects.

Figure 50:
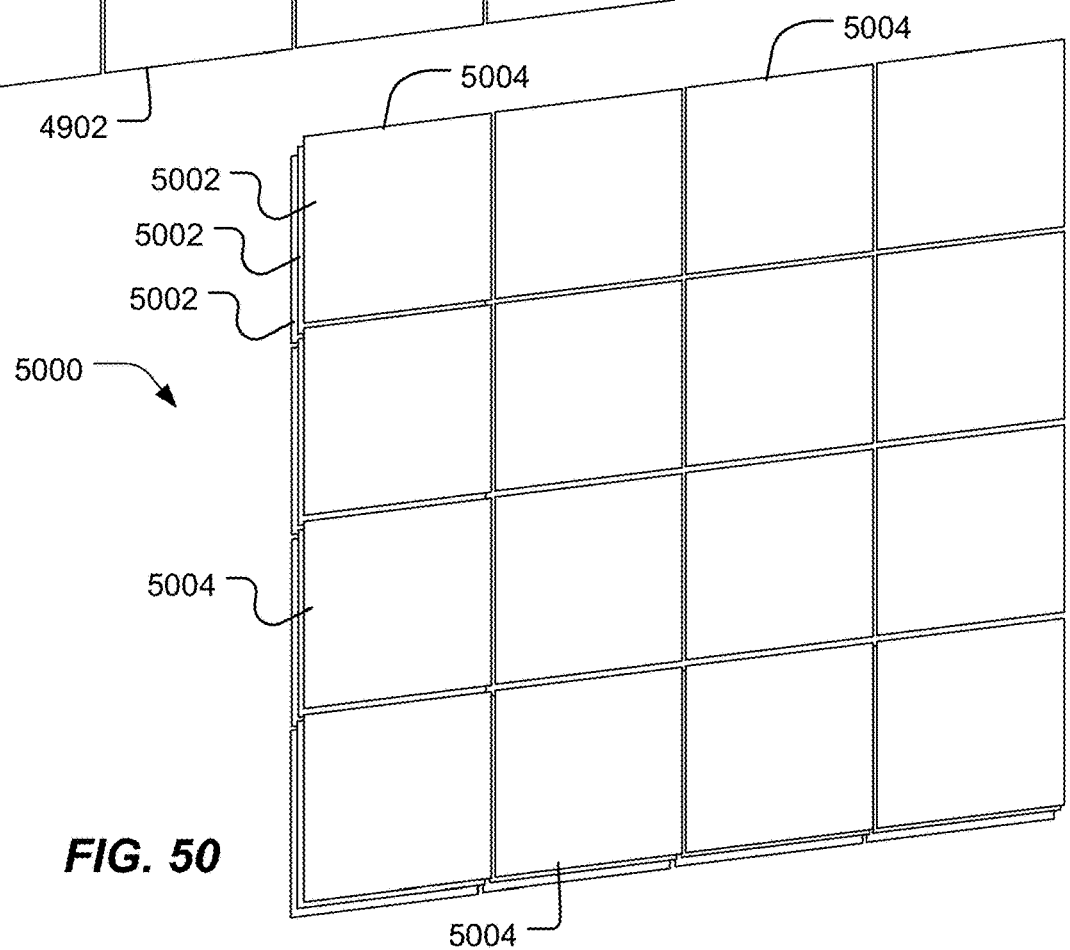

In a further example, stacks of arrays can be arranged as a grid. As illustrated in FIG. 50, a grid 5000 includes stacks of arrays 5004 that are formed of detector arrays 5002 disposed on top of one another. Such a grid of stacks of arrays can provide a further indication of directionality of the neutron radiation or more detail as to the features of the imaged object.

Figure 51:
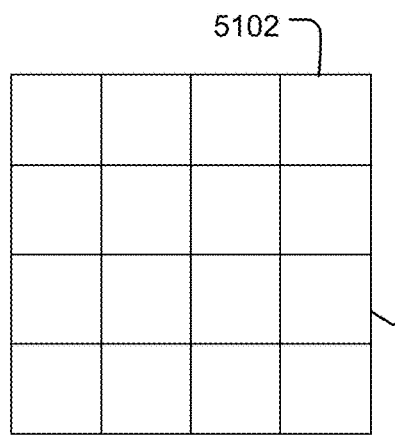
Figure 52:
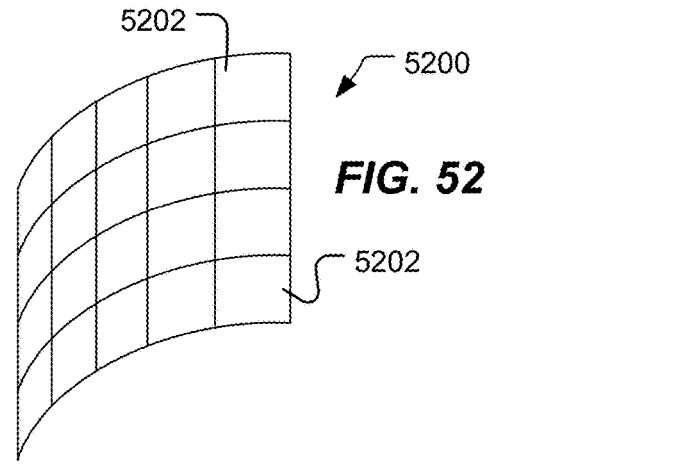

Depending on the nature of the application, the grid may be formed as a normal two-dimensional grid. In particular applications, the grid may take other shapes as needed. For example, the grid can be rectangular, square, polygonal, or irregular shaped. In a particular example, illustrated in FIG. 51, the grid is a square grid arranged as a flat panel. For example, the flat-panel grid 5100 includes a plurality of arrays 5102. In another example illustrated in FIG. 52, a grid 5200 can have a curved configuration incorporating arrays 5202.

Figure 53:
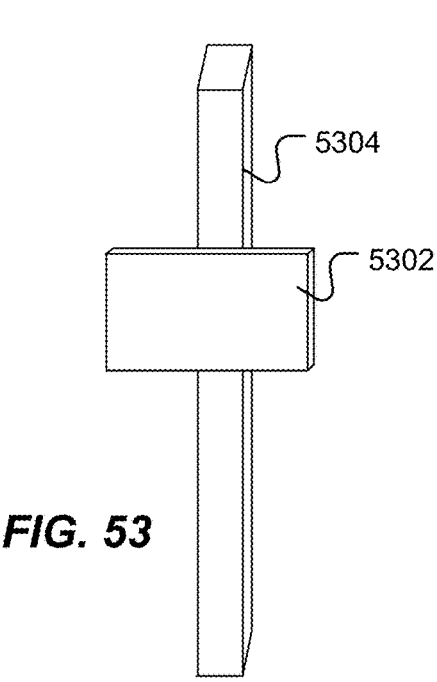
FIG. 53 and FIG. 54 include illustrations of example gantry systems for moving detector grids.
Figure 54:
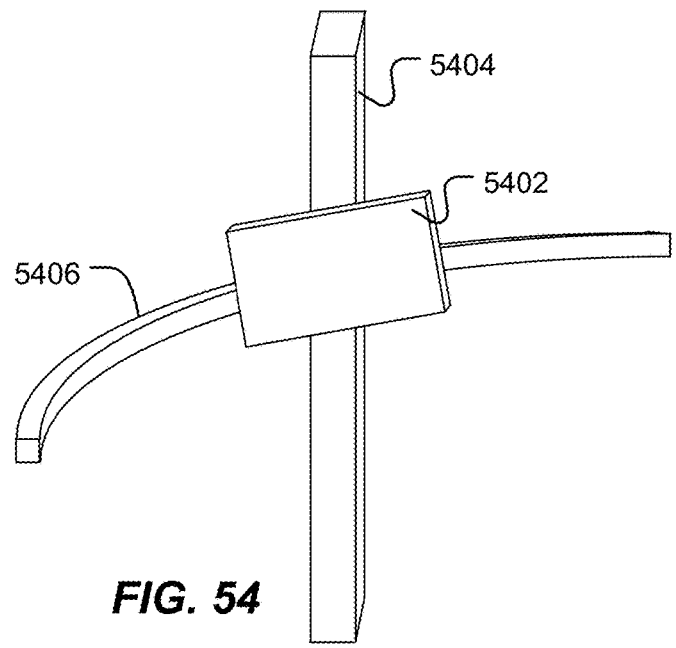

Grids can be placed adjacent an object to be imaged. For example, an object can be placed next to a fixed position grid and an image taken. In another example, the grid may be attached to gantry system that allows the grid to be moved relative to the object. For example, as illustrated in FIG. 53, a grid 5302 can be applied to a gantry structure 5304 that can move the grid 5302 up and down relative to an object. In another example, the grid or the gantry system may be a two-direction gantry system allowing the grid to be moved in two dimensions relative to the object. In a further example illustrated in FIG. 54, the grid can be attached to a gantry system that allows the grid to be moved in a semi-circle pattern around the object. For example, a grid 5402 can be attached to a gantry system including a vertical component 5404 that moves the grid up and down and a horizontal 5406 that moves the grid 5402 in a semi-circle pattern around an object. As such, a cylindrical volume can be scanned. In an alternative example, the gantry system component 5404 can be curved providing for a semi-spherical movement of the grid 5402 around an object.

Figure 55:
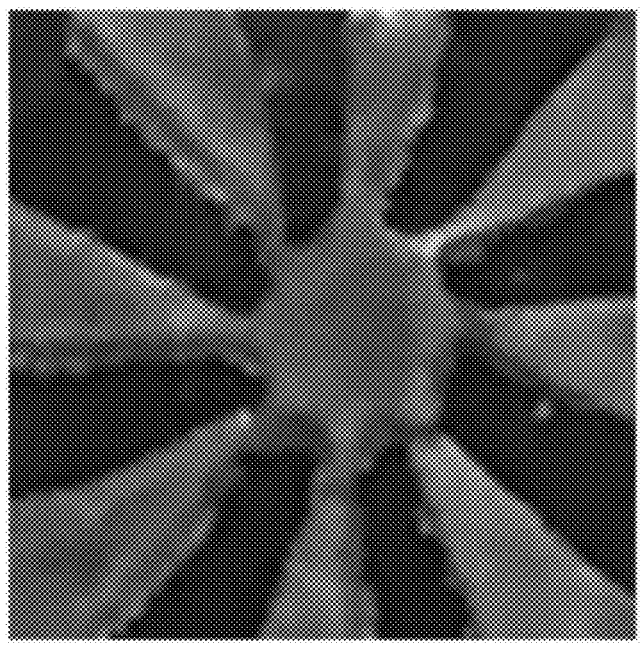
FIG. 55 includes an image of an example neutron source.
Figure 56:
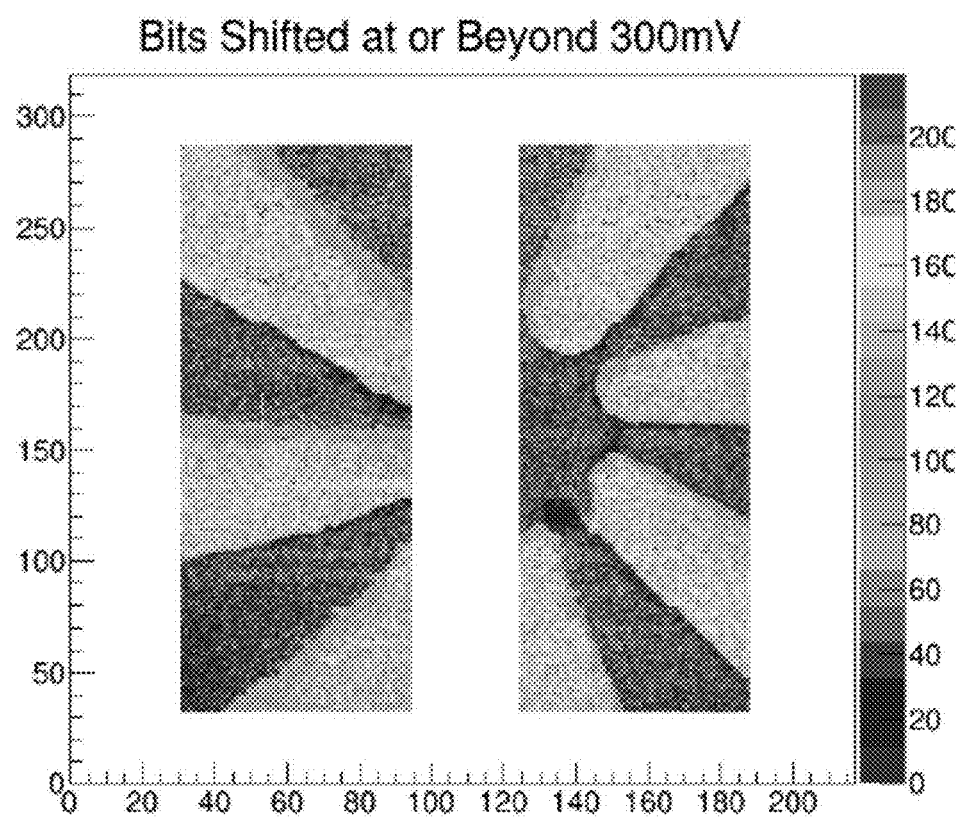
FIG. 56 includes an image derived from a detector array of the example neutron source.

To illustrate spatial resolution of an example neutron radiation detector, a Siemens star is cut into a cadmium foil using a waterjet, as illustrated in FIG. 55. The transistor spacing of the radiation detector is 65 nm. Based on the detection method, the expected intrinsic resolution is 5.1 μm. FIG. 56 includes an image of the Siemens star. The inactive area in between the two blocks of charge storage elements contains the microprocessor and device peripherals. Rearranging the integrated circuit can be done to avoid the inactive area.

Figure 57:
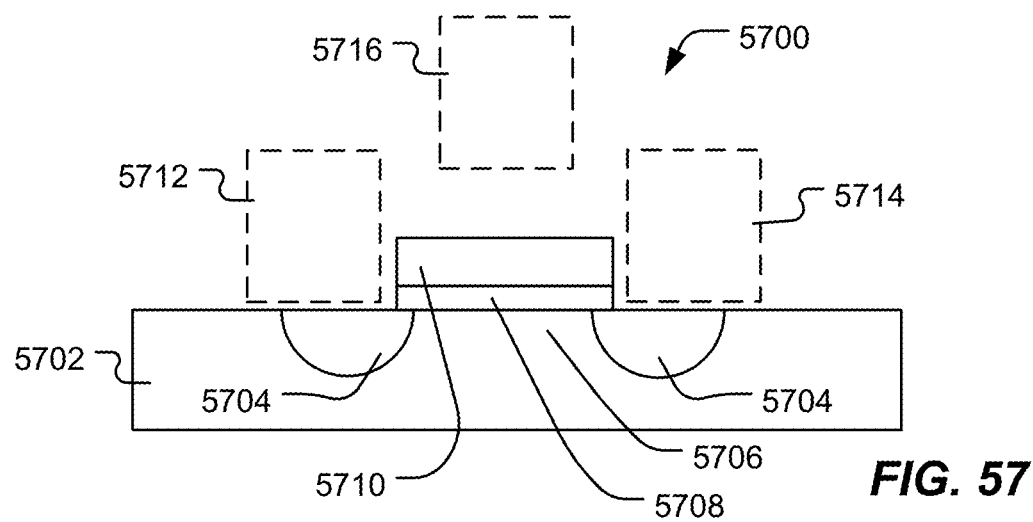
FIG. 57 and FIG. 58 include illustrations of example gamma radiation detection devices.

In another example, an array of gamma radiation detectors can be formed from devices having a p-n junction, such as a transistor. A high-Z material can be disposed in proximity to the transistor that attenuates the gamma radiation to x-ray radiation which influences the charge of the detector causing a change in voltage or current through the detector. For example, as illustrated in FIG. 57, a detector 5700 includes a substrate 5702 into which implants 5704 have been formed in a manner to define a gate region 5706 therebetween. In an example, substrate 5702 can be a silicon substrate. The silicon substrate can be doped be a p-type substrate. In another example, the silicon substrate can be doped to be an n-type substrate. The implants 5704 can form a source and drain regions of a transistor. The implants 5704 can be doped to be the opposite of the silicon substrate. For example, when the silicon substrate is a p-type substrate, the implants can be n-type implants. In another example, when the substrate is doped to be an n-type substrate, the implants can be p-types implants.

The gate stack can be disposed over the gate region 5706. For example, the gate stack includes a gate insulator 5708 and a gate conductor 5710. The gate insulator 5708 can be formed of an insulative material, such as the silicon oxide, as described above. The gate conductor 5710 can be a metal, silicide, or semiconductor layer, as described above. Other layers such as an ONO layer (not as illustrated) can be incorporated into the gate stack.

To facilitate ionization of the detector, a high-Z material can be positioned in proximity to the detector. For example, the high-Z material can be formed in proximity to the sides of the gate stack and over the implants 5704, as illustrated at 5712 or 5714. In another example, the high-Z material can be disposed above the gate stack, as illustrated at 5716. In an example, the high-Z metal or semimetal has an atomic number of at least 71 and not greater than 96. For example, the high-z metal or semimetal is a transition metal or actinide series metal. In another example, the high-Z metal or semimetal includes hafnium, tantalum, tungsten, rhenium, osmium, iridium, platinum, gold, mercury, thallium, lead, uranium, chromium, vanadium, iron, an alloy thereof, or a combination thereof. In an additional example, the high-z metal or semimetal has a melting point in a range of 1400° C. to 4000° C. In a further example, the high-z metal or semimetal has a melting point in a range of 1550° C. to 3500° C. In an example, the high-Z materials includes tungsten. In another example, the high-Z material includes uranium. For example, the uranium is depleted uranium. In an example, the uranium includes isotope U238 in an amount of at least 99.5%, such as at least 99.7% or at least 99.9%.

In an example, the high-z material can be incorporated into plugs or vias that provide conductive or electrical access between control lines and source and drain implants. In another example, the high-Z material can be used to form conductors providing access from control lines to the gate conductor. In further example, the high-Z material can be used to form the gate conductor.

Figure 58:
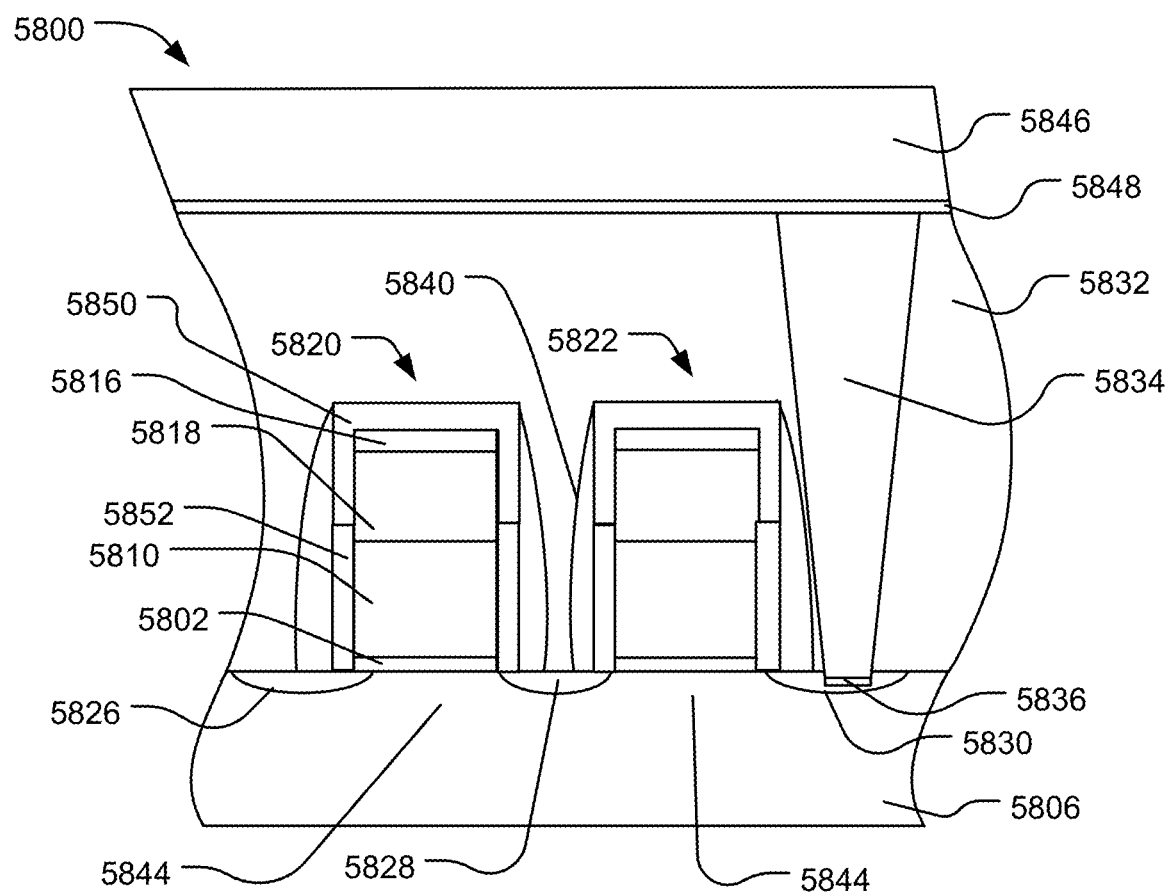

In further example, FIG. 58 includes an illustration of a portion 5800 of a detection array. In particular, the array includes a plurality of gate structures, such as gate structures 5820 and 5822. The semiconductor substrate 5806 includes a well source/drain 5828 disposed between the gate stacks 5820 and 5822. In addition, source/drains 5826 or 5830 are formed within the semiconductor substrate 5806 on opposite sides of the gate stacks 5820 and 5822 from the source/drain 5828.

Using masking and ion implantation techniques, source/drains 5826, 5828, and 5830 can be formed within the semiconductor layer 5806 adjacent or between the gate stacks 5820 or 5822. The source/drains 5826, 5828, and 5830 can be implanted before forming the layers of the gate stacks 5820 or 5822. Alternatively, the source/drain implants can be formed after etching the gate structures. The type of source/drain region depends on the nature of the substrate or regions within which the source/drains are formed. For example, a p-type source/drain can be formed using a boron ion implantation in an n-type substrate or region. Alternatively, source/drains of n+ type material can be formed in a p-type region. The n+ type source/drains can be formed using arsenic, phosphorous, or other similar dopants using ion implantation. Accordingly, a gate region 5844 extends between the source/drains. While P-MOS transistors are described, N-MOS transistors can be formed using a similar method having a similar gate stack structure.

The gate stacks 5820 and 5822 can be formed by etching layers including a gate dielectric 5802 and a gate conductor 5818. Optional additional gate stack layers 5810 can be formed between the gate conductor 5818 and the gate dielectric 5802. For example, layers can be included to form an ONO structure.

Sidewall spacers 5840 that isolate the gate stacks can be formed of a nitride material, such as a silicon nitride. Optionally, spacer oxides 5850 or 5852 can be formed on the sides of the gate stacks 5820 and 5822.

Optional silicide layers can be formed to provide contacts for the gate stack or provide a contact with source/drain regions, such as the source/drain region 5830. For example, the gate stack can include a silicide layer 5816. In another example, a silicide region, such as 5836, can be formed over source/drain regions. A silicide forming metal, such as cobalt, nickel, rhenium, ruthenium, palladium, or a combination thereof, can be deposited by sputtering to a thickness in a range of 5 nm to 30 nm, followed by rapid thermal annealing.

Interlayer dielectric 5832 can be disposed over the gate stacks 5820 and 5822 and an interconnect 5834 can be formed to contact the silicide layer 5836 through the interlayer dielectric 5832 while remaining isolated from the gate stack.

One or more conductive layers 5846 can be formed of a conductive material and disposed over the interlayer dielectric 5832 and can be used to form lines, such as bit lines or word lines, in electrical contact with the interconnect 5834. Optionally, a barrier layer 5848 can be formed between the conductive layer 5846 and the interlayer dielectric 5832.

Optionally, the interconnect 5834 can be formed of a high-Z material. In an example, the interconnect 5834 can be formed of uranium. In another example, a high-Z layer can be incorporated into the gate stack. In a further example, electrically isolated plugs of high-Z material can be formed within the interlayer dielectric 5832.

Figure 59:
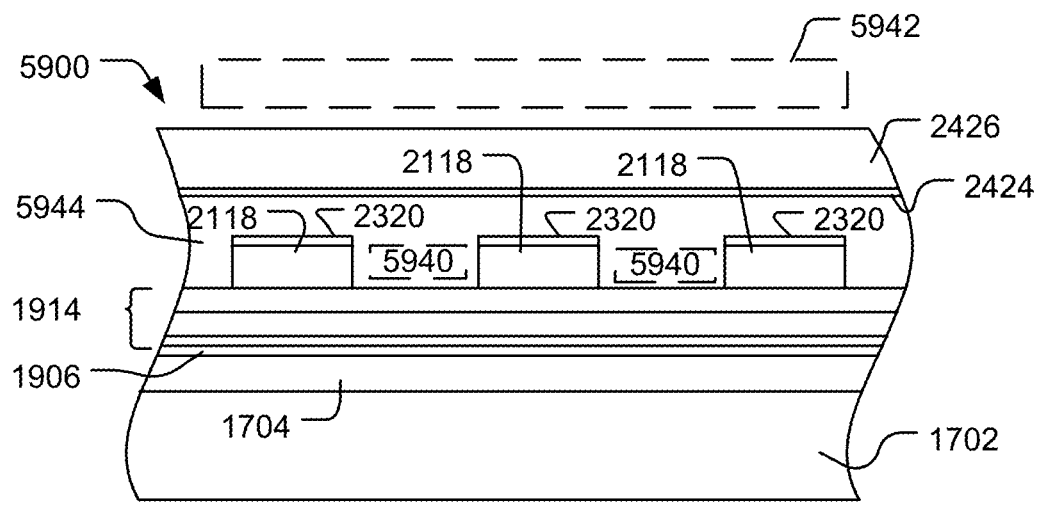
FIG. 59 and FIG. 60 include illustrations of example gamma radiation detection devices.
Figure 60:
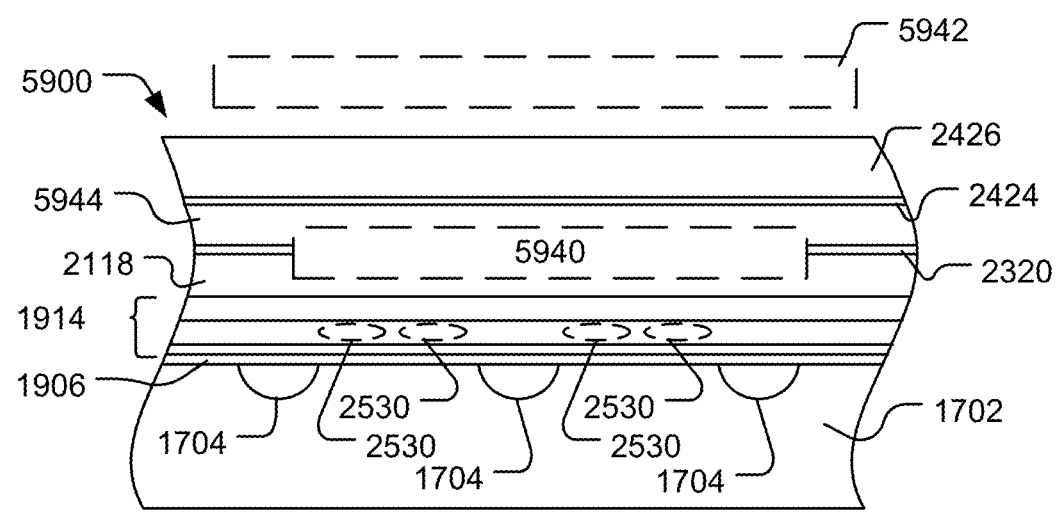

In another example, the array can be configured similar to configurations illustrated in FIG. 24 and FIG. 25. FIG. 59 and FIG. 60 illustrate a workpiece 5900 in which high-Z materials can be formed in regions (5940) within a dielectric material 5944 around the gate columns 2118 or the charge storage structure 1914, such as over a top surface 1950 of the silicon oxide layer 1912, can be incorporated into metallization layers 2426 or interconnects, or can be formed in regions 5942 over the metallization layers 2426. Optionally, the gate columns can have silicon oxide sidewalls (not illustrated) or silicon nitride spacers (not illustrated).

In particular, the high-Z material regions 5940, 5942 or interconnects are formed of high-Z materials such as those described above. In an example, the high-Z materials includes tungsten. In another example, the high-Z material includes uranium. For example, the uranium is depleted uranium. In an example, the uranium includes isotope U238 in an amount of at least 99.5%, such as at least 99.7% or at least 99.9%. Alternatively, high-Z metals can be incorporated into an oxide layer.

The high-Z material can be formed using evaporative deposition techniques, such as thermal evaporation deposition, electron beam evaporation, or laser beam evaporation, or using sputtering, other techniques, or any combination thereof.

A barrier layer 2424 can be formed over the dielectric layer 5944. In addition, one or more metallization layers 2426 can be formed over the dielectric layer 5944. Such metallization layers 2426 can be used to provide electrical communication between interconnects that connect to source/drain implants or gate columns. Interconnects (not illustrated) to provide access to source/drain rows or gate columns can be formed throughout the process and connected to the metallization layers 2426.

In a particular embodiment, the charge storage structure 1914 can be used along with the source/drain rows 1704 and the gate columns 2118 to form radiation detection devices. In an example, the charge storage structure 1914 forms a charge storage region 2530 disposed between rows of the source/drain implants. In a particular example, the charge storage structure 1914 can define two charge storage regions 2530 disposed between each pair of source/drain row implants 1704 where they intersect with a gate column 2118.

In practice, activation of a gate column with a high voltage and activation of a source/drain row as a drain introduces charge into a charge storage region 2530 of the charge storage structure 1914 closest to the drain. Activation of the same gate column and activation of a source/drain pair (activation of adjacent source/drain rows with different charges) allows reading of the charge storage region 2530 in the charge storage structure 1914 closest to the source.

Figure 61:
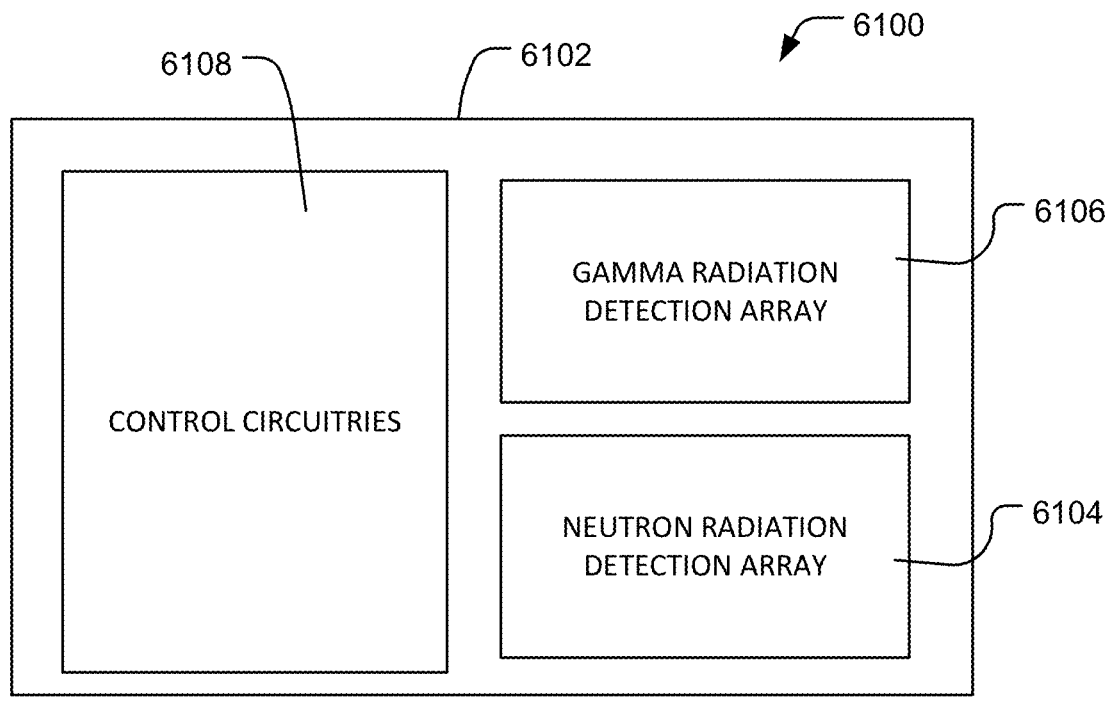
FIG. 61 includes an illustration of an example detection system.

The gamma radiation detection array can be incorporated into a device similar to those described above having control circuitries, readout circuitries, and data storage. In a further example, both a neutron radiation detection array and a gamma radiation detection array can be incorporated into the same system. For example, as illustrated in FIG. 61, a system 6100 includes a substrate or circuit board 6102 to which a neutron radiation detection array 6104 is coupled and a gamma radiation detection array 6106 is coupled. The substrate 6102 further includes control circuitries 6108 that can control, read, and store information of the detection arrays 6104 and 6106. In an example, each of the detection arrays 6104 and 6106 can be formed in separate silicon substrates and attached to a common substrate 6102. In another example, the radiation detection arrays 6104 and 6106 can be formed on a common silicon substrate that further incorporates control circuitries to form a system on chip.

In another example, charge storage structures can be used to detect cosmic radiation. Cosmic radiation can include charged particles of various mass and charge, such as protons, electrons, positrons, and helium nuclei. Each particle may have a different influence on a charge storage structure. Within the same array or on different detection arrays, the influence of cosmic radiation, gamma radiation, or neutron radiation may cause different shifts in charge within the charge storage structure.

Figure 62:
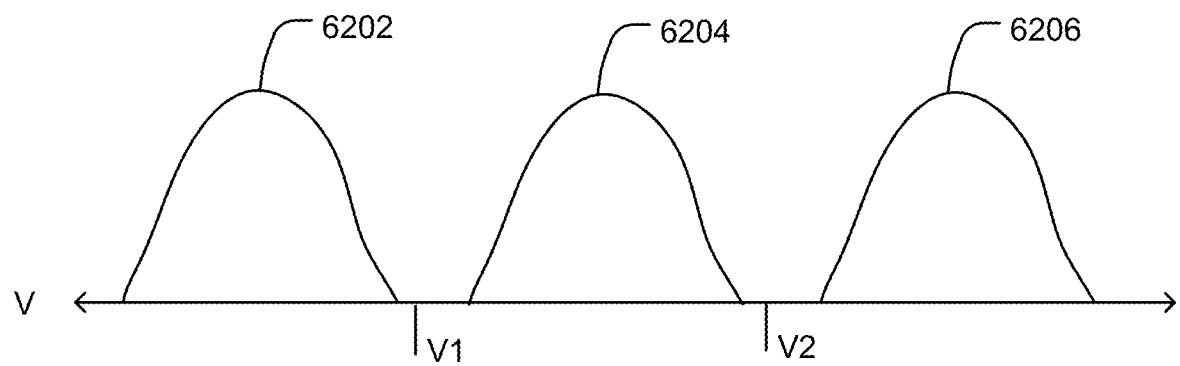
FIG. 62 includes a graph illustrating changed in charge.

For example, FIG. 62 illustrates a graph of voltage shifts that can be used to detect the influence of radiation on a charge storage structure. In an example, radiation may cause a shift of the charge storage region from a charge in a range 6204 to a charge in a range 6202. By using the threshold voltage V1, a determination can be made as to the state of the charge storage region, thereby detecting a radiation event. Such as shift would be characteristic in a gamma radiation detection array or a neutron detection array. Cosmic radiation may facilitate a similar shift. Alternatively, some cosmic radiation can facilitate a shift in an opposite direction (e.g., from region 6204 to region 6206) or of a different magnitude (e.g., from region 6206 to 6202). Such shifts, based on direction and magnitude, can be used to characterize the radiation detected by the detection array. A number of threshold voltages can be used to determine the nature of the shift. The nature of the shift can be used to characterize the radiation, such as particle types, particle energies, or frequency of occurrence, among other factors.

Figure 63:
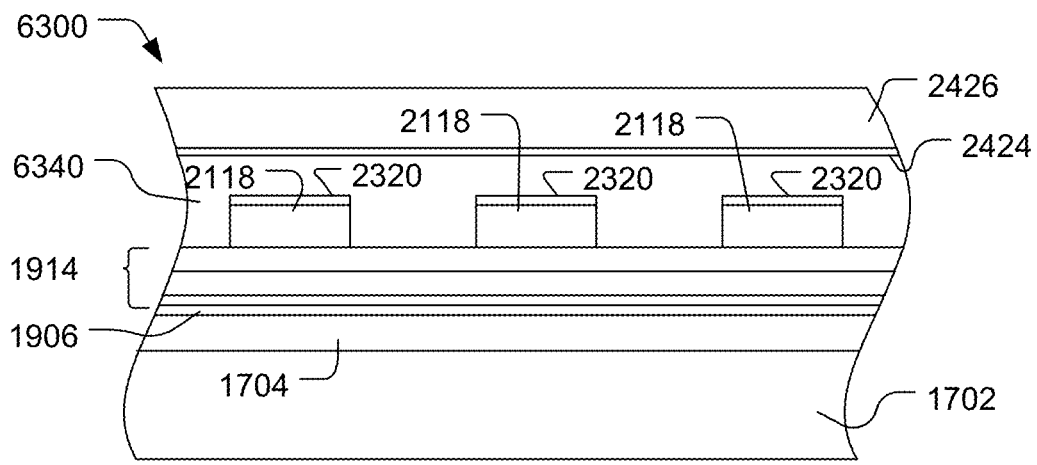
FIG. 63 and FIG. 64 include illustrations of example cosmic radiation detection devices.
Figure 64:
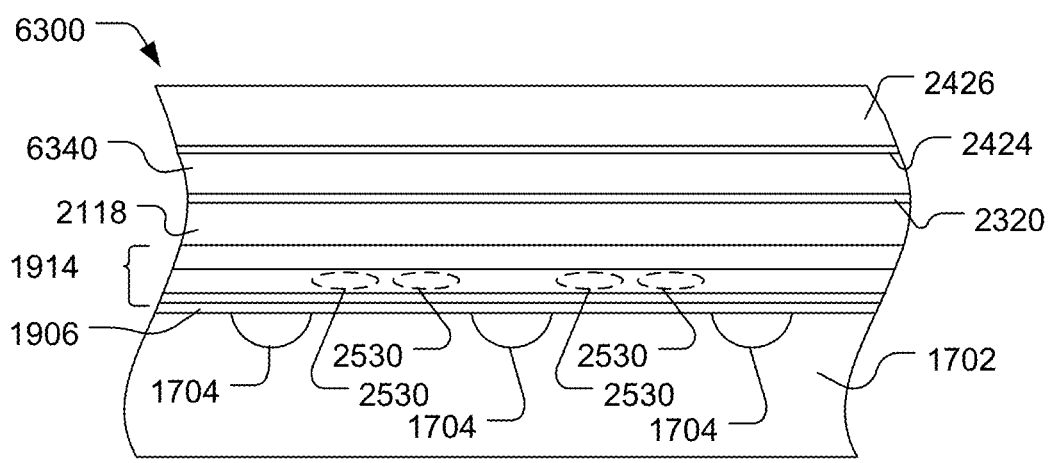

In an example, a cosmic radiation detection array 6300 illustrated in FIG. 63 and FIG. 64 has a similar configuration to the detection array of FIG. 24 and FIG. 25. In contrast to the neutron detection array, a dielectric layer 6340 does not include dopants or radiation reactive materials. The dielectric layer 6340 can be formed over the gate columns 2118 and the charge storage structure 1914, such as over a top surface 1950 of the silicon oxide layer 1912. In particular, the dielectric layer 6340 extends over at least three sides of the gate columns 2118 and across the exposed surface 1950 of the continuous silicon oxide layer 1912 of the charge storage structure 1914. Optionally, the gate columns can have silicon oxide sidewalls (not illustrated) or silicon nitride spacers (not illustrated).

The dielectric material can be formed using chemical vapor deposition (CVD), low pressure chemical vapor deposition (LPCVD), plasma enhanced chemical vapor deposition (PECVD), other techniques, or any combination thereof.

A barrier layer 2424 can be formed over the dielectric layer 6340. In addition, one or more metallization layers 2426 can be formed over the dielectric layer 6340. Such metallization layers 2426 can be used to provide electrical communication between interconnects that connect to source/drain implants or gate columns. Interconnects (not illustrated) to provide access to source/drain rows or gate columns can be formed throughout the process and connected to the metallization layers 2426. Dielectric material within and surrounding metal tracings of the metallization layer can be formed of the radiation reactive material.

In a particular embodiment, the charge storage structure 1914 can be used along with the source/drain rows 1704 and the gate columns 2118 to form radiation detection devices. In an example, the charge storage structure 1914 forms a charge storage region 2530 disposed between rows of the source/drain implants. In a particular example, the charge storage structure 1914 can define two charge storage regions 2530 disposed between each pair of source/drain row implants 1704 where they intersect with a gate column 2118.

In practice, activation of a gate column with a high voltage and activation of a source/drain row as a drain introduces charge into a charge storage region 2530 of the charge storage structure 1914 closest to the drain. Activation of the same gate column and activation of a source/drain pair (activation of adjacent source/drain rows with different charges) allows reading of the charge storage region 2530 in the charge storage structure 1914 closest to the source.

The cosmic radiation detection array and the gamma radiation detection array can be read using schemes and systems such as those described in relation to reading the neutron radiation detection array. Similar to the neutron and gamma radiation detection arrays, the cosmic radiation detection arrays can be arranged or stacked to determine directionality of the radiation. For example, the cosmic radiation detection arrays or the gamma radiation detections arrays can be arranged as described in relation to FIGS. 49-54.

Figure 65:
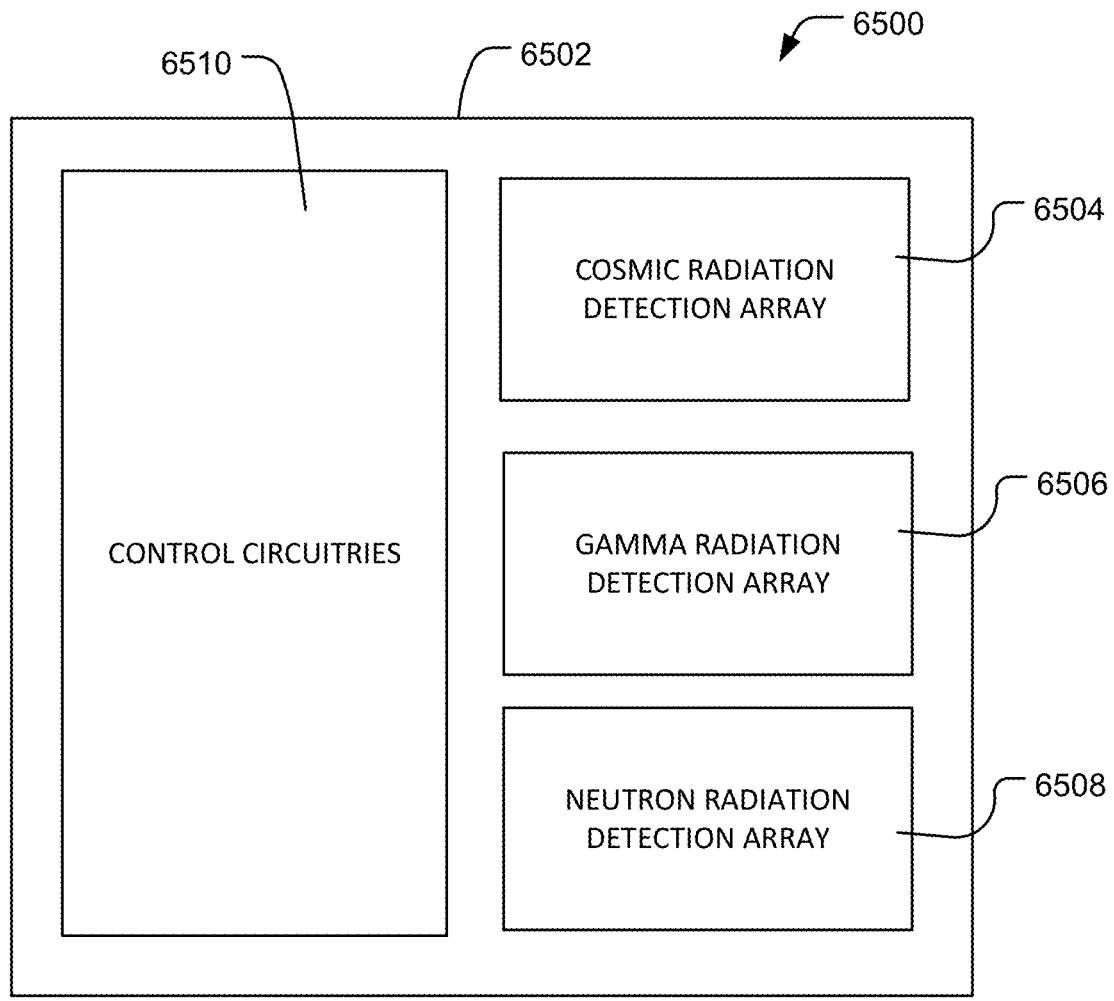
FIG. 65 includes an illustration of an example detection system.

One or more of the detection arrays can be incorporated into a single apparatus. For example, the cosmic radiation detection array, the gamma radiation detection array, and the neutron detection array can be incorporated into a device similar to those described above having control circuitries, readout circuitries, and data storage. In a further example, a neutron radiation detection array, a gamma radiation detection array, and a cosmic radiation detection array can be incorporated into the same system. For example, as illustrated in FIG. 65, a system 6500 includes a substrate or circuit board 6502 to which a cosmic radiation detection array 6104 is coupled, a gamma radiation detection array 6106 is coupled, and a neutron radiation detection array 6508. The substrate 6502 further includes control circuitries 6510 that can control, read, and store information of the detection arrays 6504, 6506, and 6508. In an example, each of the detection arrays (6504, 6506, or 6508) can be formed in separate silicon substrates and attached to a common substrate 6502. In another example, the radiation detection arrays (6504, 6506, or 6508) can be formed on a common silicon substrate that further incorporates control circuitries to form a system on chip.

Each of the arrays (6504, 6506, 6508, 6106, 6104) can have logic circuitry, read logic, detection logic, and processing, as described above in relation to the neutron detection devices and associated arrays. Each of the arrays can be stacked with other similar type arrays. Each of the arrays can be in communication with separate logic circuitry, processors, controllers, memory, or data buses or can share resources.

Figure 66:
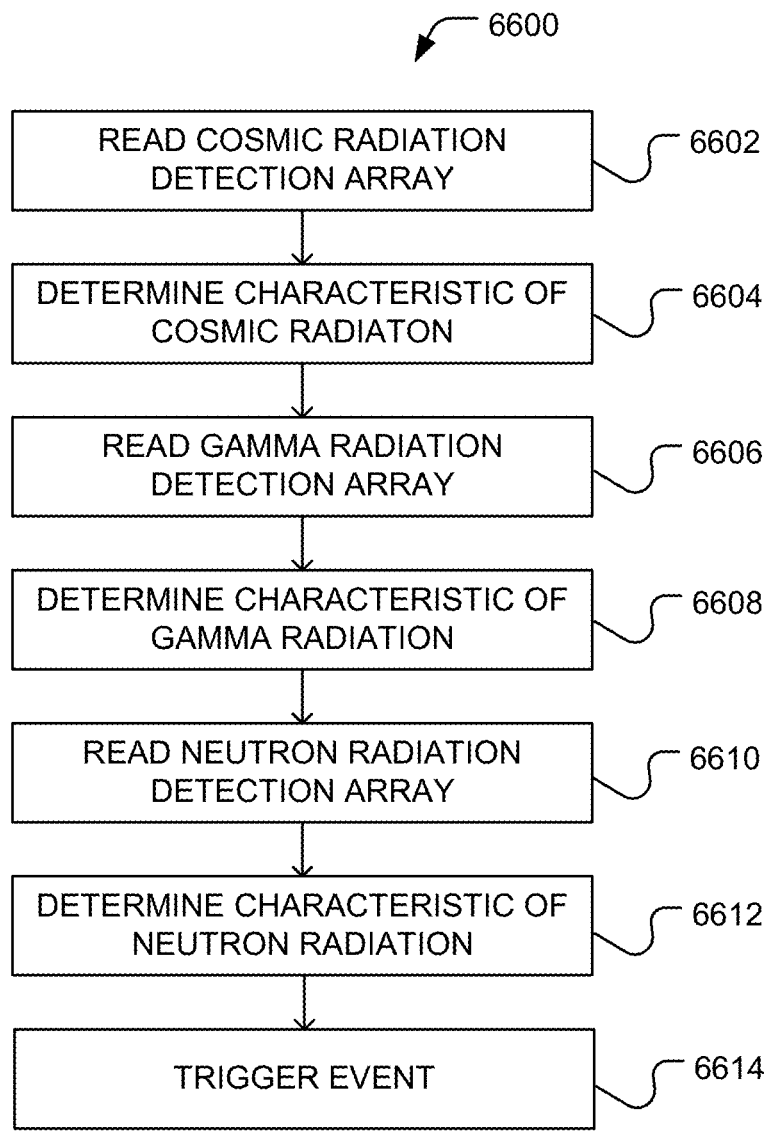
FIG. 66 includes a block flow diagram of an example detection method.

Devices capable of detecting multiple types of radiation can be used to better calibrate and measure individual types of radiation. In particular, detecting the type and quantity of cosmic radiation can be improve detection of gamma and neutron radiation, particularly when such detection array may be influenced by high energy charged particles. For example, FIG. 66 includes an illustration of a method 6600 for characterizing radiation.

As illustrated at block 6602, a cosmic radiation detection array is read. The detection array can be read using a scheme, for example, as described above. Depending on the available threshold voltages, readings acquired from the detection array can be used to determine an amount of cosmic radiation, types of particles or particle energies, paths or direction of impingement, or other factors associated with the cosmic radiation.

The information from the readings can be used to characterize the cosmic radiation, as illustrated at block 6604, for example, to catalog the amount of cosmic radiation, types of particles or particle energies, paths or direction of impingement, and other factors associated with the cosmic radiation. Such characterization can also include a profile useful in determining an effect of such cosmic radiation on other radiation detection arrays.

As illustrated at block 6606, a gamma radiation detection array is read. The detection array can be read using a scheme, for example, as described above. Depending on the available threshold voltages, readings acquired from the detection array can be used to determine an amount of gamma radiation, paths or direction of impingement, or other factors associated with the gamma radiation.

In particular, the effects of cosmic radiation on the gamma radiation detection array can be deconvoluted from the readings and the gamma radiation can be characterized, as illustrated at block 6608. For example, readings within a set threshold or range can be isolated from the readings of the gamma detection array and the amount of detected radiation can be adjusted based on the amount of detected cosmic radiation that would have a similar effect on the charge storage devices.

Further, the neutron radiation detection array can be read, as illustrated at block 6610. The detection array can be read using a scheme, for example, as described above. Depending on the available threshold voltages, readings acquired from the detection array can be used to determine an amount of neutron radiation, paths or direction of impingement, or other factors associated with the neutron radiation.

In particular, the effects of cosmic and gamma radiation on the neutron radiation detection array can be deconvoluted from the readings and the neutron radiation can be characterized, as illustrated at block 6612. For example, readings within a set threshold or range can be isolated from the readings of the neutron detection array and the amount of detected radiation can be adjusted based on the amount of detected cosmic or gamma radiation that would have a similar effect on the charge storage devices.

As illustrated at block 6614, an event can be triggered. For example, alarm thresholds can be established for amounts of radiation, accumulation of radiation, types of radiation, rates of change in radiation of one or more types of radiation, or combinations thereof. Such alarms thresholds can be used to trigger warnings, system shutdown or reset, or redirection of arrays.

For example, such systems have particular use in extraplanetary activities. Such detectors can be used to track cumulative exposure to radiation for space travelers. In another example, such detectors can act as warning systems to direct space travelers to move into radiation protected areas of a craft. In a further example, such detection systems can be used to plan or limit when extravehicular activities (e.g., space walks) take place. Such detection systems can be further used to protect other systems from damage or flawed operation due to flipped bits or memory errors. For example, based on detected radiation, a system may be directed to shut down until radiation reaches an acceptable level, or can be directed to reboot or reset to clear potentially erroneous memory or instructions.

In other examples, the detection arrays can be configured and used to detect the direction and nature of radiation. For example, interstellar sources of radiation can be imaged and monitored. In an example, a satellite system can be established to monitor radiation impinging the planet and orbiting vehicles. Such a satellite system could provide early warnings of radiation harmful to other orbiting systems.

In particular, embodiments of the above-described electronic devices provide technical advantages including high sensitivity to neutron and other radiation. Further, embodiments of the circuitry and methods for testing values or states of the radiation detection devices can provide quick reading of arrays of the radiation detection devices. Embodiments provide small form, light weight, low energy demand systems for detecting radiation, finding use in both terrestrial and extraterrestrial applications.

In a first embodiment, a system includes a first array of neutron radiation detection devices, each radiation detection device including a charge storage region and a radiation reactive material: a first set of decoders to address the neutron radiation detection devices of the first array and to provide first signals indicative of the a state of the neutron radiation detection devices: a second array of gamma radiation detection devices, each gamma radiation detection device including a charge storage region in proximity to a high-z material; a second set of decoders to address the gamma radiation detection devices of the second array and to provide second signals indicative of a state of the gamma radiation detection devices; and a controller in communication with the first set of decoders and the second set of decoders and to receive the first and second signals.

In an example of the first embodiment, the system further includes a third array of cosmic radiation detection devices, each cosmic radiation detection device of the third array including a charge storage region; and a third set of decoders to address the cosmic radiation detection devices of the third array and to provide third signals indicative of a state of the cosmic radiation detection devices. For example, the controller is in communication with the third set of decoders and is to receive the third signals. In another example, the system further includes logic circuitry to determine the state of the cosmic radiation detection devices based on the third signals and to discard third signals having a zero state.

In another example of the first embodiment and the above examples, the system further includes logic circuitry to determine the state of the neutron radiation detection devices based on the first signals and to discard first signals having a zero state.

In a further example of the first embodiment and the above examples, the system further includes logic circuitry to determine the state of the gamma radiation detection devices based on the second signals and to discard second signals having a zero state. For example, the logic circuitry is to determine whether a word has a zero value using a checksum algorithm. In another example, the logic circuitry is to determine whether a word has a zero value using a set of OR operators.

In an additional example of the first embodiment and the above examples, the first or second set of decoders including at least one y-decoder and at least on x-decoder.

In another example of the first embodiment and the above examples, the first or second signals are in the form of words comprising bits, each bit of the bits associated with a state of a neutron or gamma radiation detection device of the first or second array of neutron or gamma radiation detection devices.

In a further example of the first embodiment and the above examples, the system further includes a fourth array of neutron radiation detection devices formed in a stack with the first array of radiation detection devices.

In an additional example of the first embodiment and the above examples, the system further includes a fourth array of gamma radiation detection devices formed in a stack with the second array of gamma radiation detection devices.

In another example of the first embodiment and the above examples, the controller is to determine a likelihood that a radiation event occurred.

In a further example of the first embodiment and the above examples, each neutron radiation detection device of the first array of neutron radiation detection devices includes at least two charge storage regions.

In an additional example of the first embodiment and the above examples, each gamma radiation detection device of the second array of gamma radiation detection devices includes at least two charge storage regions.

In a further example of the first embodiment and the above examples, the controller is to determine a likelihood that a radiation event occurred based on the first or second signals. For example, the controller is to determine the likelihood by adding to a counter for each neutron or gamma radiation detection device having a nonzero state. In another example, the controller is to determine the likelihood by determining a rate of detecting neutron or gamma radiation detection devices having a nonzero state. In an additional example, the controller is to determine the likelihood by determining a percentage of neutron or gamma radiation detection devices having nonzero state.

In a second embodiment, a method of detection radiation includes reading a gamma radiation detection array: determining a characteristic of the gamma radiation detection array based on reading the gamma radiation detection array: reading a neutron radiation detection array; and determining a characteristic of the neutron radiation detection array based on reading the neutron detection array and based on the characteristic of the gamma radiation detection array.

In an example of the second embodiment, the method further includes reading a cosmic radiation detection array; and determining a characteristic of the cosmic radiation detection array based on reading the cosmic radiation detection array.

In another example of the second embodiment and the above examples, determining a characteristic of the gamma radiation detection array includes determining a characteristic of the gamma radiation detection array based on the characteristic of the cosmic radiation detection array.

In a further example of the second embodiment and the above examples, determining a characteristic of the neutron radiation detection array includes determining a characteristic of the neutron radiation detection array based on the characteristic of the cosmic radiation detection array.

In a third embodiment, a system for detecting gamma radiation includes an array of radiation detection devices, each radiation detection device including a charge storage region in proximity to a high-z material: a set of decoders to address the radiation detection devices of the array of radiation detection devices and to provide signals indicative of a state of the radiation detection devices: a logic circuitry to determine the state of the radiation detection devices based on the signals the state of the radiation detection device; and a microcontroller in communication with the logic circuitry.

In an example of the third embodiment, the high-z material is a metal or semimetal selected from hafnium, tantalum, tungsten, rhenium, osmium, iridium, platinum, gold, mercury, thallium, lead, uranium, chromium, vanadium, iron, an alloy thereof, or a combination thereof. For example, the high-z material is uranium. In an example, the uranium is depleted uranium. In a further example, the high-z material is tungsten.

In another example of the third embodiment and the above examples, the high-z material is disposed over the charge storage region.

In a further example of the third embodiment and the above examples, the high-z material is disposed adjacent a gate stack disposed over the charge storage region.

In an additional example of the third embodiment and the above examples, the logic circuitry is to discard data having a zero state.

In another example of the third embodiment and the above examples, the system further includes an address register in communication with the microcontroller and operable to control the set of decoders.

In a further example of the third embodiment and the above examples, the set of decoders includes at least one Y-decoder and at least one X-decoder.

In an additional example of the third embodiment and the above examples, the signals are in the form of words comprising bits, each bit of the bits associated with a state of a radiation detection device of the array of radiation detection devices.

In another example of the third embodiment and the above examples, the logic circuitry is to determine whether a word has a zero value using a checksum algorithm.

In a further example of the third embodiment and the above examples, the logic circuitry is to determine whether a word has a zero value using a set of OR operators.

In an additional example of the third embodiment and the above examples, the system further includes a second array of radiation detection devices formed in a stack with the array of radiation detection devices.

In another example of the third embodiment and the above examples, the microcontroller is to determine a likelihood that a radiation event occurred.

In a further example of the third embodiment and the above examples, each radiation detection device of the array of radiation detection devices includes at least two charge storage regions.

In an additional example of the third embodiment and the above examples, the microcontroller is to determine the likelihood by adding to a counter for each radiation detection device having a nonzero state.

In another example of the third embodiment and the above examples, the microcontroller is to determine the likelihood by determining a rate of detecting radiation detection devices having a nonzero state.

In a further example of the third embodiment and the above examples, the microcontroller is to determine the likelihood by determining a percentage of radiation detection devices having nonzero state.

In a fourth embodiment, a method for detecting radiation includes reading a word from an array of radiation detection devices, the word comprising a plurality of bits, each bit of the plurality of bits associated with a radiation detection device of the array of radiation detection devices; determining whether the word has a zero value or includes a bit of the plurality of bits having a zero value: when the word has a zero value or includes a bit having a zero value, discarding the word; and when the word does not have a zero value or includes a bit having a nonzero value, determining a likelihood that a radiation event occurred.

In an example of the fourth embodiment, the method further includes resetting each radiation detection device of the array of radiation detection devices associated with a bit that has a nonzero value. For example, resetting each radiation detection device includes determining which bit within the word has a nonzero value and adding charge to a charge storage region of the radiation detection device associated with the bit that has the nonzero value.

In another example of the fourth embodiment and the above examples, each radiation detection device includes at least two charge storage regions.

In a further example of the fourth embodiment and the above examples, determining the likelihood includes adding to a counter for each bit having a nonzero value.

In an additional example of the fourth embodiment and the above examples, determining the likelihood includes determining a rate of detecting bits having a nonzero value.

In another example of the fourth embodiment and the above examples, determining the likelihood includes determining a percentage of bits having nonzero values.

In a further example of the fourth embodiment and the above examples, determining whether a word has a zero value includes using a checksum algorithm.

In an additional example of the fourth embodiment and the above examples, determining whether a word has a zero value includes using a set of OR operators.

In a fifth embodiment, a system for detecting radiation includes an array of radiation detection devices, each radiation detection device including a charge storage region responsive to alpha particles and a radiation reactive material that releases alpha particles in response to neutron radiation; a set of decoders to address the radiation detection devices of the array of radiation detection devices and to provide signals indicative of a state of the radiation detection devices: a logic circuitry to determine the state of the radiation detection devices based on the signals the state of the radiation detection device; and a microcontroller in communication with the logic circuitry.

In an example of the fifth embodiment, the logic circuitry is to discard data having a zero state.

In another example of the fifth embodiment and the above examples, the system further includes an address register in communication with the microcontroller and operable to control the set of decoders.

In a further example of the fifth embodiment and the above examples, the set of decoders includes at least one Y-decoder and at least one X-decoder.

In an additional example of the fifth embodiment and the above examples, the signals are in the form of words comprising bits, each bit of the bits associated with a state of a radiation detection device of the array of radiation detection devices.

In another example of the fifth embodiment and the above examples, the logic circuitry is to determine whether a word has a zero value using a checksum algorithm.

In a further example of the fifth embodiment and the above examples, the logic circuitry is to determine whether a word has a zero value using a set of OR operators.

In an additional example of the fifth embodiment and the above examples, the system further includes a second array of radiation detection devices formed in a stack with the array of radiation detection devices.

In another example of the fifth embodiment and the above examples, the microcontroller is to determine a likelihood that a radiation event occurred.

In a further example of the fifth embodiment and the above examples, each radiation detection device of the array of radiation detection devices includes at least two charge storage regions.

In an additional example of the fifth embodiment and the above examples, the microcontroller is to determine the likelihood by adding to a counter for each radiation detection device having a nonzero state.

In a further example of the fifth embodiment and the above examples, the microcontroller is to determine the likelihood by determining a rate of detecting radiation detection devices having a nonzero state.

In an additional example of the fifth embodiment and the above examples, the microcontroller is to determine the likelihood by determining a percentage of radiation detection devices having nonzero state.

As used herein, one layer is on or over another layer when the other layer is disposed to have a major surface intersected by a vector normal to a major surface of the one layer. The layer over the one layer can be in direct contact or there can be one or more interceding layers between the layer and the one layer.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A system comprising:
   a first array of neutron radiation detection devices, each radiation detection device including a charge storage region and a radiation reactive material;
   a first set of decoders to address the neutron radiation detection devices of the first array and to provide first signals indicative of a state of the neutron radiation detection devices;
   a second array of gamma radiation detection devices, each gamma radiation detection device including a charge storage region in proximity to a high-z material;
   a second set of decoders to address the gamma radiation detection devices of the second array and to provide second signals indicative of a state of the gamma radiation detection devices; and
   a controller in communication with the first set of decoders and the second set of decoders and to receive the first and second signals.

2. The system of claim 1, further comprising:
   a third array of cosmic radiation detection devices, each cosmic radiation detection device of the third array including a charge storage region; and
   a third set of decoders to address the cosmic radiation detection devices of the third array and to provide third signals indicative of a state of the cosmic radiation detection devices.

3. The system of claim 2, wherein the controller is in communication with the third set of decoders and is to receive the third signals.

4. The system of claim 2, further comprising logic circuitry to determine the state of the cosmic radiation detection devices based on the third signals and to discard third signals having a zero state.

5. The system of claim 1, further comprising logic circuitry to determine the state of the neutron radiation detection devices based on the first signals and to discard first signals having a zero state.

6. The system of claim 1, further comprising logic circuitry to determine the state of the gamma radiation detection devices based on the second signals and to discard second signals having a zero state.

7. The system of claim 6, wherein the logic circuitry is to determine whether a word has a zero value using a checksum algorithm.

8. The system of claim 6, wherein the logic circuitry is to determine whether a word has a zero value using a set of OR operators.

9. The system of claim 1, wherein the first or second set of decoders including at least one y-decoder and at least on x-decoder.

10. The system of claim 1, wherein the first or second signals are in the form of words comprising bits, each bit of the bits associated with a state of a neutron or gamma radiation detection device of the first or second array of neutron or gamma radiation detection devices.

11. The system of claim 1, further comprising a fourth array of neutron radiation detection devices formed in a stack with the first array of radiation detection devices.

12. The system of claim 1, further comprising a fourth array of gamma radiation detection devices formed in a stack with the second array of gamma radiation detection devices.

13. The system of claim 1, wherein the controller is to determine a likelihood that a radiation event occurred.

14. The system of claim 1, wherein each neutron radiation detection device of the first array of neutron radiation detection devices includes at least two charge storage regions.

15. The system of claim 1, wherein each gamma radiation detection device of the second array of gamma radiation detection devices includes at least two charge storage regions.

16. The system of claim 1, wherein the controller is to determine a likelihood that a radiation event occurred based on the first or second signals.

17. The system of claim 16, wherein the controller is to determine the likelihood by adding to a counter for each neutron or gamma radiation detection device having a nonzero state.

18. The system of claim 16, wherein the controller is to determine the likelihood by determining a rate of detecting neutron or gamma radiation detection devices having a nonzero state.

19. The system of claim 16, wherein the controller is to determine the likelihood by determining a percentage of neutron or gamma radiation detection devices having nonzero state.

* * * * *